US009633399B2

(12) United States Patent
George et al.

(10) Patent No.: US 9,633,399 B2
(45) Date of Patent: Apr. 25, 2017

(54) METHOD AND SYSTEM FOR IMPLEMENTING A CLOUD-BASED SOCIAL MEDIA MARKETING METHOD AND SYSTEM

(71) Applicant: Oracle International Corporation, Redwood Shores, CA (US)

(72) Inventors: Biju George, Palo Alto, CA (US); Mehrshad Setayesh, Lafayette, CO (US); Timothy P. McCandless, Boulder, CO (US); Patricia Pichardo, Smyrna, GA (US); Kimberly Ann Wolfe, Decatur, GA (US); Reza Parang, San Francisco, CA (US); Maria Fernanda Diaz-Arscott, St. Andrew (JM); Jeff Condit, Murfreesboro, TN (US); Brian Culler, Atlanta, GA (US); Noah Horton, San Francisco, CA (US); Michael James Strutton, Villa Rica, GA (US)

(73) Assignee: Oracle International Corporation, Redwood Shores, CA (US)

( * ) Notice: Subject to any disclaimer, the term of this patent is extended or adjusted under 35 U.S.C. 154(b) by 19 days.

(21) Appl. No.: 14/040,565

(22) Filed: Sep. 27, 2013

(65) Prior Publication Data

US 2014/0180788 A1 Jun. 26, 2014

Related U.S. Application Data

(63) Continuation-in-part of application No. 13/004,796, filed on Jan. 11, 2011, now Pat. No. 9,117,058, and a
(Continued)

(51) Int. Cl.
*G06F 15/16* (2006.01)
*G06Q 50/00* (2012.01)
*G06Q 30/02* (2012.01)

(52) U.S. Cl.
CPC ......... *G06Q 50/01* (2013.01); *G06Q 30/0269* (2013.01); *G06Q 30/0277* (2013.01)

(58) Field of Classification Search
CPC .......... G06Q 30/0269; G06Q 30/0277; G06Q 50/01; G06Q 30/02
See application file for complete search history.

(56) References Cited

U.S. PATENT DOCUMENTS 7,974,983 B2 * 7/2011 Goeldi .......................... 707/769
8,230,062 B2 * 7/2012 Newton ........................ 709/224
(Continued)

OTHER PUBLICATIONS

Third-Party Submission under 37 CFR 1.290 filed Apr. 3, 2014 for related U.S. Appl. No. 14/021,820.
(Continued)

*Primary Examiner* — Taghi Arani
*Assistant Examiner* — Sharon Lynch
(74) *Attorney, Agent, or Firm* — Invoke

(57) ABSTRACT

Disclosed is an approach for implementing a system, method, and computer program product for performing social marketing using a cloud-based system. The approach is capable of accessing data across multiple types of internet-based sources of social data and commentary and to perform analysis upon that data. A social marketing campaign can then be generated and implemented in an integrated manner using the system. This permits realtime reaction to trends, with rapid ability to react to opportunities in the marketplace.

30 Claims, 45 Drawing Sheets

Related U.S. Application Data continuation-in-part of application No. 14/021,820, filed on Sep. 9, 2013, and a continuation-in-part of application No. 12/859,675, filed on Aug. 19, 2010.

(60) Provisional application No. 61/707,628, filed on Sep. 28, 2012, provisional application No. 61/427,000, filed on Dec. 23, 2010, provisional application No. 61/780,562, filed on Mar. 13, 2013, provisional application No. 61/780,611, filed on Mar. 13, 2013, provisional application No. 61/698,713, filed on Sep. 9, 2012, provisional application No. 61/698,715, filed on Sep. 9, 2012, provisional application No. 61/235,277, filed on Aug. 19, 2009.

(56) References Cited

U.S. PATENT DOCUMENTS

| | | | |
|---|---|---|---|
| 8,312,056 B1* | 11/2012 | Peng et al. | 707/802 |
| 8,447,852 B1 | 5/2013 | Penumaka | |
| 8,510,164 B2* | 8/2013 | Newton et al. | 705/14.4 |
| 8,554,635 B2 | 10/2013 | England | |
| 8,607,295 B2* | 12/2013 | Bhatia et al. | 725/133 |
| 8,620,718 B2* | 12/2013 | Varghese et al. | 705/7.29 |
| 8,631,473 B2* | 1/2014 | Bhatia et al. | 726/4 |
| 8,635,674 B2* | 1/2014 | Bhatia et al. | 726/4 |
| 8,650,587 B2* | 2/2014 | Bhatia et al. | 725/14 |
| 8,706,548 B1* | 4/2014 | Blume et al. | 705/14.1 |
| 8,843,610 B2* | 9/2014 | Newton | 709/223 |
| 8,856,056 B2* | 10/2014 | Di Sciullo | G06Q 40/06 705/7.28 |
| 8,856,165 B1* | 10/2014 | Cierniak | G06Q 10/10 705/28 |
| 9,117,058 B1 | 8/2015 | Ansari et al. | |
| 2006/0282328 A1* | 12/2006 | Gerace et al. | 705/14 |
| 2007/0067210 A1* | 3/2007 | Rishell et al. | 705/10 |
| 2007/0100779 A1* | 5/2007 | Levy et al. | 705/500 |
| 2007/0121843 A1* | 5/2007 | Atazky et al. | 379/114.13 |
| 2007/0124432 A1* | 5/2007 | Holtzman | G06F 17/2745 709/219 |
| 2007/0150335 A1* | 6/2007 | Arnett et al. | 705/10 |
| 2008/0294624 A1* | 11/2008 | Kanigsberg | G06F 17/30867 |
| 2008/0313000 A1* | 12/2008 | Degeratu | G06Q 10/06 705/319 |
| 2009/0157511 A1* | 6/2009 | Spinnell | G06Q 30/02 705/14.1 |
| 2009/0172773 A1 | 7/2009 | Moore | |
| 2009/0254529 A1* | 10/2009 | Goldentouch | 707/3 |
| 2009/0265221 A1 | 10/2009 | Woods et al. | |
| 2010/0070517 A1 | 3/2010 | Ghosh et al. | |
| 2010/0119053 A1* | 5/2010 | Goeldi | 379/265.09 |
| 2010/0121707 A1* | 5/2010 | Goeldi | 705/14.49 |
| 2010/0121843 A1* | 5/2010 | Goeldi | 707/722 |
| 2010/0306049 A1* | 12/2010 | Kakade et al. | 705/14.49 |
| 2011/0055017 A1* | 3/2011 | Solomon et al. | 705/14.66 |
| 2011/0112899 A1* | 5/2011 | Strutton | G06Q 30/02 705/14.41 |
| 2011/0125550 A1* | 5/2011 | Erhart | G06Q 30/0201 705/7.29 |
| 2011/0145064 A1 | 6/2011 | Anderson et al. | |
| 2011/0179061 A1 | 7/2011 | Chilakamarri | |
| 2011/0191417 A1* | 8/2011 | Rathod | 709/204 |
| 2011/0258560 A1* | 10/2011 | Mercuri et al. | 715/753 |
| 2011/0270649 A1* | 11/2011 | Kerho | G06Q 30/0202 705/7.31 |
| 2011/0282943 A1* | 11/2011 | Anderson et al. | 709/204 |
| 2011/0313996 A1* | 12/2011 | Strauss | G06Q 30/0242 707/709 |
| 2011/0320542 A1 | 12/2011 | Bendel | |
| 2012/0036006 A1* | 2/2012 | Mauro | G06Q 30/0243 705/14.42 |
| 2012/0158476 A1* | 6/2012 | Neystadt et al. | 705/14.16 |
| 2012/0185544 A1* | 7/2012 | Chang et al. | 709/206 |
| 2012/0185764 A1 | 7/2012 | Ball et al. | |
| 2012/0226713 A1* | 9/2012 | Park et al. | 707/780 |
| 2012/0233258 A1* | 9/2012 | Vijayaraghavan et al. | 709/204 |
| 2012/0253885 A1* | 10/2012 | Newton | 705/7.29 |
| 2012/0290431 A1* | 11/2012 | Tedjamulia et al. | 705/26.7 |
| 2012/0290432 A1* | 11/2012 | Tedjamulia et al. | 705/26.7 |
| 2013/0014137 A1* | 1/2013 | Bhatia | H04N 21/252 725/9 |
| 2013/0014222 A1* | 1/2013 | Bhatia et al. | 726/4 |
| 2013/0014223 A1* | 1/2013 | Bhatia et al. | 726/4 |
| 2013/0035982 A1* | 2/2013 | Zhang et al. | 705/7.29 |
| 2013/0060864 A1 | 3/2013 | Ehms | |
| 2013/0073378 A1* | 3/2013 | Naveh et al. | 705/14.41 |
| 2013/0080264 A1* | 3/2013 | Umeda | G06Q 30/02 705/14.69 |
| 2013/0132437 A1* | 5/2013 | Park et al. | 707/780 |
| 2013/0166379 A1* | 6/2013 | Ehindero et al. | 705/14.52 |
| 2013/0179217 A1* | 7/2013 | Newton | 705/7.29 |
| 2013/0291060 A1 | 10/2013 | Moore | |
| 2013/0325733 A1 | 12/2013 | Wu et al. | |
| 2014/0074551 A1 | 3/2014 | Setayesh et al. | |
| 2014/0074844 A1 | 3/2014 | Subramanian et al. | |
| 2014/0082070 A1 | 3/2014 | Chakraborty et al. | |
| 2014/0114959 A1 | 4/2014 | Sankhla | |
| 2014/0173641 A1* | 6/2014 | Bhatia et al. | 725/9 |
| 2014/0173643 A1* | 6/2014 | Bhatia | H04N 21/252 725/13 |
| 2014/0365275 A1* | 12/2014 | Newton | 705/7.29 |
| 2016/0063442 A1 | 3/2016 | Bennett et al. | |

OTHER PUBLICATIONS

Final Office Action dated Nov. 23, 2015 for related U.S. Appl. No. 14/021,798.

Non-final Office Action dated Apr. 21, 2016 for related U.S. Appl. No. 14/021,798.

Non-final Office Action dated Aug. 11, 2016 for related U.S. Appl. No. 14/021,820.

Non-final Office Action dated Oct. 7, 2016 for related U.S. Appl. No. 14/021,798.

* cited by examiner

| Title | Link | Source | Source Type | Date | Message Text | Message Quality | Tag | Name / Contact | Social Profile / Demographic Information |
|---|---|---|---|---|---|---|---|---|---|
| Bad Customer Service | http://blog site/1234 | Blogsite | Microblog | 1/1/2014 | "I received bad service from a salesperson at Foo.com" | Readability = High; Subjectivity = 1; Tonality = 1 | Customer Service | Joe | Follower Count = 1000 |
| Need TV | http://face _my_boo k.space. com/2345 | Face_My_b ook_space | Social media site | 1/2/2014 | "I need to buy a TV – does Foo.com have good prices?" | Readability = Medium; Subjectivity = 2; Tonality = 2 | Sales Lead | Sue | Lives in California |
|  |  |  |  |  |  |  |  |  |  |

FIG. 7

*FIG. 13 – Exemplary Message Customization Flow*

FIG. 14 – Exemplary Insight Analysis Flow

METHOD AND SYSTEM FOR IMPLEMENTING A CLOUD-BASED SOCIAL MEDIA MARKETING METHOD AND SYSTEM

CROSS-REFERENCE TO RELATED APPLICATIONS

The present application claims the benefit of priority to U.S. Provisional Patent Application No. 61/707,628, filed Sep. 28, 2012, which is hereby incorporated by reference in its entirety. The present application is also a continuation-in-part of: (a) U.S. application Ser. No. 13/004,796, filed on Jan. 11, 2011, which claims the benefit of U.S. Provisional Patent Application No. 61/427,000, filed on Dec. 23, 2010, (b) U.S. application Ser. No. 14/021,820, filed on Sep. 9, 2013, which claims the benefit of U.S. Provisional Patent Application No. 61/780,562, filed on Mar. 13, 2013, U.S. Provisional Patent Application No. 61/780,611, filed on Mar. 13, 2013, U.S. Provisional Patent Application No. 61/698,713, filed on Sep. 9, 2012, and U.S. Provisional Patent Application No. 61/698,715, filed on Sep. 9, 2012, and (c) U.S. application Ser. No. 12/859,675, filed on Aug. 19, 2010, which claims the benefit of U.S. Provisional Application No. 61/235,277, filed on Aug. 19, 2009, all of which are hereby incorporated by reference in their entirety.

BACKGROUND AND SUMMARY

Given the widespread availability and usage of social networks by consumers, many businesses have become interested in being able to effectively market their products through various social networking mediums.

It would be very useful to provide an effective mechanism to allow businesses and enterprise business applications to interact with and take action upon data that originate from online sources of social data and commentary. For example, consider a CRM (Customer Relationship Management) application, which is designed to facilitate the ability of a business to create, develop, and build relationships with its customers or potential customers. It would be very desirable to allow the business CRM application to stay informed of actionable social networking content, for example, to identify potential customers and possible sales leads.

As another example, brand managers are often interested in monitoring commentary on the internet regarding their brands or competitors' brands. Brand managers may read the commentary to gauge interest in their marketing materials, receive feedback regarding their products, or take further action regarding any inflammatory postings.

It would also be useful to provide effective approaches to be able to construct effective marketing campaigns based upon data from analysis of social media sources, and to also utilize those same social media venues as part of the marketing campaign.

Embodiments of the present invention provide a system, method, and computer program product for implementing an integrated solution for real-time social marketing. The approach allows a business entity to access and integrate with social media data, where data is accessed from across multiple types of internet-based sources of social data and commentary and to perform semantic analysis upon that data. The results of that analysis are used to take actions to construct and implement a social media marketing campaign. In some embodiments, the integrated system may be cloud-based, and include both a social monitor/analysis service as well as a social marketing/CRM application.

Other additional objects, features, and advantages of the invention are described in the detailed description, figures, and claims.

BRIEF DESCRIPTION OF THE DRAWINGS

FIG. 7 shows a table of example types of information that may be part of an actionable social message.

DETAILED DESCRIPTION

The present disclosure is directed to an approach to implement an integrated solution for real-time social marketing. The approach allows a business entity to access and integrate with social media data, where data is accessed from across multiple types of internet-based sources of social data and commentary and to perform semantic analysis upon that data. The results of that analysis are used to take actions to construct and implement a social media marketing campaign. In some embodiments, the integrated system may be cloud-based, and include both a social monitor/analysis service as well as a social marketing/CRM application.

Figure 1:
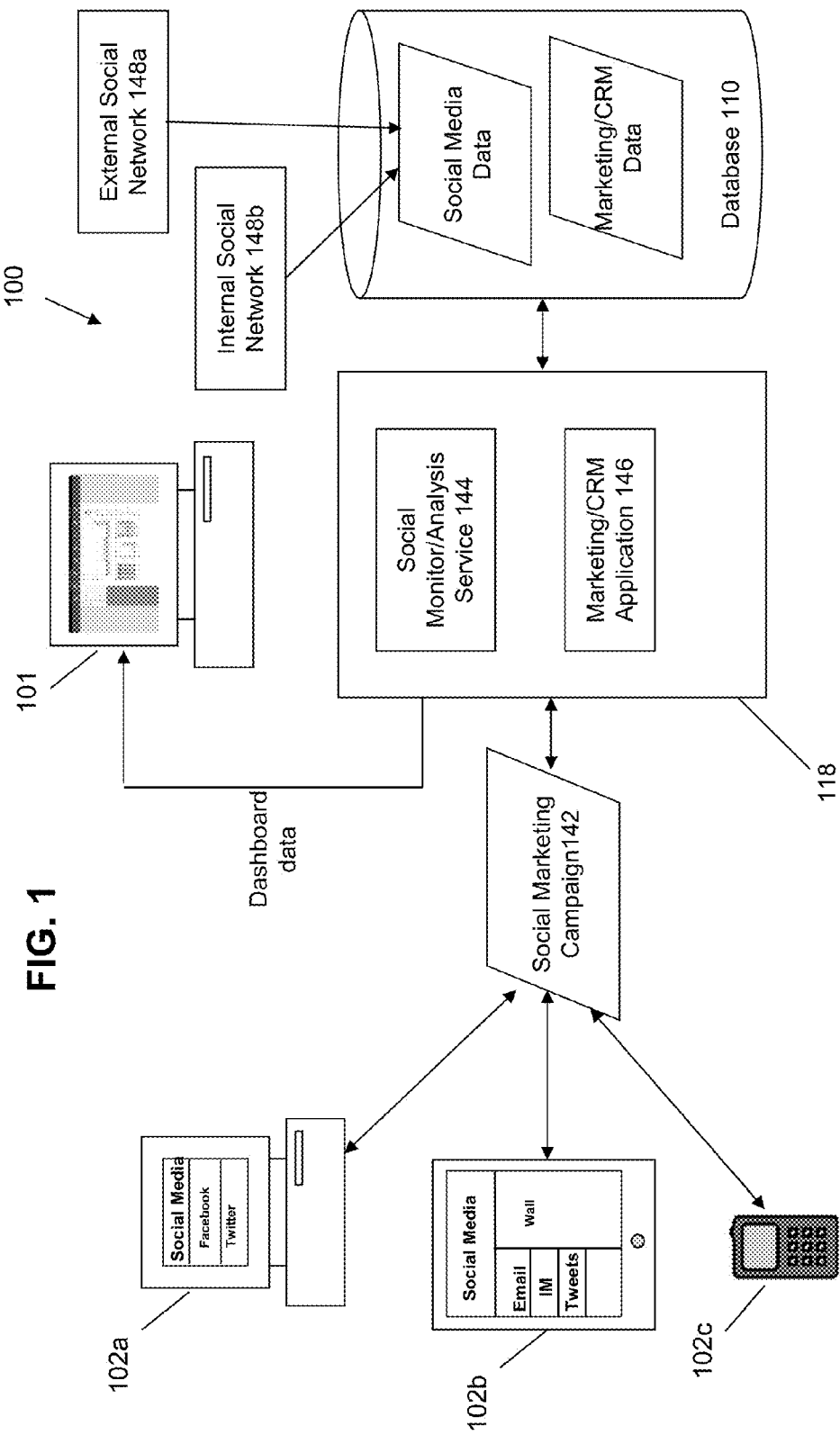
FIG. 1 illustrates an example system which may be employed in some embodiments of the invention.

FIG. 1 illustrates an example system 100 which may be employed in some embodiments of the invention. The system 100 includes one or more users at one or more user stations 101 that operate the system. The user station comprises any type of computing station that may be used to operate or interface with the applications in the system. Examples of such user stations include, for example, workstations, personal computers, or remote computing terminals. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs to the enterprise application and/or social networking application.

Figure 18:
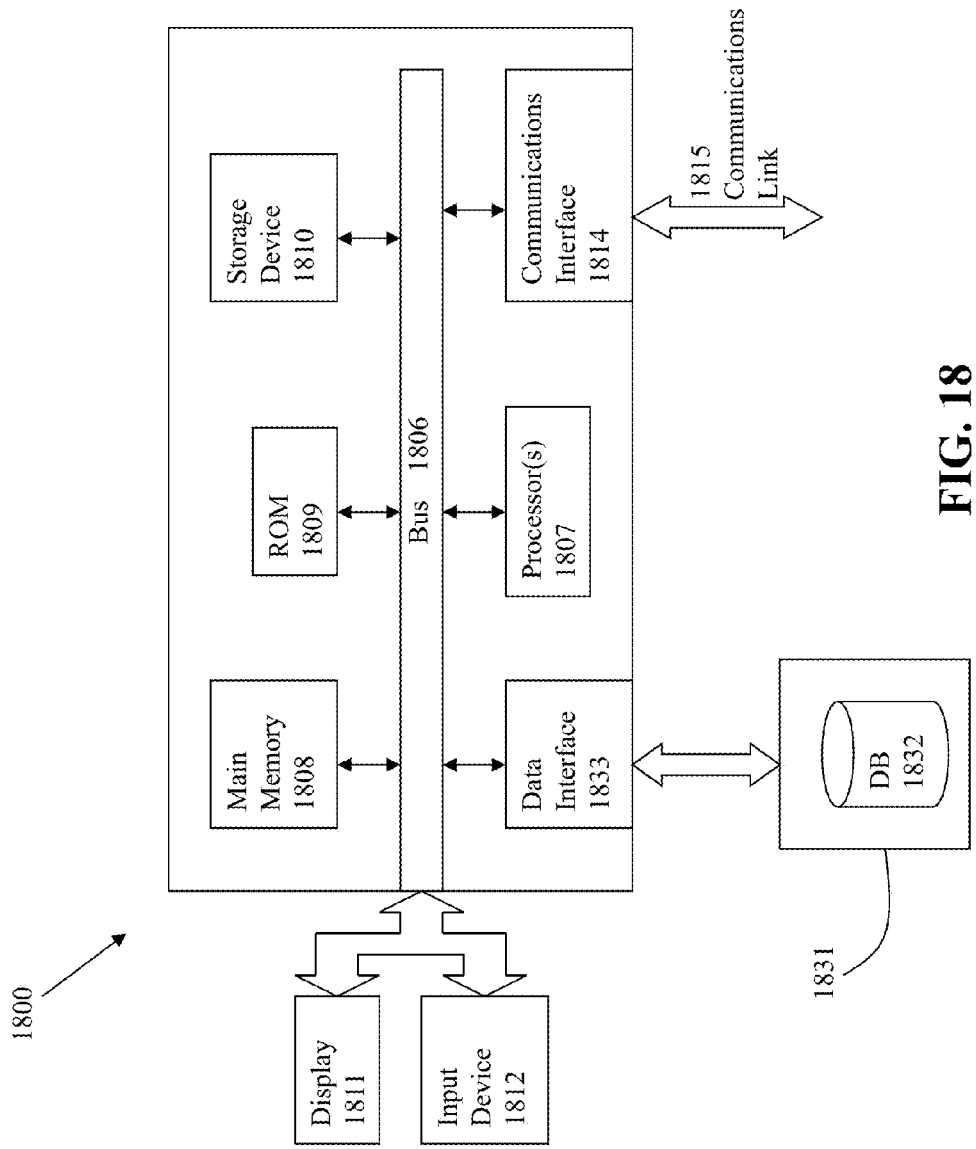
FIG. 18 is a block diagram of an illustrative computing system suitable for implementing an embodiment of the inventor.

FIG. 18 is a block diagram of an illustrate computing system suitable for implementing an embodiment of the invention.

The system 100 includes one or more servers 118 having applications that implement social marketing activities. The server 118 may provide these social marketing applications in a cloud-based manner to users at user station 101.

This social marketing application at server 118 receives data from one or more online social data sources. The social network data may be received from both external social networks 148a and internal social networks 148b. Examples of external (public) social networks include, for example, websites such as a social network or blog or web feed (e.g., Facebook, Twitter, Blogger, and RSS). The content may include one or more comments (e.g., Facebook comment, comment to a blog post, reply to a previous comment) or uploaded postings (e.g., images and associated metadata, text, rich media, URLs) at one or more sources. The social data/content may therefore comprise a variety of forms and/or types.

Recently, organizations are starting to realize the value of an internal social network as a tool to improve collaboration within the organization. The internal social networks can be configured to provide an effective mechanism to allow users of the system to interact and collaborate with each other. For example, consider a CRM (Customer Relationship Management) application, which is designed to facilitate the ability of a business to create, develop, and build relationships with its customers or potential customers—with the obvious intent to obtain or increases the business' sales to the customers. In this type of system, it would be very desirable to allow the internal users of an organization to use the internal social network to stay informed and collaborate for related business activities and customers/leads. An example internal social network is the Oracle Social Network product, available from Oracle Corporation of Redwood Shores, Calif.

The cloud-based social marketing application at server 118 provides a framework for performing social media analysis, marketing, and engagement. A social monitor/analysis module performs analysis upon the social media data. For example, semantic analysis, classification, and filtering can be performed upon the social data. Based upon this analysis, actionable social data can be identified. An exemplary social monitor/analysis tool that can provide the services of 144 is the Collective Intellect tool, available from Oracle Corporation of Redwood Shores, Calif.

The actionable social data is used by organizations to create a social marketing campaign 142. One or more tools within a marketing/CRM application may be used to create the social marketing campaign 142. Example of such social marketing and CRM applications include, for example, services and components from the Vitrue, Involver, and Fusion products available from Oracle Corporation of Redwood Shores, Calif.

It is noted that the tools within the server 118 for implementing the social marketing campaign 142 are implemented in an integrated manner For example, commonly accessed data can be transparently utilized, transmitted, and/or accessed between the different tools and services. Inter-related actions can also be performed between the different services and components, e.g., by identifying actionable data from a first service/tool and then taking the appropriate action using a second service/tool.

The marketing/CRM data provided to the campaign and/or generated by the campaign may be stored into a database 110 in a computer readable storage device. The computer readable storage device comprises any combination of hardware and software that allows for ready access to the data that is located at the computer readable storage device. For example, the computer readable storage device could be implemented as computer memory operatively managed by an operating system. The computer readable storage device could also be implemented as an electronic database system having storage on persistent and/or non-persistent storage.

The set of analysis results produced by the social marketing application at server 118 can be accessed and visually reviewed by individuals and organizations within a company on user station 101. Data is provided to the user at user station 101 through one or more dashboards for information relevant to the social data analysis and marketing campaign. A dashboard is a user interface mechanism that provides views of key metrics and indicators relevant to a particular objective or business process.

According to some embodiments of the invention, the social marketing campaign 142 will be presented to potential customers that use social media applications at any of a user station 102a, tablet device 102b, or mobile telephone/computing device 102c. Examples of such user stations 102 include for example, workstations, personal computers, laptop computers, or remote computing terminals. Tablet device 102b comprises any type of portable tablet device, including for example, tablet computers, portable readers, etc. Mobile telephone/computing device 102c comprises any mobile device that can suitably access an application on application server 118, such as smartphones and programmable mobile handsets. It is noted that the invention is not limited in its application to just these types of devices. The embodiments of the invention are applicable to any computing device that works in conjunction with a social media application.

Figure 2A:
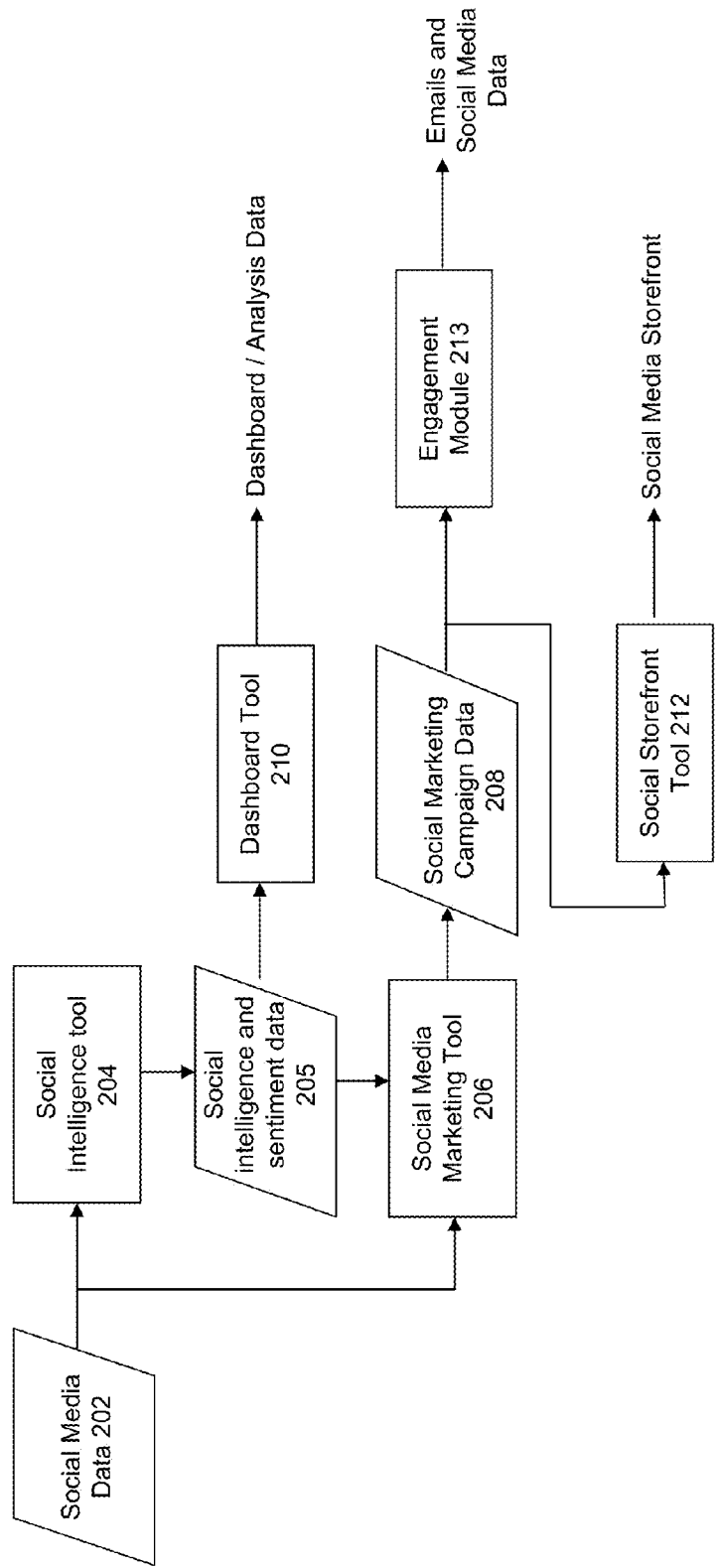
FIG. 2A shows a flow of information and activities performed within the social marketing architecture according to some embodiments of the invention.

FIG. 2A shows a flow of information and activities performed within the social marketing architecture according to some embodiments of the invention. Initially, data 202 from social network systems are received into the system. The social data may be either public social network data or private social network data. Public social network data may include, for example, publically available content from public blog sites, twitter messages, RSS data, and social media sites such as Facebook. Private social network messages may include, for example, content from internal company social networking sites. In some embodiments, the data that is received for processing includes non-social data.

Such data may include, for example, enterprise data (e.g., email, chats, transcribed phone conversations, transcribed videos).

A social intelligence tool 204 performs analysis upon the social media data 202. For example, semantic analysis may be performed upon the received data. Latent semantic analysis (LSA), an advanced form of statistical language modeling, is one possible approach that can be taken to perform semantic analysis upon the social data. This permits the system to understand the contextual and semantic significance of terms that appear within the social data. For example semantic analysis can be used to understand the difference between the term "Galaxy" used in an astronomy context, and "Galaxy" as used to refer to the name of a professional soccer team.

Semantic filtering can also be performed to minimize miscategorizations of the social data. Much of the social data is likely to contain content which is of very little interest to a business organization. Semantic filtering is used to remove the irrelevant material from the social data to reduce the occurrence of false positives, false negatives, and inappropriate responses/rejections within the actionable data. This permits the resulting data to be more relevant and accurate when provided to the enterprise applications, by reducing the excess "noise" of irrelevant data.

The system performs semantic analysis and classification on the social media data. This permits the system to create and apply filters to identify themes, and to cluster together like-minded messages, topics, conversations, and content.

A dashboard tool 210 is used to display the analysis results 205 to marketing employees and executives. As noted above, a dashboard is a user interface mechanism that is often used to provide views of key metrics and indicators relevant to a particular objective or business process. Therefore, dashboards typically use graphs, charts, and other visual objects to show summaries, trends, and comparisons of data. The dashboard can be configured to show analysis results of the internal social data that are needed to monitor the health and opportunities of the business, including for example, data that focus on high level measures of performance and forecasts. For analysis purposes, the dashboards often include more in the way of context data, comparisons, and history for the internal social data. The dashboards may also be used to monitor events and activities that are changing more frequently. The dashboards also may also support drilling down into the underlying details of the high level data.

The analysis results 205 are also used by the social media marketing tool 206 to generate and implement a social marketing campaign 208. The social media marketing tool 206 provides a platform that permits organizations to enhance and implement social marketing efforts by scaling across multiple social networks, target messages from global to local, create unique and consistent brand experiences, and publish content that engages fans and drives leads. This permits real time responsiveness to help drive effective marketing efforts. A unified social experience can therefore be provided for the social marketing campaign across customer interactions on multiple social media platforms and outlets.

Exemplary social media marketing tools include, for example, the Involver Conversation and Vitrue Publisher tools available from Oracle Corporation. The Vitrue Publisher tool provides functionality that enables companies to manage, moderate and engage in two-way conversations with fans and followers from one centralized location. This tool addresses the challenges of scheduling content for multiple social networks, streams or pages, and seamlessly directs social fan questions to appropriate team members. The Involver Conversation tool access information about customer messages and sentiments, and provides an infrastructure for communicating and publishing in response to the customer messages. Actions are taken based upon the identified "actionable" messages, including for example, sending emails, generating sales lead data, and creating CRM entries in a CRM application.

An engagement module 213 can be employed to implement the social marketing campaign. The engagement module 213 performs actions such as, for example, publishing to social media sites and sending emails.

A social storefront tool 212 can be used to create a social media storefront. An exemplary social storefront tool is the Vitrue Shop tool, available from Oracle Corporation.

Figure 2B:
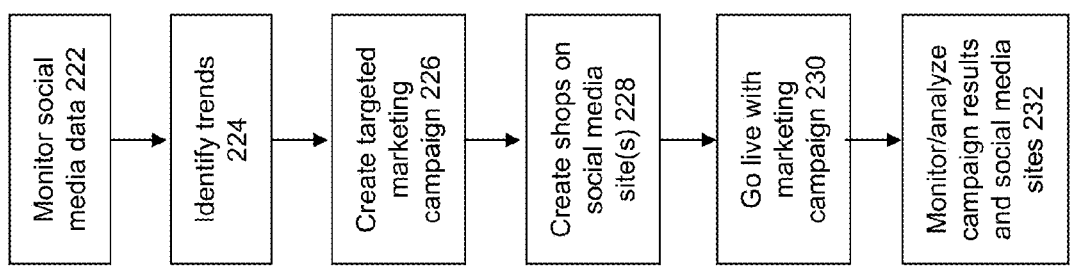
FIG. 2B shows a flowchart of an approach to implement an integrated cloud-based social marketing system.

FIG. 2B shows a flowchart of an approach to implement an integrated cloud-based social marketing system. At 222, the process implements monitoring of content from one or more social media sites. At 224, trends are identified within the content from the social media sites.

These actions may involve using a monitoring tool to obtain and monitor content from the social media sites, e.g., using a social media marketing and engagement tool as described in more detail below. The system uses semantic analysis and/or sentiment analysis to identify themes within the social media content, and to then identify whether any interesting marketing insights can be obtained from the data. For example, it would be of great interest to a marketer to know about trends that develop with respect to products and/or product categories of pertinence to that marketer's company.

If such trends are identified, then at 226, a marketing campaign is created that specifically targets the identified trend. The marketing campaign can be created using any suitable tool. For example, a CRM tool can be used to create the campaign. For campaigns that are designed to be implemented using social media, the campaign can also be created using a social relationship management tool and/or a marketing automation tool in addition to, or instead of, the CRM tool. The marketing campaign can be implemented as a multi-channel campaign, e.g., one that addresses different social media sites and/or email-based campaigns.

The multi-channel campaign may also involve creations of a marketing presence at one or more storefronts, whether virtual or brick & mortar storefronts. The online storefront can be created, for example, by creating a shopping page on a social media site (228).

Thereafter, at 230, the marketing campaign goes live. At 232, further monitoring and tracking are performed to monitor and analyze the status, progress, and results of the marketing campaign. Analysis can also be performed, for example, to determine engagement levels and to measure the success of other campaign. Similar actions can thereafter be taken for various other marketing regions.

Monitoring Tool

FIGS. 3, 4, 5A, and 5B illustrate an example method and mechanism that can be used to monitor posted content across multiple sources. The posted content is obtained from various sources from one or more platforms, and the posted content from the various sources are presented at a user interface for monitoring. The posted content may be monitored to trigger an action to be taken with respect to the posted content. As used herein, a "platform" may include a website such as a social network or blog or web feed (e.g., Facebook, Twitter, Blogger, RSS, YouTube). In some embodiments, the platform may permit interaction by users or viewers or account holders. As used herein, a "source" may include an account or a channel on a platform. In some embodiments, a source may require authentication before content at the source may be viewed. For example, Facebook requires a person to login to an account and to be a friend of another person before seeing content on that other person's page and anonymous viewing of content is not permitted. As used herein, a "posted content" or "content" or "presented content" or "obtained content" may include one or more comments (e.g., Facebook comment, comment to a blog post, reply to a previous comment) or uploaded postings (e.g., images and associated metadata, text, rich media, URLs) at one or more sources. As described above, content may comprise a variety of forms and/or types. As used herein, a "sentiment" refers to an opinion or feeling associated with a presented content.

In one example application of the technique, brand managers may desire to monitor commentary or conversations on the internet that relate to the brands they manage. Certain sources may contain information or posted commentary that are relevant to brands that a brand manager manages. Some examples include managing the brand or reputation of a recording artist or band, a women's clothing line or a small business (e.g., a bakery, restaurant, etc.). Receiving and presenting all desired content to be monitored at a central interface permits brand managers to efficiently consume and manage the plethora of information across multiple sources. If a brand manager desires, he may take an action with respect to a monitored content inline at the central interface, that is, without having to navigate away from the interface in order to take or otherwise perform a desired action. In some embodiments, the result of the action taken with respect to a monitored content may be displayed at the source without the brand managers needing to directly interact with or go to a source (e.g., log into an account associated with the platform of the source and reply to a posted comment at the webpage of the source). Examples of actions include assigning a sentiment, replying to, or deleting the content. In some embodiments, more than one brand manager manages the same brand(s); each may access the central interface as a user and access the same information. Multiple users may utilize the central interface to share the responsibilities regarding the monitoring and management of posted content in an organized and collaborative fashion.

Figure 3:
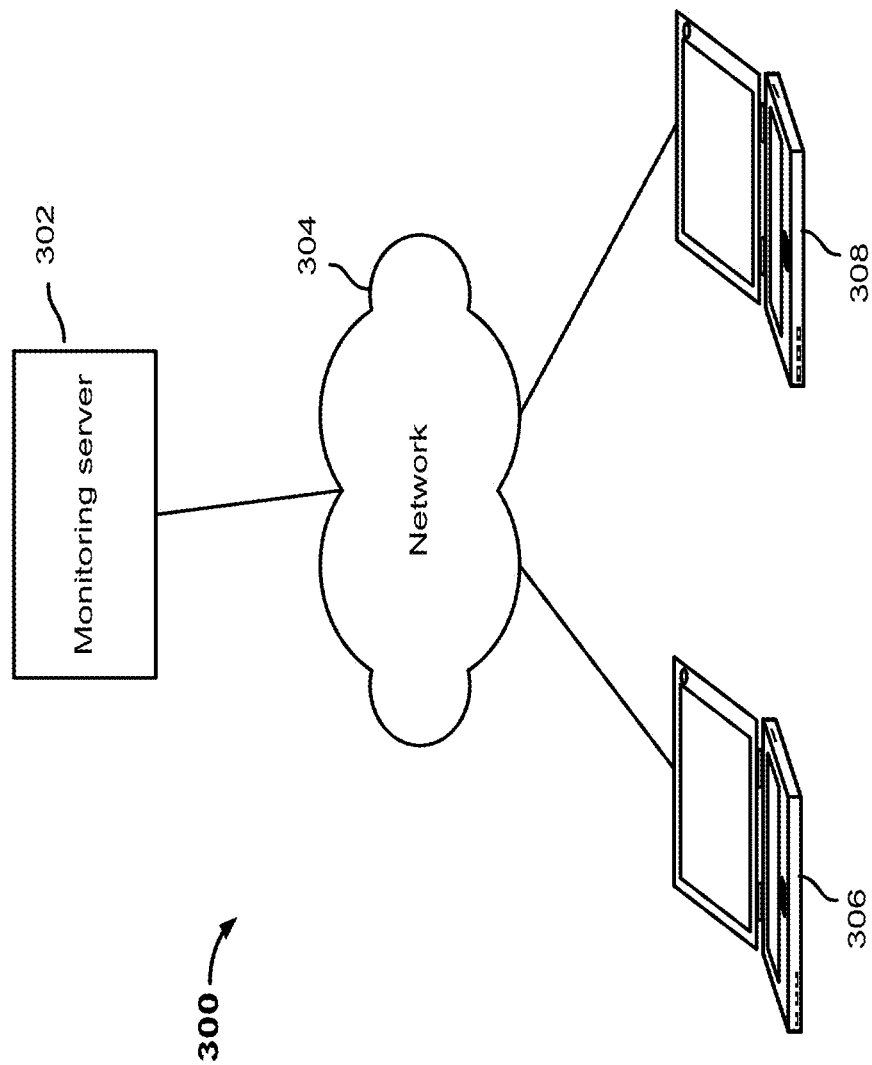
FIG. 3 is a diagram of an embodiment of a system for monitoring content from various sources.

FIG. 3 is a diagram of an embodiment of a system for monitoring content from various sources. In the example shown, system 300 comprises a monitoring server 302, network 304, brand manager 306, and commentator 308.

In some embodiments, monitoring server 302 communicates with brand manager 306 via network 304 to present the content posted at selected sources. For example, the content presented may be feedback or a response by commentator 308 in response to or in reaction to content posted by brand manager 306 (e.g., a brand manager 306 posts an announcement about a sale or promotion and commentator 308 expresses excitement about the sale or promotion). In another example, commentator 308 posts content "out of the blue" that is not necessarily directly tied to or associated with a specific piece of content by brand manager 306, such as a comment, "I love Tummy Rub dog toys!". In various embodiments, network 302 includes various high speed data networks and/or telecommunications networks. Although this figure shows brand manager 306 as communicating via a computer, a variety of devices may be used, including (but not limited to) an Internet browser application or a specialized application running on a smart phone or other device. Monitoring server 302 may be linked to various sources at various platforms (not shown). Links between monitoring server 302 and various sources may be established via, but not limited to, the following examples: a secure authentication service or an exchange of identification information and passwords.

In another example, brand manager 306 manages a brand associated with a line of tennis shoes. In that example, the brand manager may have accounts (e.g., the brand manager may be the administrator of the accounts) at platforms that are dedicated to distributing information regarding the brand's line of tennis shoes. The brand manager may also know about certain webpages that contain relevant information to the brand's line of tennis shoes. For example, other relevant webpages include publicly viewable webpages at one or more platforms, competitors' webpages, blogs with posts that relate to tennis shoes, and webpages that rate new tennis shoes. The brand manager would input information (e.g., identification and/or authentication information) regarding the sources he wishes to monitor at the user interface. The user interface would then obtain content posted at the selected sources and present the content to the brand manager. In some cases, the brand manager may select an action with respect to the presented content at the user interface if he feels that action is warranted. Among the actions that the brand manager may take include replying to a piece of content, deleting a piece of content, assigning a sentiment to the piece of content, assigning the posted content to another user (e.g., a colleague of the brand manager), and republishing the posted content. This way, the brand manager may monitor relevant commentary regarding the brands he manages across various sources associated with different platforms at one location or central/single user interface. The brand manager may also interact with such commentary, keep track of trends related to the commentary, and also coordinate monitoring activities with his colleagues.

Monitoring server 302 obtains content from various sources. In some embodiments, sources are publicly or anonymously viewable websites or webpages (e.g., websites or webpages that do not require authentication or identification for access). In some embodiments, sources require authentication before content may be accessed from them. Monitoring server 302 obtains the content from a source through one or more of the following: pulling the content off the server associated with the source, communicating with the application programming interface ("API") associated with the platform that corresponds to the source, querying the server associated with the source for updated content, or any other appropriate technique. In some embodiments, monitoring server 302 obtains content from the sources periodically. In some embodiments, monitoring server 302 obtains content from the sources whenever it detects a change at the sources (e.g., monitoring server 302 can periodically check the sources for any changes such as newly posted content or updates made to existing content). In some embodiments, monitoring server 302 obtains content from the sources at a request by a user.

Monitoring server 302 provides content from these various sources and/or platforms to brand manager 306 via a user interface. In some embodiments, the user interface may be accessed through one or more accounts, for example where each account is associated with a different person or employee who is involved in the monitoring and/or managing of comments or posts. In one example, the content relates to a band and people associated with the band (e.g., the manager or agent of the band), the band's record company (e.g., the band's contact or manager at the record company) or other music industry professionals (e.g., publicists) each have an account and may access the content from the various sources using the user interface by logging in using their respective accounts and accessing the user interface. In some embodiments, each account at the user interface may be accessed by one or more users (e.g., there may be more than one publicist working on the account and all publicists use the same publicists' account).

Monitoring server 302 may receive an action to be taken with respect to one or more posted content. In some embodiments, monitoring server 302 may perform the specified action and present a result of the action. In various embodiments, the action is selected and inputted into the user interface by a user. In some embodiments, the received action entails receiving text to be published at the source (e.g., a response to a posted content such as "Thanks! We're glad you love our products!" in response to the comment "I love Tummy Rub dog toys!") and publishing the received text at the source. The received text may appear at the user interface and may be grouped with the display of the original post so that brand manager 306 knows that the action has been taken and the content on which the action was performed. In some embodiments, a posted content may be deleted and such a deletion is reflected at the source (e.g., commentator 306 posted a negative and/or inappropriate comment such as "Tummy Rub dog toys suck." on the Facebook account of Tummy Rub dog toys; deletion via the user interface is performed at the user interface as well as on the Facebook account of Tummy Rub dog toys). In some embodiments, a reply to or a deletion of a posted content is only possible at the user interface if the user is also an administrator of the source at which the action is to be performed (e.g., continuing the example above, the person doing the deletion has the username and password of the Tummy Rub Facebook account and thus has ability or authorization to delete content on the Tummy Rub Facebook account). In some embodiments, monitoring server 302 performs a reply or deletion by communicating with the API of the platform with which the source is associated.

Besides replying to or deleting posted content, monitoring server 302 may receive instructions to perform other actions and perform such actions on the (selected) content. Other actions include assigning or selecting a sentiment for a piece of posted content, assigning a posted content to a user, republishing the posted content, filtering the obtained posted content based on selected keywords, among others. More information regarding the actions is disclosed below.

Monitoring server 302 may also store historical information regarding posted content. In some embodiments, historical information may include the time when each piece of content was posted, with which source and platform the content is associated, whether an action with respect to the content has been performed, to which user the posted content was assigned, among other information. In some embodiments, monitoring server 302 may store historical information and/or group the stored information based on, for example, the related platform, assigned user, date/time, and action that is associated with the content.

Brand manager 306 communicates with monitoring server 302 over network 304 to select sources to monitor, view the content posted at the sources, and perform actions with respect to the posted content. Brand manager 306 may communicate with the monitoring server via a computing device or mobile device (e.g., smart phone or tablet). In some embodiments, monitoring server 302 adjusts the display of content depending on the type of device that brand manager 306 uses. For example, different viewing devices (e.g., devices from which the central interface may be accessed) may entail different sizes of displays. So, monitoring server 302 will adjust the display content to the appropriate format of whichever display size is used on the viewing device (e.g., monitoring server 302 may detect the type of device used through its access of the central interface). In some embodiments, brand manager 306 may provide information to monitoring server 302 via a user interface. In some embodiments, a brand manager or other user accesses an account on such a user interface by accessing a website (e.g., www.involver.com) and entering security or verification information (e.g., a user name, password, stored token, etc.). In some embodiments, other users besides brand manager 306 may access and utilize the user interface. In some embodiments, brand manager 306 may select at least one source to monitor through the user interface (not shown). Brand manager 306 consumes the posted content obtained from the selected source(s) via a presentation of the obtained content by the user interface. In some embodiments, brand manager 306 may select an action with respect to a presented content at the user interface.

Figure 4:
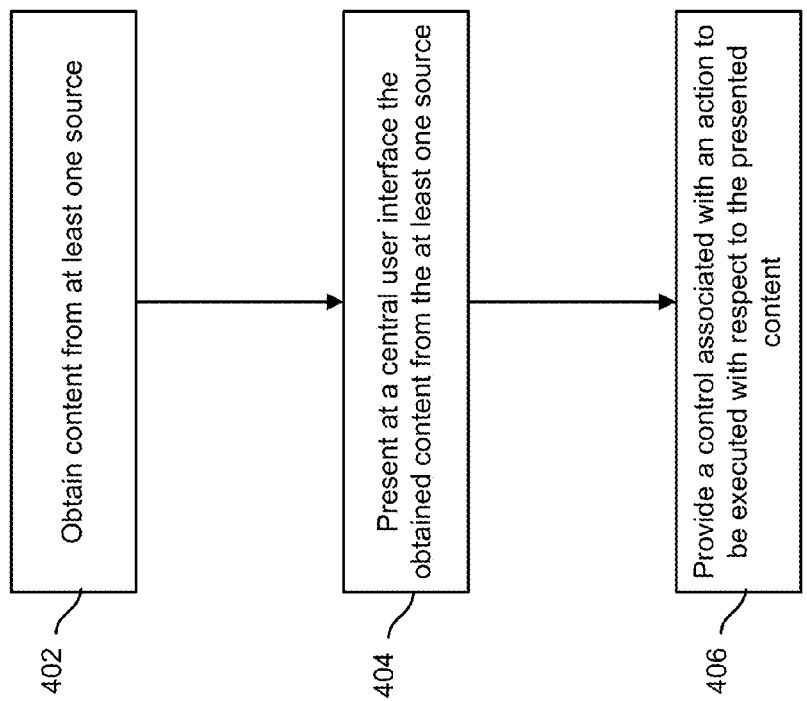
FIG. 4 is a flowchart illustrating an embodiment of a process for monitoring sources.

FIG. 4 is a flowchart illustrating an embodiment of a process for monitoring sources. In some embodiments, process 400 is performed by monitoring server 302 of FIG. 3. At step 402, content is obtained from at least one source. In some embodiments, one or more sources are identified by a user (such as a brand manager) and the identification information and any applicable authentication information is entered into a central user interface provided by a monitoring server (e.g., specifying that the source is associated with the Twitter account for Tummy Rub Dog Toys and providing the password for that account). The sources for which content is obtained may be associated with one or more platforms. For example, the process may obtain content associated with the Facebook platform (e.g., comments in response to a post on the Tummy Rub Dog Toys page on Facebook) as well as tweets directed to or flagging Tummy Rub Dog Toys on Twitter. In some embodiments, the monitoring server will obtain content by: pulling the content off the server associated with the source, communicating with an API associated with the platform that corresponds to the source, querying a server associated with the source for updated content, or any other appropriate technique. In some embodiments, content is obtained from the source(s) either periodically or at the request of a user. In some embodiments, the obtained content is stored at the monitoring server. The obtained content may be stored with relevant metadata (e.g., associated assignment to a specific user, time of posting, associated source's URL, associated platform, etc.).

In step 404, the obtained content from the at least one source is presented at a central user interface, e.g., as described in co-pending U.S. application Ser. No. 13/004, 796, filed on Jan. 11, 2011, which is hereby incorporated by reference in its entirety. In some embodiments, the obtained content may be displayed in chronological or reverse chronological order at the user interface. In some embodiments, the display at the user interface may be refreshed periodically or in response to the obtainment of newly posted content at the sources. In some embodiments, the obtained content is displayed at the user interface in accordance with the display configurations or requirements or selected sorting of the user interface (e.g., sort from oldest to newest, sort from newest to oldest, sort based on platform, sort based on prioritization, display based on a whether an action has been assigned or not, display content associated with selected type(s) of actions assigned to the content, show only content assigned to specified user(s), display only unfinished actions, a selected sorting based on creation time of a content, an algorithmically-computed importance of the content, a user to whom the content is assigned, a algorithmically-computed importance of a creator of the content, whether media is attached, or a sentiment assigned to the content etc.). In some embodiments, in the event that identifying information for a commentator who posted some content is available, such information is also displayed with the posted content at the user interface.

In step 406, a control associated with an action to be executed with respect to the presented content is provided. In some embodiments, the control may be an interactive area of the user interface (e.g., a clickable button, a pull down menu, radio buttons, input box, a selectable icon, etc.) that a user may select or click or choose in some manner specifying and action to be assigned or taken with that content and any related parameters, controls or specifications (e.g., if the action is to assign the content to someone, the parameter may be the assignee). In the event that a provided control is selected (e.g., by clicking on a button or selecting from a pull down menu), an indication of a selected control is received at the user interface presented by the monitoring server. In various embodiments, in response to receiving the indication, the monitoring server performs at least a portion of the action associated with the selected control.

A control is associated with an action and the action is to be executed for a presented content from at least once source. As mentioned above, some actions (e.g., replying to or deleting) to be executed with respect to a presented content may entail a corresponding update at the sources. Some actions (e.g., assigning a content to another user of the user interface) entail sending a notification to another user. Some actions (e.g., republishing content) entail publishing content at a selected outlet in which publication privileges are available. Some actions (e.g., assigning or selecting sentiment for a piece of content) entail selecting appropriate metadata (e.g., in the case of a binary sentiment, whether the sentiment is positive or negative) and storing that metadata at the user interface with the presented content.

Returning to the former example of the brand manager who wishes to monitor posted content at various sources, the brand manager may use an assignment feature to assign tasks to other colleagues. For example, the brand manager may come across content from a source that is presented at the user interface and discover that the content contains language that may potentially entail undesirable legal liability for the brand manager and the brands he manages. Thus, the brand manager can assign the relevant content to another user (e.g., an in-house attorney at the company of the brand manager) with more legal knowledge to review and possibly take action with respect to the content (e.g., delete the posted content). Also, the brand manager may include notes addressing his concerns with the assignment to inform the assigned user reasons for this assignments, points of interest, etc. In another example, the comment is related to a bug in software and the comment is assigned to a software developer or software tester. As another example of the use of the assignment feature is to spread the responsibility of monitoring a potentially large amount of incoming content among several members of a team. For example, for positive comments that simply require a thank you or acknowledgement, the comment may be assigned to a pool of interns. In some cases, they all use the same account (e.g., an intern account) or have individual accounts (e.g., in their own name).

Figure 5A:
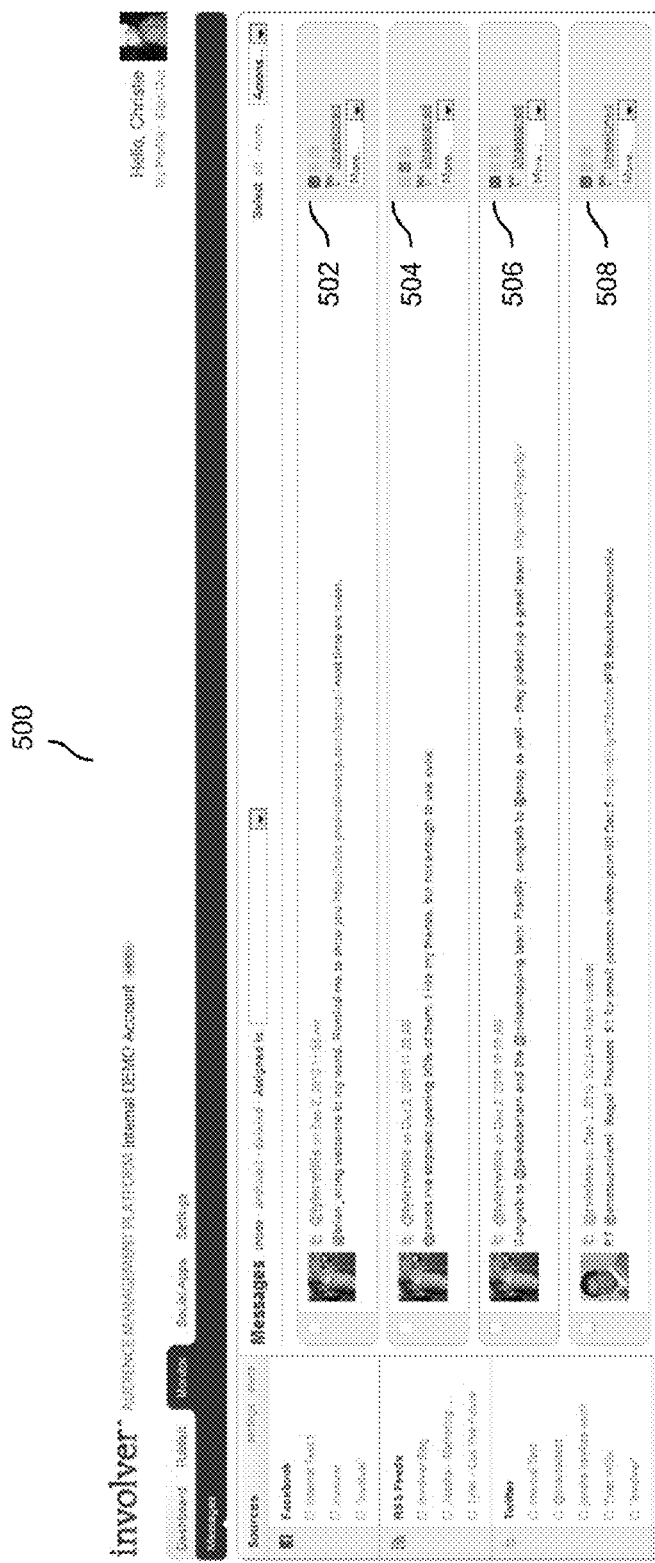
FIG. 5A is a diagram showing an embodiment of a user interface associated with assignment of sentiment to presented content.
Figure 5B:
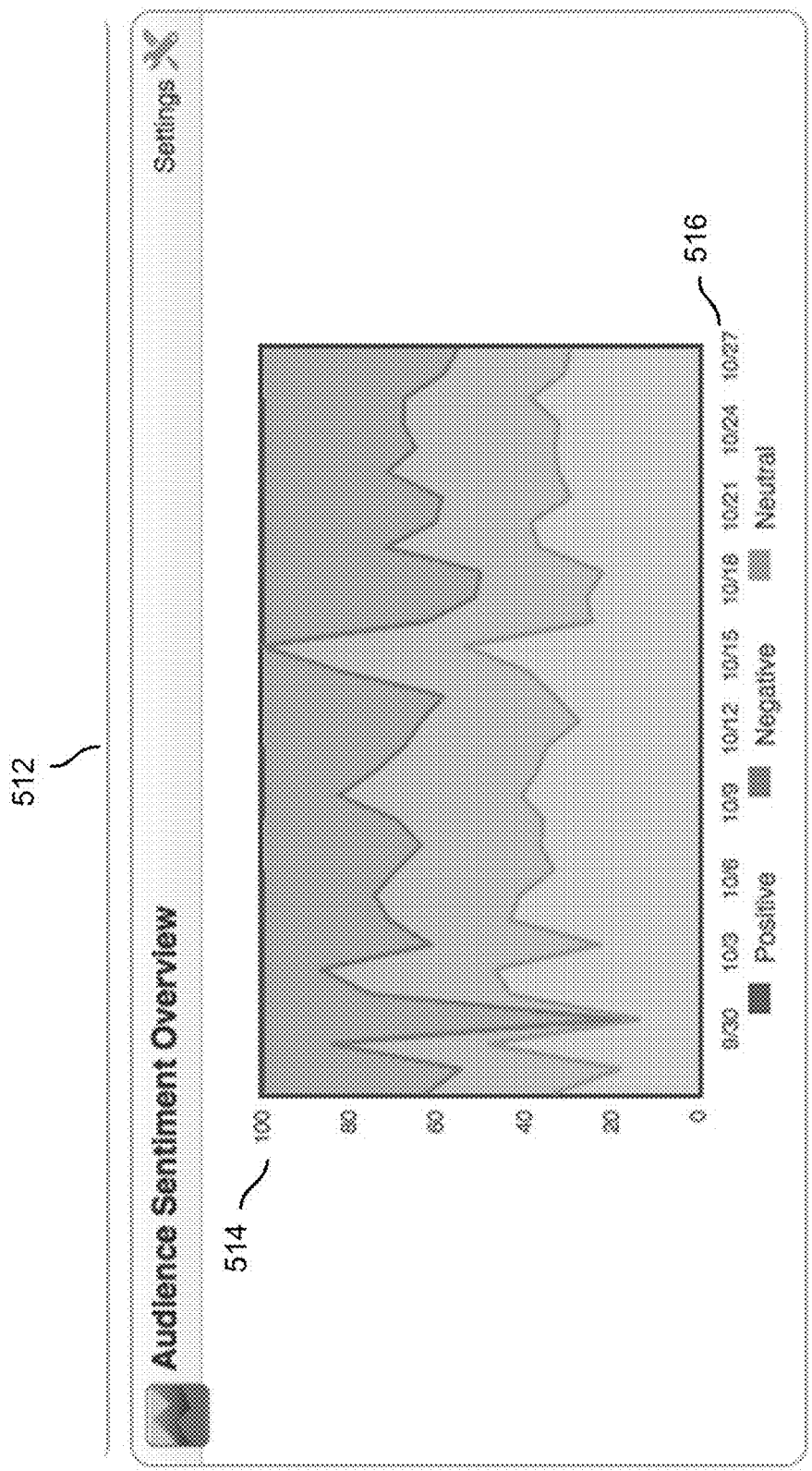
FIG. 5B is a diagram showing an embodiment of a plot of a sentiment graph over time for a monitored source.

FIG. 5A is a diagram showing an embodiment of a user interface 500 associated with assignment of sentiment to presented content. In the example shown, selectable areas 502, 504, 506, and 508 of user interface 500 each feature three sentiment icons. The left sentiment icon (selected in 502, 506 and 508) denotes a generally positive sentiment associated with the corresponding presented content. The middle sentiment icon (selected by 504) denotes a neutral sentiment and the right icon denotes a generally negative sentiment. In some cases (not shown) none of the three sentiments is selected and the associated content has no assigned sentiment. While only three sentiments are shown in the example of FIG. 5A, any number of sentiments may be used and/or axis of sentiment may be used (e.g., silly, hostile, confused, questioning, etc.). In some embodiments, a user interface permits at most one sentiment may be selected for the corresponding content. In some embodiments, assigned sentiments are tracked over time so that the history or progression of sentiment can be analyzed for trends (e.g., content at a particular source for a product is consistently positively received after the time at which a favorable review of the product is posted). One such embodiment of a plot of sentiment over time is shown in FIG. 5B. As shown in this example, a sentiment for a presented content may be manually assigned via a user interface by a user of the user interface. In some embodiments, a sentiment for a presented content is automatically assigned (i.e., assignment of sentiment is not done manually by users of the user interface). In some embodiment, the sentiment may be automatically assigned by a third party service (e.g., CrowdFlower) which may communicate with a server associated with the user interface to assign sentiment to the presented content. In some embodiments, a third party may assign sentiment based on automatic detection of certain keywords, natural language processing, or any other appropriate technique.

FIG. 5B is a diagram showing an embodiment of a plot of a sentiment graph over time for a monitored source. In the example shown, plot 512 includes two axes; vertical axis 514 includes the percent of positive, negative or neutral sentiments assigned to content posted at a certain monitored source and horizontal axis 516 shows a timeline that spans dates September 30 to October 27. In various embodiments, sentiment plots or graphs such as plot 512 may be generated by a user interface for presenting content from various sources. The parameters such as the relevant source and the relevant period of time (not shown) for the sentiment plots or graphs to be generated may be selected by a user of the user interface.

Figure 6:
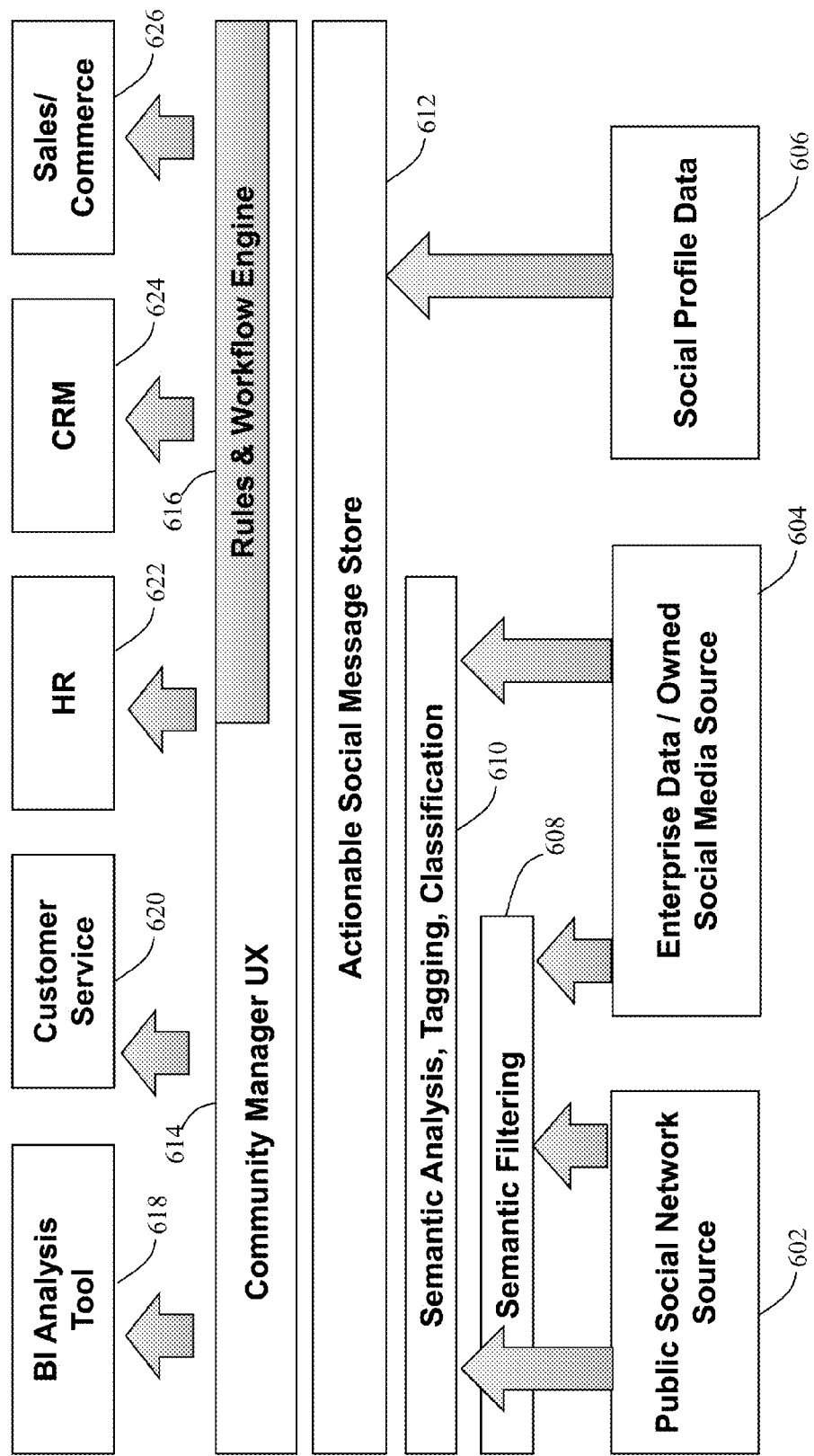
FIG. 6 shows an architecture for implementing a social media marketing and engagement framework according to some embodiments of the invention.

Social Media Marketing and Engagement FIGS. 6, 7, 8A, and 8B illustrate a method and mechanism to implement an approach for performing social media marketing and engagement. FIG. 6 shows an architecture for implementing a social media marketing and engagement framework according to some embodiments of the invention. Data from one or more social network systems are received into the system. The social data may be either public social network sources 602 or private social network sources 604. Public social network data/messages include, for example, publically available content from public blog sites, twitter messages, RSS data, and social media sites such as Facebook. Private social network data/messages include, for example, content from internal company social networking sites.

In some embodiments, the data that is received for processing includes non-social data. Such data includes, for example, enterprise data from the non-public sources 604, such as, email, chats, transcribed phone conversations, transcribed videos.

Semantic analysis is performed upon the received data. For example, latent semantic analysis (LSA), an advanced form of statistical language modeling, can be used to perform semantic analysis upon the social data. This permits the system to understand the contextual and semantic significance of terms that appear within the social data. This type of analysis can be used, for example, to understand the difference between the term "Galaxy" used for an astronomy contexts and "Galaxy" the name of a professional soccer team.

Semantic filtering 608 is a mechanism that is provided to minimize miscategorizations of the social data. Much of the social data is likely to contain content which is of very little interest to a business organization. Semantic filtering is used to remove the irrelevant material from the social data to reduce the occurrence of false positives, false negatives, and inappropriate responses/rejections within the actionable data. This permits the resulting data to be more relevant and accurate when provided to the enterprise applications.

In some embodiments, all social data content is subject to semantic filtering to reduce the excess "noise" of irrelevant data. In an alternate embodiment, only public social network content undergoes semantic filtering, such that the private social network content is not subject to the semantic filtering. This embodiment is based on the assumption that the public social network content is more likely to contain data of little interest to the enterprise. In yet another embodiment, both the public and private social network data are subject to semantic filtering, but the filtering is handled differently so that greater levels/intensity of filtering is imposed on the public data as opposed to the private data.

The system performs semantic analysis and classification 610 to the social media data. This permits the system to create and apply filters to identify themes, and to cluster together like-minded messages, topics, conversations, and content. There are numerous ways that can be taken to semantically categorize the social network content. The categorizations and classifications can be performed with an eye towards identifying, for example: (a) customer insights, preferences, and intentions; (b) demographic and social platform information; (c) industry and category trends and emerging themes; and/or (d) customer/consumer viewpoints, e.g., on price and product considerations, intent to switch services, and customer satisfaction. Other categorizations and/or classifications for performing auto-categorizations include, for example, items such as "intent to switch", "customer satisfaction", "brand influencer", "passive job candidate", "active job candidate", and "brand detractor".

Based upon the semantic analysis and classification, tags are identified and associated with the social network content. The tags correspond to areas of analytical importance with respect to the organizations that will be consuming the results of the system. For example, a business may seek to use the system to analyze social network data to identify: (1) sales leads; (2) customer relations issues and dissatisfied customers; (3) potential job candidates; and (4) HR topics. If these are the business' goals, then at least some of the tags associated with the classified social media content will, in some embodiments, correspond to identification of the content that pertain to these categories.

Social profile data 606 may also be accessed and associated with the originator of specific items of social network content. This profile data includes, for example, information about the social "importance" of that person, e.g., using Klout data and/or follower count. The profile data 606 may also include demographic information about the person, including information about the person's income, age, profession, and geographic location. This profile data is useful for many purposes. For example, messages created by a person having a very high Klout score or who has many followers may need to be placed onto a higher priority queue for processing. As another example, the demographic information can be used to direct a sales lead to the appropriate sales department, e.g., a sales lead associated with a person in California may be directed to a west coast sales representative while a sales lead from New York may be directed to an east coast sales representative.

When analyzing internal social data, employee profile data may also be accessed as part of the analysis for the internal social network content. When the person is an employee there is additional profile information that may exist for the individual (e.g., organization information—who is the manager/employee, job function, job level, peer group, location, etc.). As noted above, external influence may be analyzed, e.g., using a Klout score. Similarly, internal influence can similarly be analyzed, tracked, and/or leveraged using various data points, e.g., based at least in part on job role, responsibility, title, number of employees managed by person, and/or number of individuals in that person's organizational hierarchy.

The resulting set of data is the set of actionable social messages that is stored in an actionable social message store 612. FIG. 7 shows a table 702 of some example types of information that may be part of the actionable social message. Column 708 identifies a title for the message, e.g., based upon the "subject" or "topic" parameter associated with a given social media message. Column 710 identifies an internet/web link/address for the message. Column 712 identifies the specific source of the message. Column 714 identifies the type of the message source. Column 716 provides the date that's associated with the message. Column 718 provides some or all of the text associated with the message. Column 720 provides messaged quality data for the message, e.g., data regarding the readability, subjectivity, and/or tonality of the message. Column 724 identifies the name/contact that is associated with the message. Column 726 identifies any additional relevant social profile data that may be associated with the message and/or message originator.

Column 722 identifies the one or more tags that may be assigned to the message. As described above, semantic analysis and classification may be performed on the message to identify any tag(s) that should be identified and associated with the social network content. For example, row 704 corresponds to social message content that appears quite relevant to the customer service of the organization being commented upon (e.g., commenting upon bad customer service from foo.com as described in Column 718). Therefore, this message will be associated with the appropriate tag (e.g., "Customer Service") that corresponds to this area of importance to the organization that will be consuming the results of the system (e.g., the organization being commented upon in the message as having bad customer service).

As another example, row 706 corresponds to social message content that discusses the desire to purchase a consumer item (e.g., a desire to purchase a television from the foo.com organization as described in Column 718). Therefore, this message will be associated with the appropriate tag (e.g., "Sales Lead") that corresponds to this area of importance to the organization (e.g., foo.com) that will be consuming the results of the actionable message.

Returning back to FIG. 6, the actionable social messages are placed into an actionable social message store 612. In some embodiments, this actionable social message store 612 provides canonical storage for social content that business vertical systems can access.

A user interface 614 is provided to permit users to view and act upon the data within the actionable social message store. For example, a Community Manager UX (user experience) can be provided as the user interface 614. Using the Community Manager UX, a user can direct the flow of messages to appropriate personnel to take responsibility for performing pertinent actions with the messages in the actionable social message store. For example, actionable social messages that are tagged as a "Sales Lead" can be directed to sale personnel to contact the message originator to make a sale. Similarly, actionable social messages that are tagged as a "Customer Relations" can be directed to customer relations personnel to contact the customer, e.g., to have retention department personnel convince a dissatisfied customer to avoid changing service providers. Co-pending U.S. application Ser. No. 13/004,796, filed on Jan. 11, 2011, discloses an illustrative example of a Community Manager that can be employed in some embodiments of the invention, which is hereby incorporated by reference in its entirety.

The messages within the actionable social message store can be processed using any suitable processing mechanism. In one embodiment, manual processing is performed, whereby a user reviews the actionable social messages and manually takes action to direct the message to the appropriate destination. In an alternate embodiment, automated processing is performed using a rules and workflow engine. In this approach, a set of rules is provided in a rulebase, where the rules identify how the messages should be handled and directed within the organization. The rulebase can be constructed as a learning system, where feedback and a neural network algorithm are used to improve the handling of messages based upon looking at the results from past handling of messages.

The system then dispatches and/or creates the appropriate messages to be sent to destinations within the enterprise. For example, tickets can be sent to a social customer service tool 620, such as the RightNow cloud-based customer service product available from Oracle Corporation. As another example, the identity of possible employment candidates can be sent to an HR department/HR application 622. In addition, opportunities can be provided to a CRM system 624, where a record is automatically created and/or process in the system for the sales lead. Product data and comments can be provided to ecommerce tools 626, products, and groups, e.g., to the ATG product available from Oracle Corporation. An analysis tool/dashboard 618 (e.g., a business intelligence dashboard) may be provided over the actionable social messages to provide visibility by company decision makers using the analyzed data.

The dispatched messages can also be routed to the marketers of an organization. The marketers then use that information to create a new marketing campaign. Information to be provided to the marketer includes, for example, data about sentiments and/or trends within social media data with respect to brands and/or products of interest to the marketer or the marketer's company.

The messages to these vertical applications are dispatched based at least in part upon the tags that are associated with the data in the actionable social message store. When the other system takes action upon receiving the messages, then in some embodiments an update is provided in the actionable social message store with the update status of the message.

The system shown in FIG. 6 therefore provides a framework for integrating any part of a corporate infrastructure to handle social media data. When any new social media source is identified, then the inventive system can access and process that data like any of the other social data already being accessed—transparent to the corporate infrastructure that will eventually consume the results of that analysis. In addition, any new components/applications to the corporate infrastructure can be easily integrated, by configuring the rules within the Community Manager to address workflow paths to that new component/application.

Figure 8A:
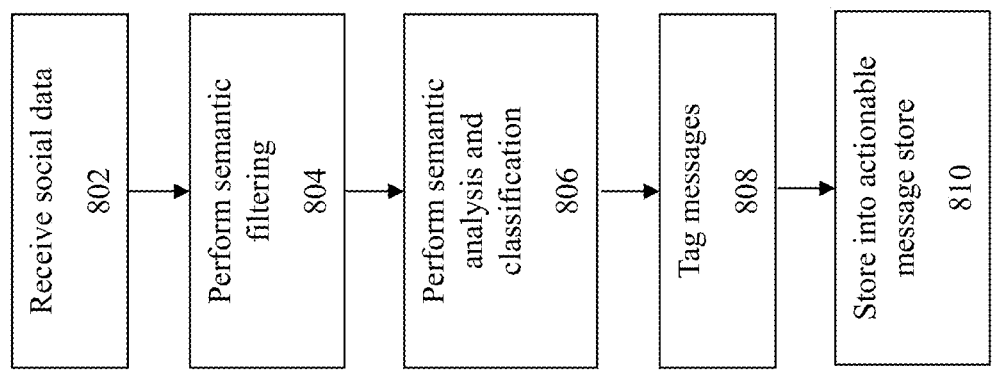
FIGS. 8A and 8B show flowcharts of approaches to implement a social media marketing and engagement framework according to some embodiments of the invention.
Figure 8B:
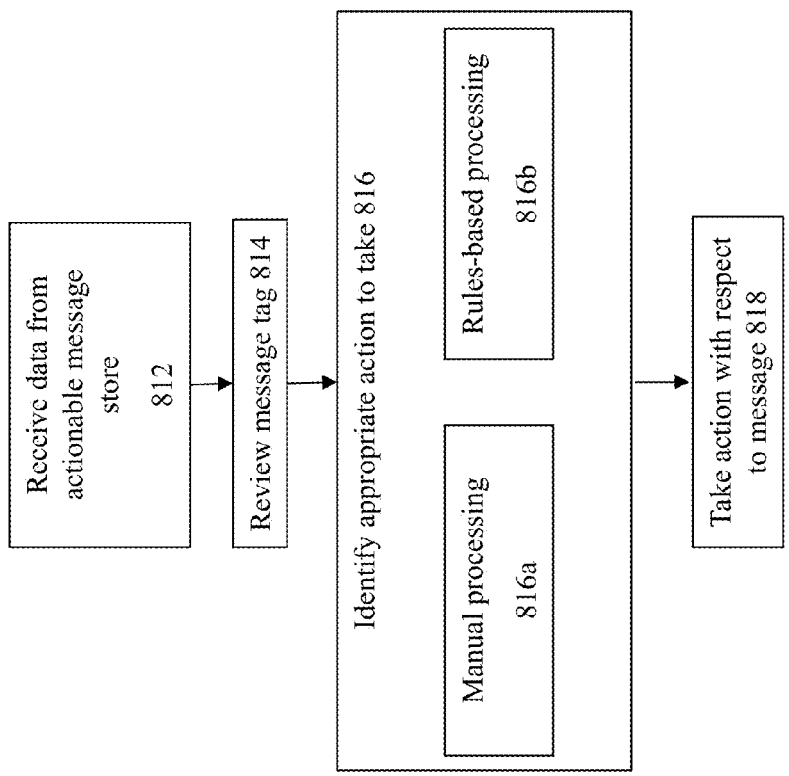

FIGS. 8A and 8B show flowcharts of approaches to implement some embodiments of the invention. At 802, the social data is received. As noted above, the social data may be received from any suitable source of the data, including both public and private sources of social media data.

At 804, semantic filtering is performed upon the social data. The filtering may be applied to some or all of the data. In some embodiments, different levels of filtering may be applied to different types and/or sources of data. For example, different levels of filtering may be applied depending upon whether the social data is public social data or private social data.

At 806, semantic analysis and classification is performed on the social media data. Based upon the results of the semantic analysis and classification, tags are identified and are associated with the messages/content, at 808. Thereafter, at 810, the actionable social messages are stored into an actionable social message store.

At 812, the data within the actionable social message store is retrieved for processing. The message tag is reviewed at 814. At 816, identification is made of the appropriate action to take with regards to the message.

Different approaches can be taken to process the messages in the actionable social message store. In the approach of 816a, manual processing is performed such that a user reviews the actionable social messages and manually takes action to direct the message to the appropriate destination. In the approach of 816b, automated processing is performed using a rules and workflow engine, where a set of rules is provided in a rulebase. The rules identify how the messages should be handled and directed within the organization.

Thereafter, at 818, the appropriate action is taken with respect to the message. For example, tickets can be sent to a social customer service cloud product, the identity of possible employment candidates can be sent to an HR department, opportunities can be provided to a CRM system, and product data/comments can be provided to ecommerce products and groups.

Another action that can performed is to assign action items and due dates based upon this data to key leaders in the organization (e.g., assign an action to marketing lead for internal communication strategy on key topics, assign action to HR lead for improving a key EE program, assign action to engineering to improve key metric, assign action to sales to share top number of wins and losses with key leaders, assigning an action to a recruiter).

This approach of FIGS. 6, 7, 8A, and 8B may be used in conjunction with, or instead of, the approach described in FIGS. 3, 4, 5A, and 5B.

Social Relationship Management System

FIGS. 9-15 illustrate a method and mechanism to implement a social relationship management system ("SRM" system or "SRMS" or "social relationship manager system"

or "manager") that allows marketers to manage their social media presence by assisting the marketers or advertisers to create, manage, and distribute messages or advertisements associated with one or more marketing programs present on multiple social media systems efficiently from a single user interface. A "marketing program" (which may also be referred to herein as, or in conjunction with, a "marketing campaign") corresponds to a series or grouping of advertisements or messages relating to a particular marketer, product, locality in which a product is offered, etc. Ads or messages associated with a given marketing program may span across many different social media systems, or be directed only to one such system. When one considers combinations and permutations of products, locations, and social media, the result can a significantly large number of messages and posts. Managing these messages or posts on a daily basis presents a gargantuan task. The social relationship manager disclosed here simplifies this task by acting as a conduit to enable marketers to interact either directly or indirectly with the marketers' social media systems. Specifically, content developers associated with the marketers can create multiple messages, schedule message delivery, and publish these messages either immediately, and/or at scheduled times on the social media systems of their associated marketer.

Each social media system has particular standards, rules, and messaging policies, which must be met to operate on that system. For example, some systems may impose a character limit on message text, while other systems may not allow multimedia messages. As used herein, the term "messages" refers to postings, advertisements, or other content published on a social media system. To ensure message compliance with the social media system, an embodiment of the social relationship manager customizes messages for each destination system according to predefined rules. If a destination system does not allow multimedia messages, for example, the manager may not allow a developer to attach media. Alternatively, the manager may simply remove an embedded image or video from a multimedia message before publishing it on the social media system. In order to make formatting decisions, the manager maintains a list of standards and rules pertaining to the social media systems, and compares the message to these standards before publishing the messages. The standards may be updated periodically, if required.

Alternatively, for example, if a certain social media system does not support multimedia messages, the manager may create a separate page with the complete message, and post a text message on the social media system with a link to the complete page. Any user may subsequently select the embedded URL to view the complete multimedia message. In this way, embodiments of the manager allow marketers to build multimedia messages for social media platforms that do not support these messages.

Figure 9:
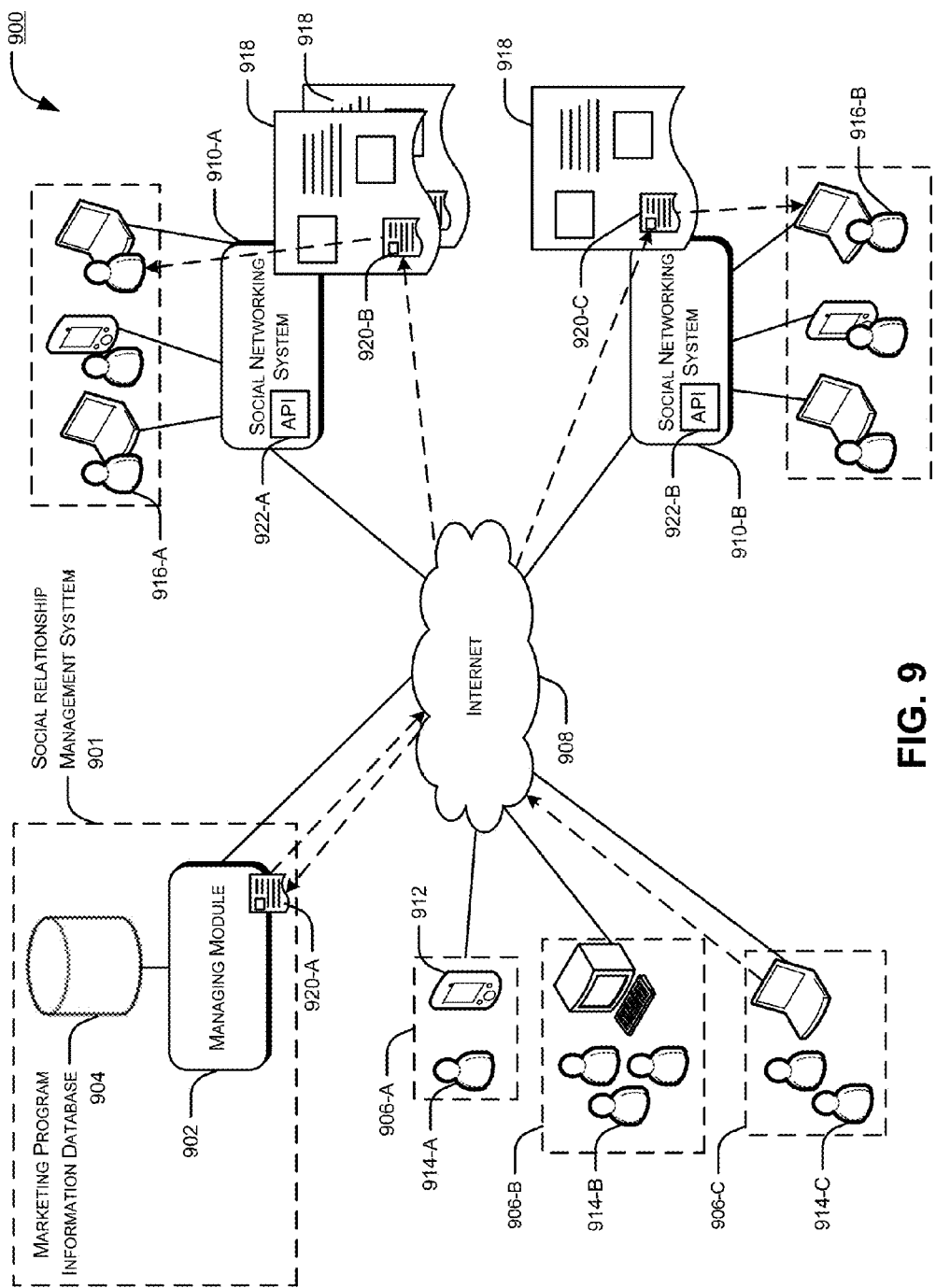
FIG. 9 illustrates an environment where embodiments of a social relationship manager may operate.

FIG. 9 illustrates an exemplary environment 900 where embodiments of a social relationship manager may operate. The environment 900 includes a social relationship manager (SRM) 901 including a managing module 902 coupled with a database, such as a marketing program information database 904. Clients 906 represented here by individual clients 906-A, 906-B, and 906-C, may access the SRM 901 through a network 908, such as the Internet to publish messages on the social media systems 910. As referred to herein, a "client" represents a marketer, such as a large company, that wishes to utilize the SRM to manage content on its social media systems. The clients 906 interact with the SRM 901 using one or more computing devices 912 (such as cell phones, PDAs, desktops, laptops, tablets, and notebooks). Developers 914, present on the computing devices 912, can develop messages for one or more marketing programs. As referred to herein, a "developer" represents an individual associated with a client that has access privileges to create advertising content of post to the client's social media system accounts. An example of a developer is an employee of the client within the client's marketing department. Moreover, multiple developers 914 may develop messages simultaneously for the same marketing program or for different programs.

FIG. 9 illustrates one developer 914-A associated with client 906-A, three developers 914-B associated with client 906-B, and two developers 914-C associated with client 906-C. It will be understood that different number of developers 914 are depicted in this figure merely to indicate that the SRM 901 may support one or more developers 914 for a single marketing program or client 906. Moreover, it will be understood that in actual situations the number of developers 914 (e.g., potentially very large number of developers) associated with a particular client 906 may vary considerably from time to time depending on a number of factors such as organization strength, number of active marketing programs, publishing patterns, and other such factors.

The SRM 901 may be connected to social media systems 910 through the network 908. Moreover, members of the social media systems (such as users 916) can access their respective system 910 through the network 908. As referred to herein, a "member" of a social media system is an end user of the system. Thus, the messages and content created by clients and developers will be generally targeted to social media system members.

As shown in FIG. 9, each social media system 910 includes an application programming interface ("API") 922 that enables embodiments of the present SRM system to interact seamlessly with the social media system. As is understood in the art, an API is an interface that enables the software systems of the social media systems to interact with the software systems of the SRM system. In this way, developers of clients can interact with the SRM system to create advertising content, messages, etc., schedule message delivery amongst many social media systems, and perform other functions without ever directly accessing a social media system. This enables more efficient and centralized management of a plurality of messages across many social media systems. This also enables various contributors with different access levels to coordinate and contribute content to a marketing program based on predetermined settings and rules not necessarily available directly through the social media systems' conventional interface.

Developers 914 access the social media systems 910 and publish messages/posts relevant to marketing programs on the social media systems. A message may typically include content, such as text, images, video, and the like. Users 916 may reply to the messages, post comments, send messages back to the developer, share messages with other users, etc. The overall purpose of the posts and corresponding user interaction is to create user interest in the marketer's goods or services—similar to traditional advertising. Embodiments of the present invention, however, obviate the need to access marketing programs individually to publish messages. Again, a client is able to manage many different marketing programs, messages associated with those programs, etc., across many different social media systems, or different pages/handles within those systems, all from one convenient user portal. Developers 914 gain access to the SRM 901 through which they can post multiple messages to multiple programs or multiple social media systems 910 at scheduled times or simultaneously. This feature will be illustrated with an example in the following sections.

Developers 914-C for Acme Coffee, a fictitious example company, create one or more marketing programs with one or more corresponding social media pages 918 on the social media systems 910. One social media system, such as system 910-A might carry Acme Coffee's corporate marketing program and two regional marketing programs. Similarly, another corporate marketing program may be active on social media system 910-B. Acme Coffee may want to publish a multimedia message relating to its marketing programs 918 on its corresponding social media system accounts. To do so, the developers 914-C login to the SRM 901 and follow an interactive user interface to create a multimedia message, such as message 920-A. The SRM 901 prompts the developers 914 to either schedule message delivery or publish immediately. The developers 914 may decide to immediately publish on system 910-A, and schedule delivery to the marketing program 918 on system 910-B after two hours (or two days, or three months, etc.). Aspects of the scheduling component of the present system are discussed in greater detail below.

The SRM 901, before delivery, formats the message 920-A according to the destination social media system. For example, the example system shown in FIG. 9 is utilized to create two formatted message copies—one message 920-B compliant with system 910-A and another message 920-C compliant with system 910-B. Subsequently, the SRM 901 saves the formatted messages and delivers message 920-B associated with its respective marketing program(s) on the system 910-A immediately and message 920-C to the system 910-B after the stipulated time. The SRM 901 may notify developers 914 whenever the message 920 is published, or at some time prior to publishing. Moreover, whenever users 916 access the social media system 910, they may be informed of Acme Coffee's publication and can respond to the message, view special offers or coupons, access Acme Coffee's separate corporate web site via a URL, view related multimedia content, etc. The SRM 901 tracks these responses for analysis.

Figure 10:
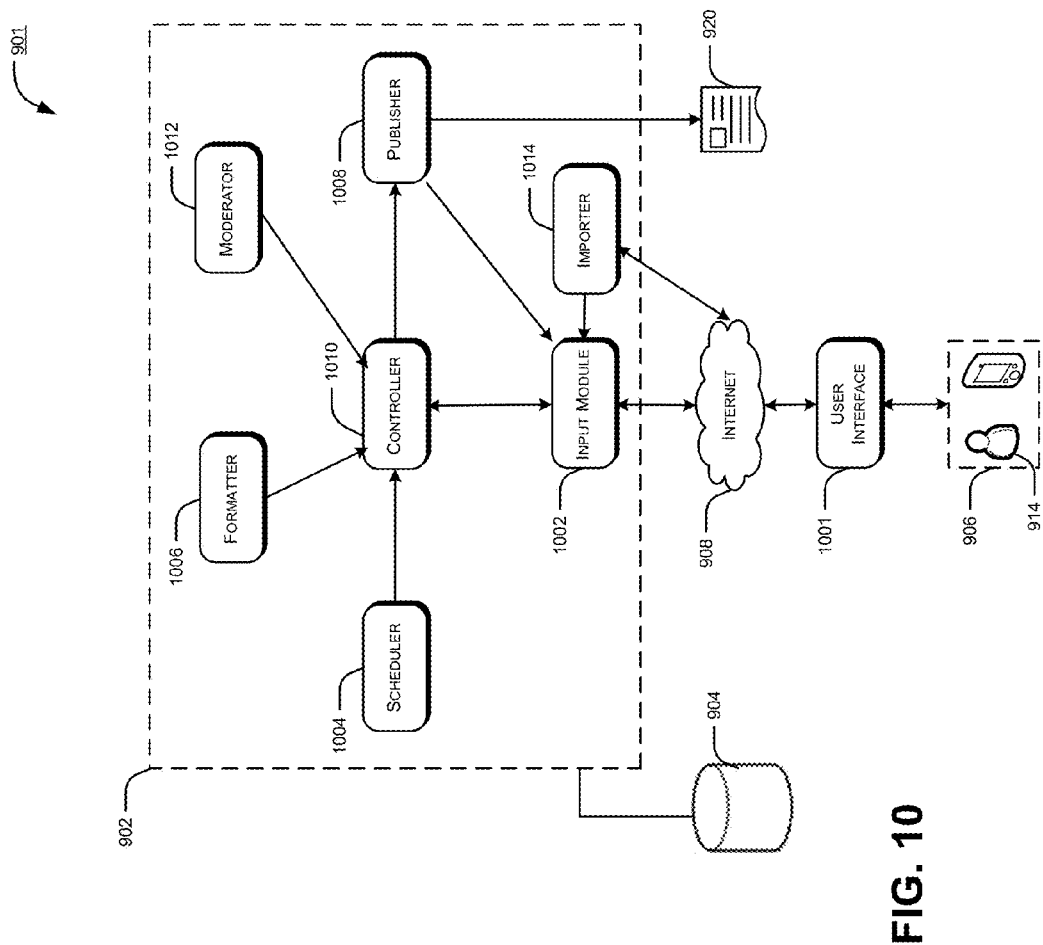
FIG. 10 illustrates an architecture for an embodiment of the SRM system for managing one or more marketing programs according to embodiments of the present disclosure.

FIG. 10 illustrates an exemplary architecture for an embodiment of the SRM system 901 for managing one or more marketing programs 918 present on multiple social media systems 910 according to embodiments of the present disclosure. As shown, the SRM 901 includes the managing module 902, the marketing program information database 904, and a user interface 1001, connected through the Internet 908 to an input module 1002 for accepting inputs and displaying system outputs (such as analytics relating to the success of one or more marketing programs and/or individual marketing messages). The managing module 902 further includes a scheduler 1004 for scheduling delivery of messages 920, a formatter 1006 for customizing message format according to the destination social media system 910, and a publisher 1008 for publishing the message on the destination marketing programs 918 at the scheduled time. The managing module 902 may further include a controller 1010 that allows collaboration between multiple developers 914, a moderator 1012 to maintain the quality standard of published messages and responses to the published messages. For example, the moderator 1012 may scan messages for defamatory or abusive language, names of a particular client's (marketer's) competitors, or embedded URLs, and it then flags any problematic messages, or removes them, or otherwise addresses them as dictated by a system user. The managing module 902 further includes an importer 1014 for monitoring and importing message responses from the marketing programs 918 in real time. The importer 1014 stores the imported responses in the database 904 for further analysis. Apart from these modules, the managing module 902 may include numerous other modules and databases, which will be described in detail in the following sections.

The user interface 1001 accepts input commands from developers 914, and notifies the developers of system functions related to the input commands back to the developers 914. The interface 1001 accepts instructions from developers 914 and forwards the instructions to the input module 1002 that further utilizes this information. The user instructions may include prompts to login to the system, or other system management instructions, as desired.

The scheduler 1004 allows developers 914 to schedule message posts or distribute marketing content with short-term or long term marketing programs. By way of example, the scheduler 1004 may allow developers 914 to create multiple messages on a single day and schedule message delivery at precise times in the future. In this way, developers 914 can plan strategies and schedule messages for an entire week, month, or year, etc. in advance. The scheduler 1004 operates in conjunction with the publisher 1008. The developers 914 schedule message delivery, and the scheduler 1004 instructs the publisher 1008 to publish the message content to the destination marketing programs 918 at the scheduled time.

The scheduler 1004 granularity may be configured as desired. For instance, in some cases, the scheduler 1004 may allow developers 914 to select the delivery date; in other cases, the scheduler 1004 may allow developers 914 to select both date and time. Further, time selection granularity may also vary. For example, the scheduler 1004 may allow time selection from one-hour intervals, half-hour intervals, 15-minute intervals, or some other predetermined arbitrary time interval.

Additionally, the scheduler 1004 may repeatedly publish the same message over time. Acme coffee, for instance, may distribute free coffee coupons on the first day of every month. Instead of creating a new coupon every month, a standard coupon may be created once, and scheduled for delivery on the first of every month. Alternatively, Acme Coffee may decide to give away 100 free coffees. In this case, a free coffee coupon may be published every day or every week, until 100 users 916 (i.e., members) respond to the coupon.

The formatter 1006 ensures that messages adhere to the rules and policies of the destination social media system 910 regarding font size, text type, maximum number of characters allowed, whether multimedia is allowed, and other similar details. Rather than requiring developers 914 to remember such rules, the formatter 1006 may allow developers 914 to create a desired message and later check the message for compatibility with the destination media systems. The formatter 1006 may subsequently prompt the developer 914 to modify the text according to the rules, automatically modify the text to comply with the rules, or it may automatically insure corrections, as determined by the system.

Alternatively, the formatter 1006 may simply not allow developers 914 to create messages that do not comply with destination system rules. If the character length of certain media system 910 is set to 250 characters, for instance, the formatter 1006 may prevent the developer 914 from entering text beyond 250 characters. Similarly, if a certain media system 910 does not allow multimedia messages, instead of permitting the developer 914 to attach media and subsequently informing the developer 914 of the media rules, the formatter 1006 may not permit the developer 914 to attach media in the first place, by either hiding or deactivating that option. In one embodiment, if one general message is created for distribution to many different social media systems (each with varying format requirements), then the SRM system may format the message according to each systems' requirements, and then prompt the contributor to change or modify the message for each social media system in which the message may be noncompliant.

In addition to rules and requirements mandated by each different social media system, developers 914 or clients may configure rules and thresholds for the different social media systems 910 with which all of the associated developers must comply. The formatter 1006 may subsequently assess the messages according to the rules and raise flags, prompt the developer 914 to modify the message, automatically modify the message, or restrict the developers 914 from creating a message that would violate the configured rules.

Further, the formatter 1006 may convert any URL that is embedded into a message into a shorter URL. URLs may be shortened for various reasons. For example, for social media systems that impose character limits, adding very long URL links could potentially exhaust valuable message characters. Those skilled in the art will understand that users are more likely to click-through shorter links than longer ones. For these and other reasons, the social relationship manager shortens URLs to a particular format, which redirects the user to the actual URL using a 'Meta Refresh' technology. One advantage of using Meta Refresh to redirect the user to the desired URL is that the user first lands on the link created by the social relationship manager before being redirected to the actual URL. This initial landing allows the social relationship manager to track the number of click-throughs to a site even though the destination URL is not associated with the social relationship manager. Through this tracking, the social relationship manager can gain valuable insights about user behavior, message success, and so on.

According to one embodiment of the present system, the formatter 1006 saves the original URL and the shortened URL in a lookup table in the database 904. When a user clicks on the shortened link, the user lands on the short link, and after either a short interval or no interval, the user is redirected to the actual URL.

The publisher 1008 receives instructions from the scheduler 1004 or directly from the formatter 1006 to publish the message associated with its selected destination marketing programs 918 on the corresponding social media systems. As will be understood and appreciated, a message need not necessarily be associated with an overarching marketing program—messages may be separately contained for smaller, "one off" type advertisements. For scheduled messages, message details are stored in the database 904. The publisher 1008 retrieves the message along with message details such as an associated marketing program, destination social media system(s), and scheduled delivery time from the database 904 before publishing the message. Moreover, if for any reason, the publisher 1008 is unable to publish the message to a particular program, the publisher 1008 may generate and circulate an error report to a client and/or its developers. Further, the publisher 1008 may be configured to retry publication for a predefined number of times at predefined intervals. The publisher 1008 may also be configured to deliver publication notifications to the developer's (or client's) email address, cell phone, or some other delivery mechanism, either before or after publication of the message. It will be understood that other notification techniques are contemplated and within the scope of the present disclosure.

The controller 1010 is utilized to set up collaboration accounts, permitting multiple developers 914 (such as entire marketing team) to collaborate, share, and work together on marketing strategies, campaigns, or even individual messages. For example, in one embodiment, a lead developer associated with a client will control the overall operations of that client's marketing programs, and will correspondingly control access rights and other functions relating to the client's SRM system account. In this circumstance, the lead developer acts as the "client" (e.g., the company) to make decisions regarding the client's marketing efforts on various social media systems. The lead developer with an existing account on the social manager may invite multiple developers 914 to join the team. Upon approval and acceptance of the invitation, new developers 914 may fully participate in development activities. The inviting developer 914 may set access rights for the invited developers 914. For instance, the controller 1010 may allow developers 914 to only create; create and edit; or create, edit, and publish, depending on their access rights.

Using the controller 1010, team members may set reminders to complete tasks, create marketing calendars, set alerts, edit each other's work, work together on certain messages, or configure notifications for message publication.

Because messages are published on social media platforms that are accessible by the general public (i.e., members of those systems), developers 914 cannot always control the content of responses to a message or ancillary comments/posts on the client's social media sites. Thus, it may be important to screen user responses to filter out undesirable language or content. To accomplish that result, the managing module 902 includes a moderator 1012, which screens responses to published message and filters content. For example, the moderator 1012 may filter abusive words, competitor names, racist language, sexist terms, links, images, videos, audio and any other content deemed undesirable. The moderator 1012 performs this function by comparing each response with a database 904 of prohibited words, specially-identified content items, etc., which are updated at regular intervals. The parsing techniques are known to the art and may be used if desired. If the moderator 1012 identifies any message with a prohibited word, the moderator 1012 may flag the message and notify the developer 914 for action. Alternatively, the moderator 1012 may automatically remove the message from the marketing program 918 and send a notification to the developer 914. The developer 914 may consequently decide whether the message should be permanently deleted or reinstated. The filtered content may include URLs on a "no-show" list, where users placed on a "banned" list of persons identified as posting undesirable content.

In addition to harmful content, the moderator 1012 may also scan messages for good content, such as praise of client products, interest in specific products, or service appreciation. These messages may also be flagged. Developers may utilize this information to distribute incentives, or loyalty coupons to such users 916. Moreover, these messages may also be utilized to improve product lines, etc.

The importer 1014 extracts information from member/user responses to the messages associated with marketing programs 918 on the social media systems to perform various analytic functions, generate metrics, and provide reports. In one embodiment, the importer 1014 monitors the marketing pages and extracts any responses to a published message. In one embodiment, the overall goal of the member responses and corresponding analytics is to determine the relative success of various marketing programs and messages, and identify helpful information regarding marketing of the client's products. The importer 1014 may also maintain a tracker for counting useful numbers, such as the number of message replies, plays, and the like. This information can serve as inputs to various analytical programs known to those in the art. Further, the actual messages may also be extracted and stored in the database 904 for analysis. Users 916 may present recommendations, suggestions, or interests, and that input will be useful for generating future marketing strategies. Reports, such as interactive charts, and graphs, can be generated on a planned or ad hoc basis.

Moreover, the importer 1014 extracts performance information from the marketing programs 918 as a whole or overall, such as the number or fans or followers, as well as new requests and program activity. Based on this information, developers 914 may set alerts for event notification, such as a sudden change in the fan base.

The database 904 stores information about clients, their marketing programs 918 and the associated information, such as published and unpublished messages, and the program metadata, such as the identity of developers 914 and the like. The database also stores message detail information, contributor information, marketing program metrics, and other similar types of information. The database 904 may be refreshed in real-time by the other modules and stale data may be purged as desired.

Figure 11:
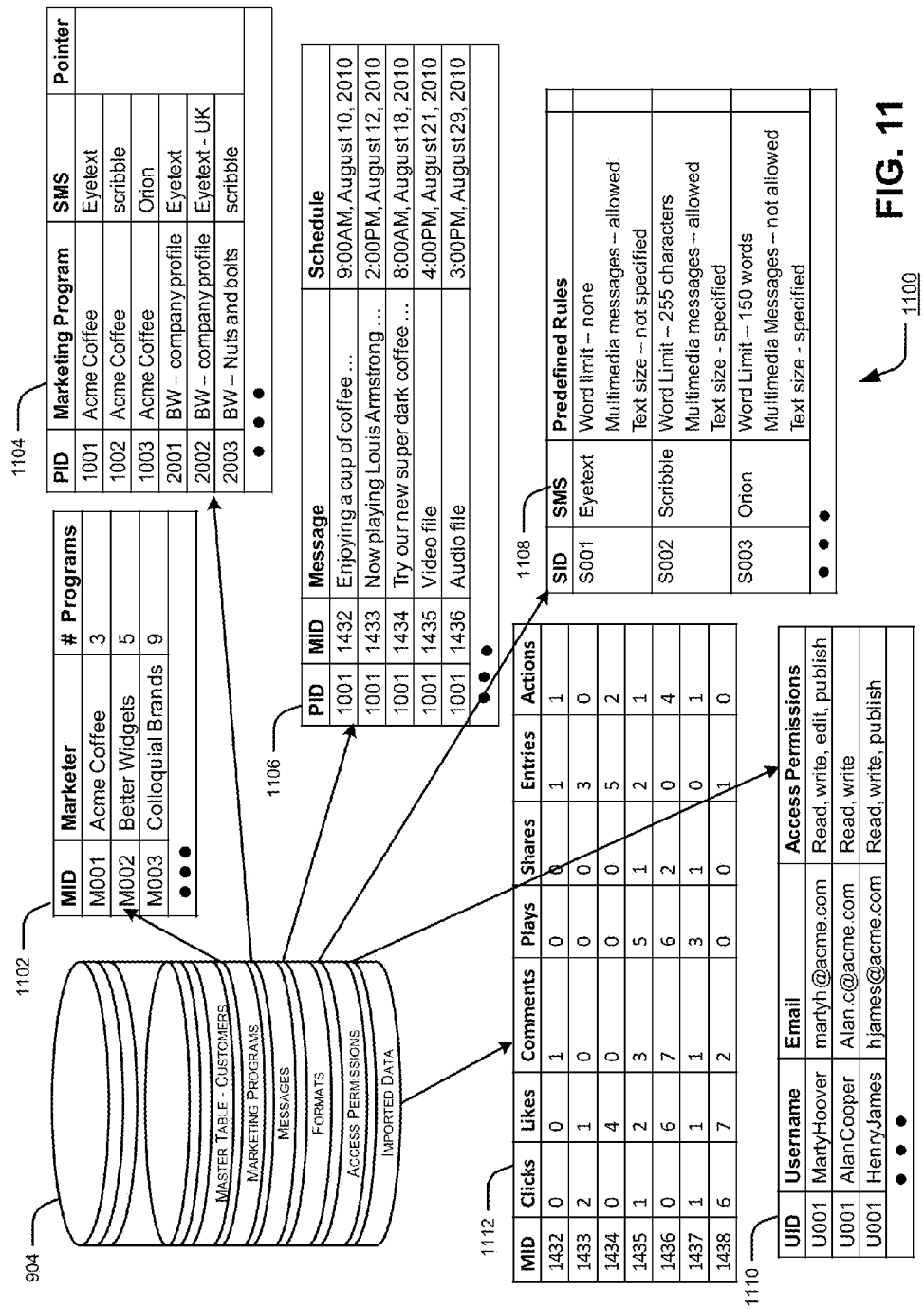
FIG. 11 illustrates an example database schema for a SRM system.

FIG. 11 illustrates an exemplary database schema 1100, which may store data in a relational fashion. A typical relational database includes multiple data tables that include pertinent information, each table to which other tables can link. FIG. 11 illustrates some exemplary tables that may be present in the database 904. It will be understood, however, that the number of tables, as well as the data fields and the relations among them may vary depending on the particular embodiment.

The schema 1100 includes a master client table 1102, which catalogues the active clients 906. This table typically includes unique client IDs, and other useful client details. It will be appreciated that other fields may also be contemplated, within the scope of the present disclosure.

The client table 1102 may be associated with one or more marketing program tables, such as marketing program table 1104. The database 904 may maintain separate marketing program tables 1104 for the clients, or it may store marketing program details in one large table. Here, the schema 1100 illustrates a larger table caching details of active marketing programs 918. Some exemplary data fields in this table include unique program IDs, program name, associated social media system, date of activation, date last updated, number of active followers, fan, or members, program description, etc. This table 1104 in turn may be associated with a number of message tables 1106. The database may maintain separate message tables 1106 for each marketing program 918, or may store messages pertaining to a client in one single table. This table 1106 stores information relating to individual messages, such as unique message IDs, message titles, message description, message type, creation date and time, publication date and time, embedded URL, author, etc. Other data fields may also be contemplated, such as count of responses, likes, comments, shares, and plays, flags; response messages; or number of revisions.

In addition to these tables, the database 904 may include other tables and data fields that the managing module 902 may utilize in certain embodiments. The database 904, for instance, may include a table, such as format table 1108 that stores information about different formatting standard rules and policies adopted by the active social media system 910. Exemplary fields of this table may be social media system ID, social media system name, required format, best practices, etc. The database may incorporate another table that maintains information about the active developers for the marketing programs 918. Typical fields in this table (table 1110) may be user ID, first name, last name, username, password, email address, phone numbers, social media profiles, access permissions, and other such developer related fields. Further, the database may include a table that stores analytics and information relating to social media system member interaction with messages and marketing programs such as number of responses to a message, number of likes, shares, click-throughs to linked pages, etc. As will be understood and appreciated, some "responses" to messages will include social media-specific responses, such as the "like" or "share" option offered by Facebook. A few exemplary fields are illustrated in table 1112 in FIG. 11.

It will be understood that the database 904 may maintain numerous other tables not illustrated here. For example, a table that stores alerts, reminders, and triggers for a certain marketing program or client may be present. Similarly, the database 904 may maintain a table for shortened URLs and their corresponding actual/longer URLs. As will be understood and appreciated, the specific tables and corresponding data items shown in FIG. 11 are presented for illustrative purposes only, and other types of data as will occur to one of ordinary skill in the art may be utilized according to various embodiments of the present system.

The database 904 may be updated in real time or on an intermittent basis. As will be further understood, the specific database shown and described is intended to be illustrative only and actual embodiments of the SRM 901 may include various database structures, schemas, etc.

Figure 12:
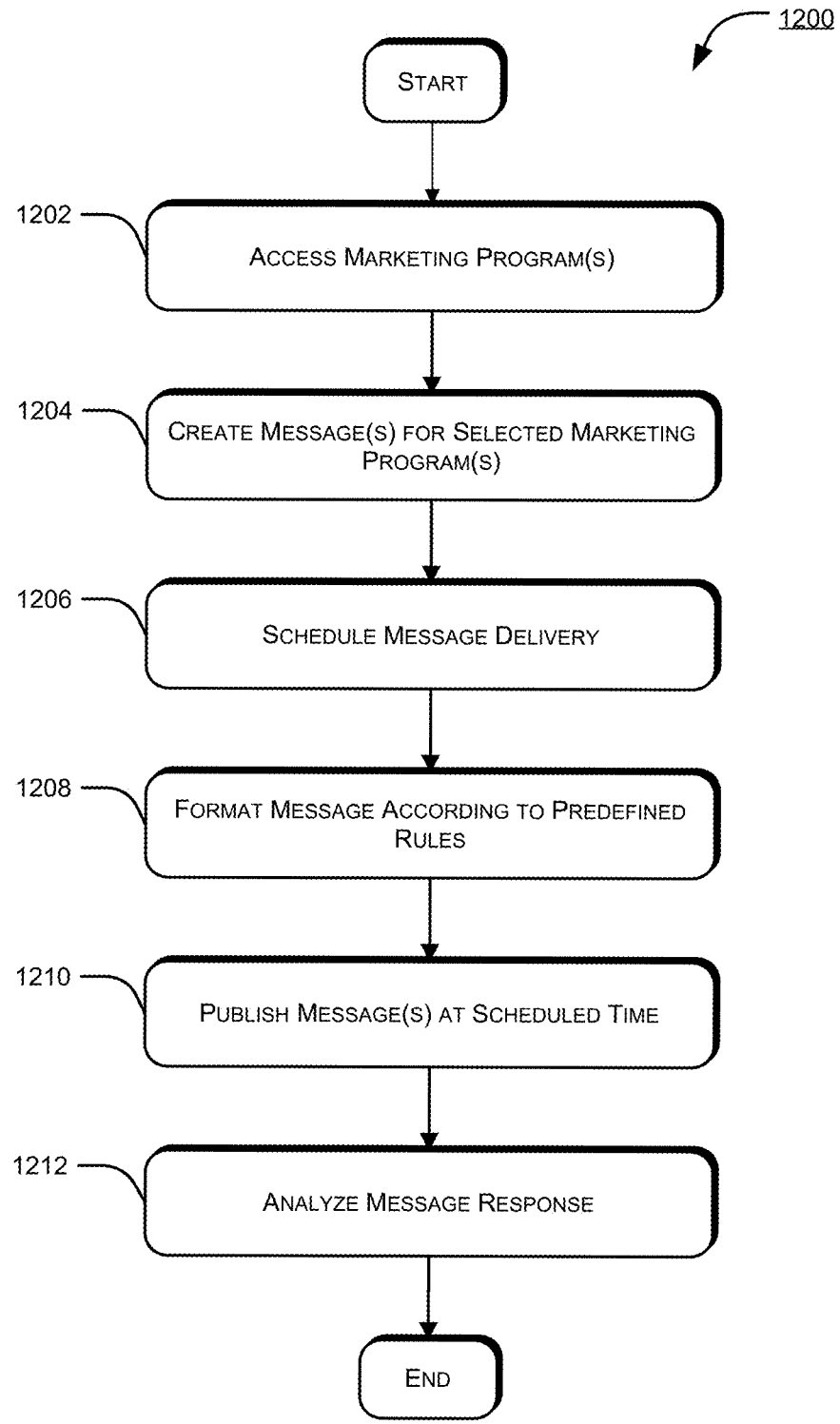
FIG. 12 illustrates an example method for managing one or more marketing programs on multiple social media systems.

FIG. 12 illustrates an exemplary method 1200 for managing one or more marketing programs 918 on multiple social media systems 910. The method begins at step 1202 where a client 906 representative (such as a lead marketing developer) accesses one or more marketing programs 918 present on multiple social media systems. A developer 914 may login to the SRM 901 via the user interface 1001 by providing identification details.

The marketing programs 918 may already exist, or the client may create these programs as required. According to one embodiment, "creation" of a marketing program simply represents the designation of basic information about a marketing campaign, such as a name, duration, etc. Once the required marketing programs 918 are created, upon authorization, the developer 914 adds or activates the marketing programs 918 on the SRM 901. Developers may access their marketing programs to authorize access rights for the given program. Authorization and addition of the marketing programs onto the SRM 901 allows the SRM to publish messages in connection with the program, monitor the program, and extract information about the program as required. As will be understood and appreciated, according to one embodiment of the present system, step 1202 in FIG. 12 is optional, and an overarching marketing program need not be created for all message content to be delivered to various social media systems. For example, a marketer/client/developer may wish to simply post a singular message not associated with an overall marketing program to one or more social media systems. In this case, the message is simply created individually, and is not associated with a marketing program.

Once the desired marketing programs are added, a homepage greets the developer 914. From here, the developer 914 may view multiple items such as published or unpublished messages, flagged responses, message calendars, reminders, tasks due, active marketing programs, or lists of associated developers. In addition, the developer 914 may perform actions such as create a message, change access rights, preview messages, modify unpublished messages, create graphs, and other such management specific actions. As will be understood and appreciated, the homepage acts as a starting point for managing messages and marketing programs for a client's social media system advertising.

At step 1204, the user (i.e., developer) creates a message for use in connection with one or more destination marketing programs 918 to be eventually displayed on one or more social media system portals to social media system members. To create the message, the developer 914 first logs-in to the user interface 1001, and instructs the user interface 1001 to display a message creation interface, or a message modification interface. The message creation interface may include drop down menus, service buttons, or may require the developer to type in a query or response. The developer 914 may enter text, embed a URL, or add media, such as images, video, audio, coupons, or forms. Further, the developer 914 may select destination marketing programs 918 from a list of active destination programs. In this way, a developer can select a message to be delivered in connection with a marketing program that spans many different social media outlets, all from a singular location. The interface 1001 may also allow developers 914 to alter, modify, or enter new text depending on the destination social media system 910. If, for example, one social media system 910 is more informal that the others, developers 914 may alter the message content to create an informal message. Or, for example, if a given social media system has a character limit on the number of text characters that can be displayed in connection with any one message, the message creation interface may display a "char left" indicator showing how many characters the message has left until it reaches its limit.

At step 1206, the user schedules message delivery. The developer 914 may schedule delivery at a predetermined time or publish immediately. Moreover, the scheduler 1004 may permit scheduling different delivery times for the destination marketing programs 918 or the destination social media systems 910. Alternatively, the scheduler 1004 may permit developers 914 to configure one delivery time to publish the message on the social media systems. The scheduler 1004 may also schedule repeated delivery of a message if desired.

The method proceeds to step 1208 where the formatter 1006 customizes the message format according to predefined rules corresponding to the destination social media system 910. As described previously, social media system 910 messages may vary based on required standards, such as rules, policies, and formats. For example, such rules or policies include character limits on messages, content requirements, prohibitions on certain types of multimedia content, formatting issues, etc. In addition to these standards, different social media systems 910 may possess unique characteristics; for instance, users of some systems may be accustomed to communicate through short, witty, one-liners (e.g., Twitter), while users of other systems may be comfortable with longer and fuller messages (e.g., Facebook), and others may be familiar with formal or professional messages (e.g., LinkedIn). In order to publish the most effective messages, in addition to the required standards, developers 914 may also be aware of these system specific nuances and characteristics. The formatter 1006 aids developers 914 to publish the most appropriate message for a particular destination social media system 910, by prompting developers 914 to modify messages or by automatically editing messages according to configured rules. The formatter 1006 may, for instance, prompt the developer 914 to change the message tone for a particular destination system 910. Alternatively, the formatter 1006 may remove attached media from a message if the destination system 910 does not allow multimedia messages. Functionality of the formatter 1006 will be described in detail with reference to FIG. 13.

At step 1210, the customized message is published on the selected destination social media systems in connection with the corresponding marketing programs 918 at the scheduled time. The publisher 1008 may utilize one or more publication techniques, such as interfacing with each social media systems' API to publish the message according to the social media system's protocols and requirements. Moreover, it will be understood that other message publication methods, known in the art, are not beyond the scope of the present disclosure.

Figure 14:
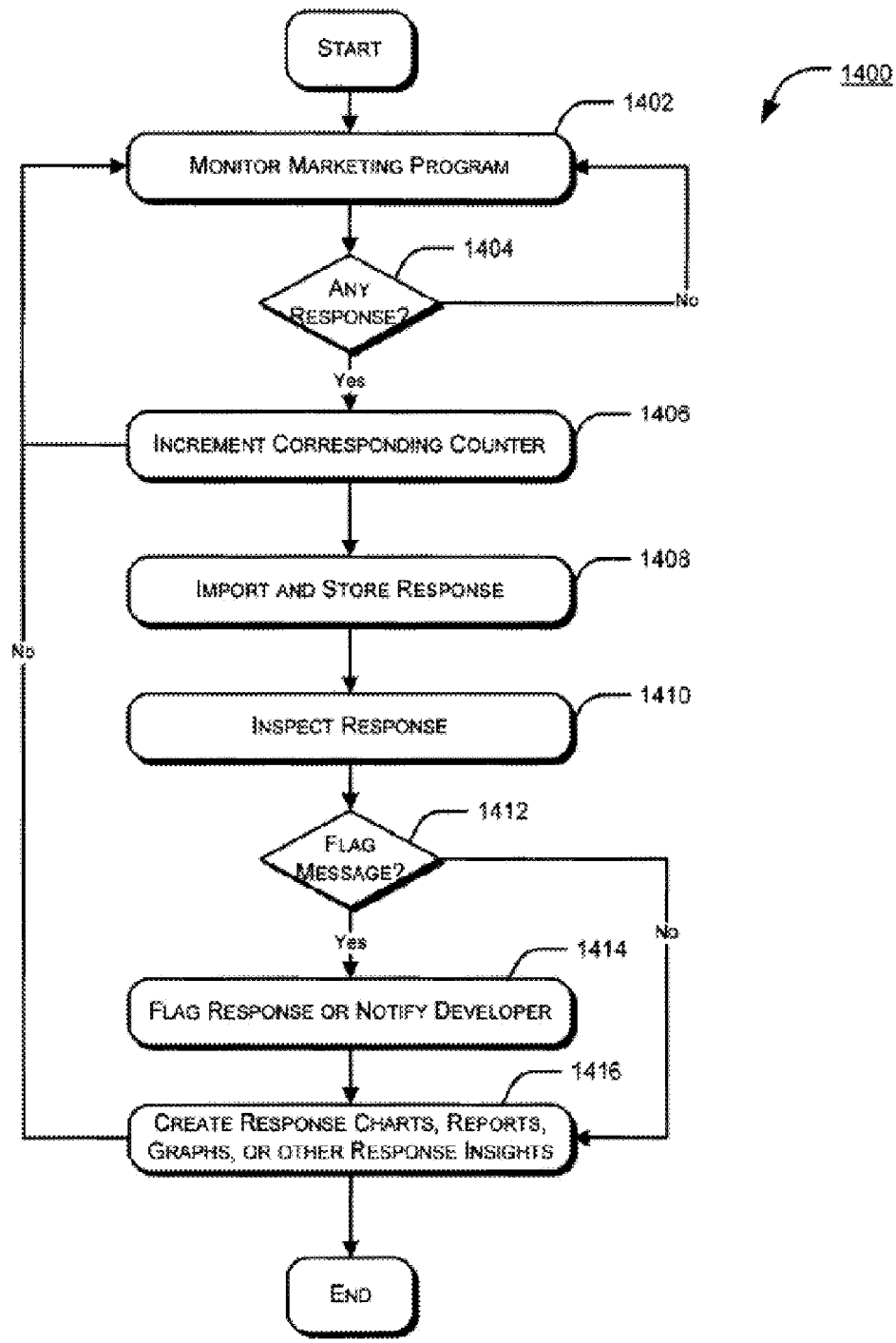
FIG. 14 is a flowchart illustrating an example method for analyzing message insights according to some embodiments of the present invention.

Finally, at step 1212, the importer 1014 may monitor the social media systems for responses to the published messages. The responses may be extracted and stored in the database 904 for analysis. FIG. 14 illustrates these monitoring, tracking, and analyzing functions of the SRM 901 in detail.

Figure 15:
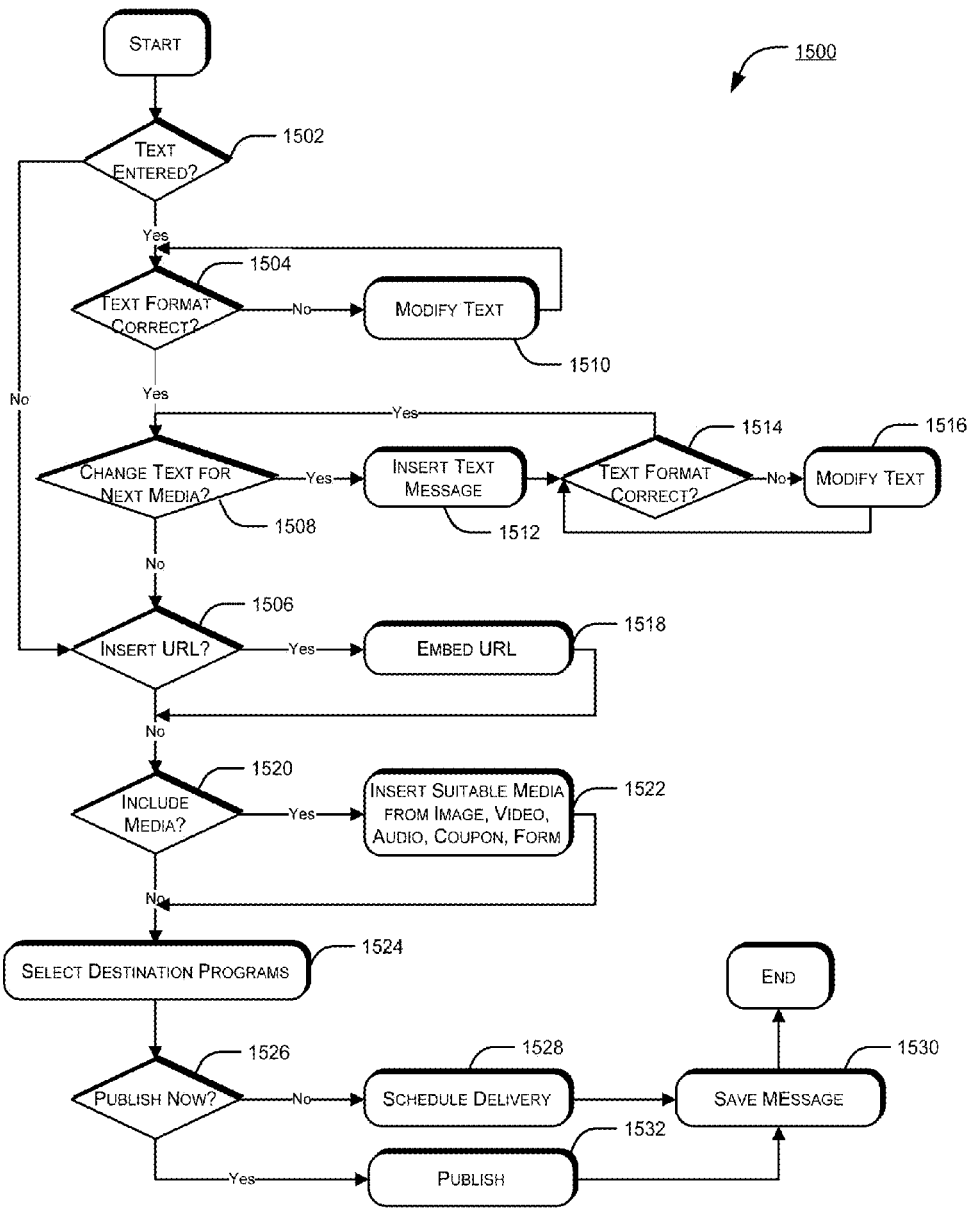
FIG. 15 illustrates an example method for creating a message.

FIG. 15 illustrates an exemplary method 1500 for creating a message. At step 1502, the input module 1002 determines whether the developer 914 has inserted text. If yes, the method proceeds to step 1504; else, the method proceeds to step 1506. At step 1504, while the developer is entering the text or at a later time (such as before publishing, before scheduling, or immediately after the developer has finished entering the text), the formatter 1006 checks whether the message is compatible with the destination social media system's format requirements. If the text adheres to the desired text format, the method proceeds to step 1508, else at step 1510, the formatter 1006 prompts the developer 914 to modify the text in accordance with the format, or automatically modifies the text message according to predefined rules.

The user interface 1001 may have different text boxes for different social media systems 910. Alternatively, the user interface 1001 may include dropdown menus or checkboxes for selecting the social media systems 910 for which the developer 914 wishes to modify the message. Here, when the social media system 910 is selected, the user interface 1001 may open additional text boxes for message alteration. In some embodiments, the developer simply creates a single message for publication on various social media systems, and the SRM system formats the message according to predetermined specifications for each social media system requirements (i.e., the developer does not create separate messages for each social media system).

At step 1508, if the developer 914 does not wish to modify the text message for other destination systems 910, the method proceeds to step 1506. Alternatively, if the developer 914 wishes to modify the message for a particular social media system 910, the method 1500 proceeds to step 1512, where the user interface 1001 prompts the developer 914 to insert/modify the text message. Next, the formatter 1006 checks the text format at step 1514. If the format is not correct, the formatter 1006 modifies the text at step 1516; else, the method goes back to step 1508, where the developer 914 may be prompted to include text for the next social media. This process continues until the developer 914 has created or modified messages for all desired social media systems 910.

At step 1506, the developer 914 determines whether to insert a URL. If yes, the developer 914 simply embeds the URL, at step 1518. If not, the method proceeds to step 1520, where the developer 914 decides to add media to the message. The user interface 1001 permits the developer to select media from multiple media options including images, videos, audio, coupons, forms, banner advertisements, etc. The user may also add custom media types to this list if required. Further, a tab, an icon, a dropdown menu, or any other such graphical tool may represent the media options. On selecting a particular media option, the developer 914 may be presented with available media files in that category. Moreover, the developer 914 may be allowed to add new files to the selected media by browsing through files present on the developer's 914 system, server, external drive, or other such system, or by directly browsing through the Internet 908. Multiple files and multiple media type may be added to the message at step 1522.

At step 1524, the user/developer proceeds to select destination marketing programs 918. As mentioned previously, marketing programs are high-level categorical delineations used to categorize and group a number of advertising messages associated with each program. Users 916 may select one or more active destination programs for publication. Next, the method proceeds to step 1526 where the developer 914 selects between publishing instantaneously or at a scheduled time. If the developer decides to schedule delivery (step 1528), the user interface 1001 may allow the developer 914 to set schedule times for the marketing programs 918 individually. Alternatively, the scheduler 1004 may allow the developer to select one scheduled time to deliver the message to all destination marketing programs 918. Once the message is scheduled, the message is saved at step 1530. If the developer 914 wishes to schedule message delivery to individual destination programs, steps 1528-1532 are repeated for the selected marketing programs 918. If the developer 914, on the other hand, decides to publish instantly (yes path from step 1526), the message is published (step 1532) and saved (step 1530).

Figure 13:
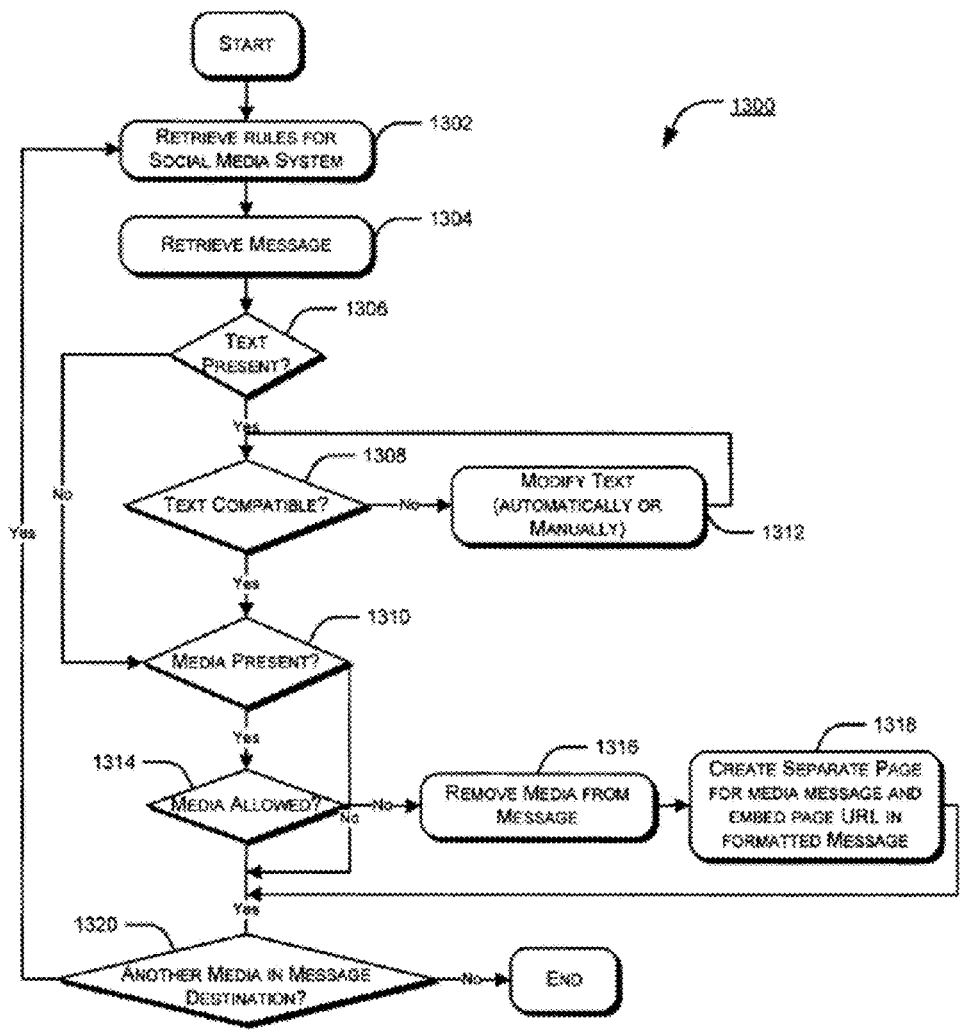
FIG. 13 is a flowchart illustrating an example method for customizing a message according to a destination social media system.

FIG. 13 is a flowchart illustrating an exemplary method 1300 for customizing a message according to a destination social media system 910. The formatter 1006 may be invoked at a number of times to customize or format the message. In some cases, the formatter 1006 may be invoked at the same time the message creation/modification interface is activated. In this manner, the formatter 1006 may alert the developer 914 while the text is being created, for example, the formatter 1006 may count text characters and alert the developer 914 when the text characters exceed the limit for the specific social media system 910. In other cases, the formatter 1006 may be invoked once the message is completed, or before publication. If a message includes a URL and exceeds the word limit by five characters; instead of deleting the last five characters of the URL, the formatter 1006 may delete the end of the text just before the URL.

At step 1302, the formatter 1006 retrieves rules and policies associated with the selected destination social media system 910. These rules may include format standards required by a particular system and flexible best practices. These factors may be updated at regular periods with advances in technology, social behaviors, and platforms. Moreover, developers 914 may set their own rules to improve messages. For example, a developer (or other client member) may utilize the formatter 1006 to create a list of words or other content that are used to screen message tone and content before publishing.

At step 1304, the formatter 1006 retrieves the message and subsequently checks if the message includes text at step 1306. If yes, the method proceeds to step 1308, where the formatter 1006 determines whether the text is compatible with the defined text rules and standards; else, the method proceeds to step 1310.

At step 1312 (no path from step 1308), the formatter 1006 either prompts the developer 914 to modify the text, or modifies the text automatically according to predetermined rules. Once, the text is compatible, the method proceeds to step 1310, where the formatter 1006 checks whether the message is a multimedia message. If yes, the formatter 1006 checks whether the selected social media system 910 permits multimedia messages at step 1314. In case the selected social media system 910 allows multimedia messages, the method proceeds to check whether another social media system 910 is selected for message delivery. If a certain social media system 910 does not allow multimedia messages, the formatter 1006 removes media from the message and saves the message at step 1316. Next, at step 1318, the formatter 1006 may create a separate page for the complete multimedia page and the page's URL may be added to the text message. In this manner, developers 914 may display multimedia messages on systems that do not permit multimedia messages. When a user 916 selects the embedded link on the destination system 910, the user 916 will be redirected to the complete multimedia message on a separate page. Users 916 may post comments and responses to the complete message from the redirected page directly.

At step 1320, if multiple destination systems are selected, the method returns to step 1302 and the process is completed for the next system 110, else the formatter 1006 saves changes to the message and exits.

FIG. 14 is a flowchart illustrating an exemplary method 1400 for analyzing message insights according to some embodiments of the present invention. As described with relation to FIG. 10, the managing module 902 includes an importer 1014 and moderator 1012, which along with the controller 1010 help analyze responses to published messages. Responses include replies, likes, shares, posts, messages, emails, click-throughs to embedded URLs, etc. The SRM 901 analyzes these responses to improve their marketing strategies, as such responses indicate consumer interest in various products, relative success of types of marketing strategies or messages, and other helpful information.

The method begins at step 1402, where the importer monitors active marketing programs 918. The first step is a continuous step that loops continuously, unless the importer is instructed to stop monitoring. If the importer 1014 detects any responses at step 1404, the corresponding response counter is incremented at step 1406.

Embedded URLs are shortened using the "Meta Refresh" technology that first brings the user 916 on the shortened URL webpage, and after a short or no interval, the webpage is refreshed and the user 916 is redirected to the original web page. This redirection through the shortened URL allows the importer 1014 to track any click-throughs. When a user 916 clicks on the shortened URL, the user 916 first lands on an SRM 901 generated URL, where the number of visits can be recorded. As will be understood and appreciated, embodiments of the present system are not limited solely to use of the known "Meta Refresh" technology to shorten URLs, and other such technologies and methods are used in various embodiments as will occur to one of ordinary skill in the art.

At step 1408, the importer 1014 extracts any text responses from the marketing programs 918 and stores the responses in the database 904 for further analysis. Next, the moderator 1012, at step 1410, inspects the stored responses. As described previously, the moderator 1012 may incorporate multiple message screening word lists, such as abusive language lists, competitor names lists, etc. At step 1412, in case the message text matches with any word in the screening word list, the message is flagged. Moreover, the moderator 1012 may check messages for embedded URLs. The message is automatically flagged if the message includes any URLs.

The moderator 1012 may be programmed to take any suitable action against flagged messages at step 1414. For example, on selecting any flagged message, a new screen opens that allows the developers 914 to delete the original message on the marketing campaign, notify the associated developers 914, store the message in the flagged repository, or a combination of these.

If no detrimental issues were uncovered during the moderation, the message is not flagged, but saved in the database 904 for further analysis at step 1416. Here, messages or response counter information from the marketing programs 918 may be collected to generate statistical reports, interactive charts, and drill-down graphs that depict the success or failure of a message to compel users 916 to respond.

Cloud Application Integration

Figure 16A:
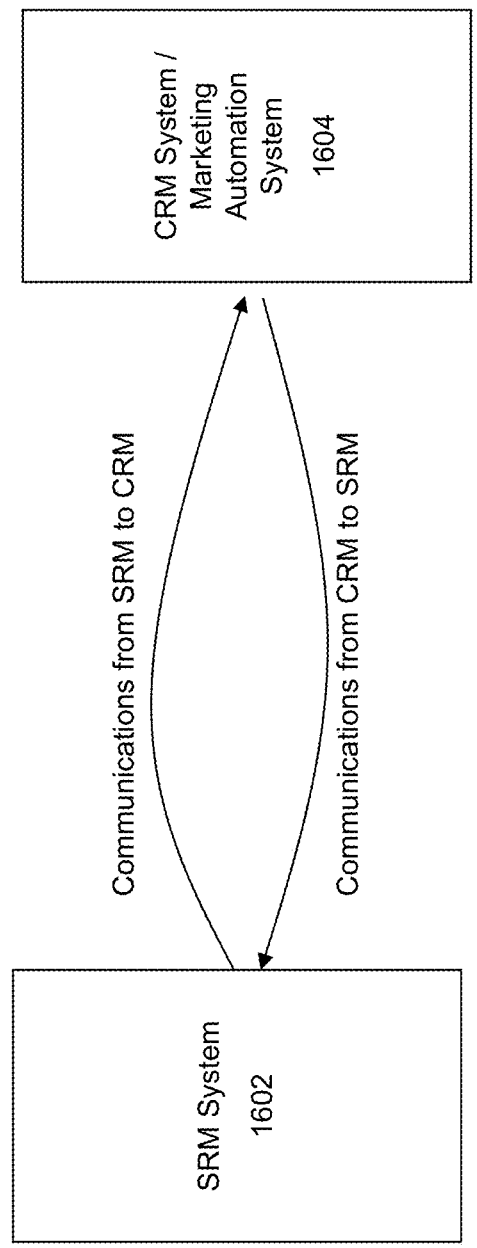
FIGS. 16A-C illustrate a method and mechanism to integrate certain components into a cloud-based system.
Figure 16B:
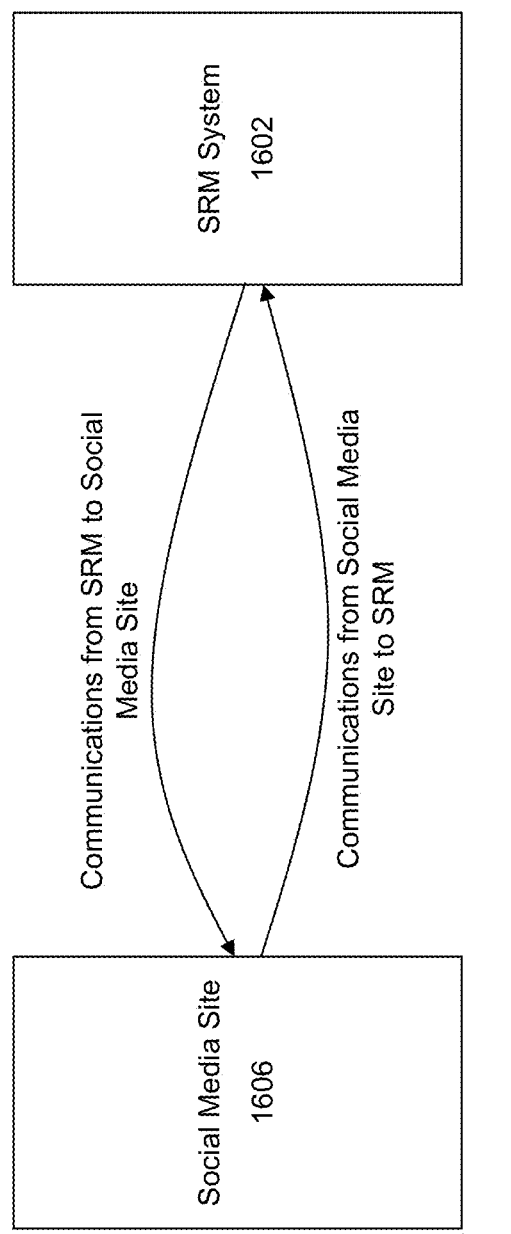
Figure 16C:
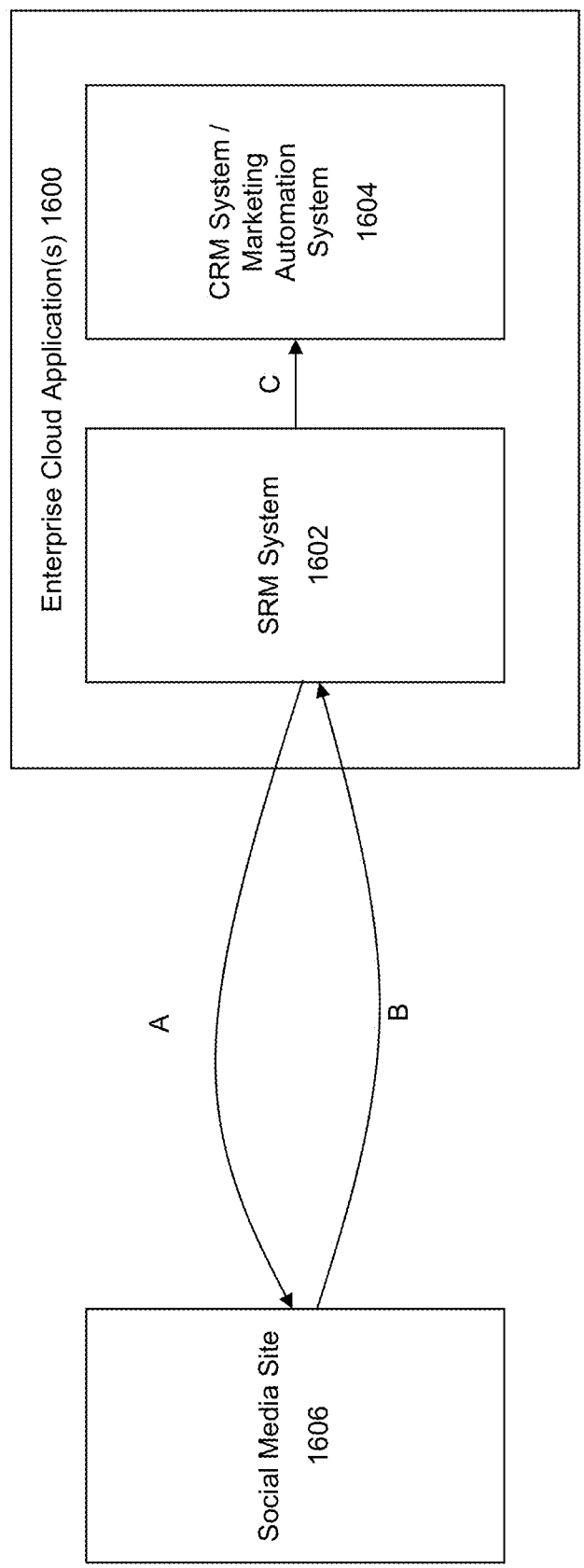

FIGS. 16A-C illustrate a method and mechanism to integrate certain of the above-described components into a cloud-based system.

FIG. 16A illustrates an example approach to implement a cloud-based system that can be used to create a campaign. The cloud-based system includes a SRM 1602 and a CRM system 1604.

The SRM 1602 manages content at one or more social media outlets, e.g., using the approach described above. The social content and messages can be tagged and/or associated to CRM initiatives. The social responses can be analyzed based at least in part upon the CRM initiatives.

The content that is created for the social media outlets can be managed, for example, using a brand management system at the SRM 1602 that displays customized social media content within the framework of a brand profile (e.g., using the Vitrue Tabs product available from Oracle Corporation of Redwood Shores, Calif.). An example approach that can be taken to implement a brand management system is described in U.S. Patent Publication No. 2011/0145064, which is hereby incorporated by reference in its entirety.

The CRM system 1604 manages marketing initiatives and content across the various marketing platforms. For example, email and/or SMS (social media system) campaigns can be managed and targeted to selected targets. The responses can be captured from the various marketing channels. In addition, the responses can be used to measure the effectiveness of the marketing initiatives. An example CRM system that can be used in conjunction with the invention is the Fusion product, available from Oracle Corporation of Redwood Shores, Calif.

Alternatively, a marketing automation tool can be used in addition to, or instead of, the CRM system 1604 to implement some or all of these functions. For example, a marketing automation product can be used to create and implement an email/marketing campaign, and to track responses from marketing targets. An example marketing automation tool that can be used in conjunction with the invention is the Eloqua product, available from Oracle Corporation of Redwood Shores, Calif. An example approach that can be taken to implement a marketing automation tool is described in U.S. Patent Publication Nos. US 2012-0185764 A1 and US 2009-0265221 A1 which are hereby incorporated by reference in their entirety.

Tagging of social content can be used to identify actionable content and to facilitate the engagement with customers. In some embodiments, SOAP (Simple Object Access Protocol) Calls originate from the social marketing platform and use specially defined integration credentials for secure communication over HTTPS/SSL. The SOAP calls use SSO enabled common credentials between the SRM system 1602 and the CRM system 1604. In this approach, the SRM system 1602 enables the system and/or user to tag the content, and to publish messages with CRM campaign tracking codes.

FIG. 16B illustrates an example set of interactions between the SRM system 1602 and the social media site 1606, e.g., Facebook. The contents pertaining to the marketing campaign are pushed from the SRM system 1602 to be published on the social media site 1606.

At some later point in time, the SRM system 1602 will capture one or more sets of data from the social media site 1606. This captured data includes, for example, Impressions, Likes, Shares, and Comments.

The marketing user can associate/tag the marketing content and posts with a campaign tracking code. In this way, the data captured form the social media site 1606 can then be correlated with the marketing campaign. This permits, for example, statistical data roll-ups to be performed upon the data. For example, the campaign metrics can be aggregated by campaign ID for the posted content.

FIG. 16C illustrates how the social response can be captured from the social media site 1606 into the enterprise cloud application(s) 1600. Here, the enterprise cloud applications 1600 include the SRM 1602 and/or the CRM/marketing automation system 1604.

The SRM 1602 manages the social content as well as managing publishing to the social channels. Therefore, in an example processing flow, the SRM 1602 at step "A" will push a Form with targeted content to the social media site 1606.

At step "B", the User Form submission with response data is captured an obtained at the SRM 1602. The SRM 1602 enriches the response data based on, for example, CRM tags associated with the content.

At step "C", the SRM 1602 passes the enriched response data to the CRM/marketing automation system 1604. The CRM/marketing automation system 1604 receives the social response data, and this may results in some or all of the following actions: (a) Create Response; (b) Update Contact's profile data to record social media handle; and/or (c) Create Lead in the CRM system.

In some embodiment, the user of the system defines custom rules to process the response data. The rules define, for example, de-duplication rules using available attributes in the payload. The rules may also include, for example, action rules that create Response and Lead objects in the CRM system.

Illustrative Example

Figure 17A:
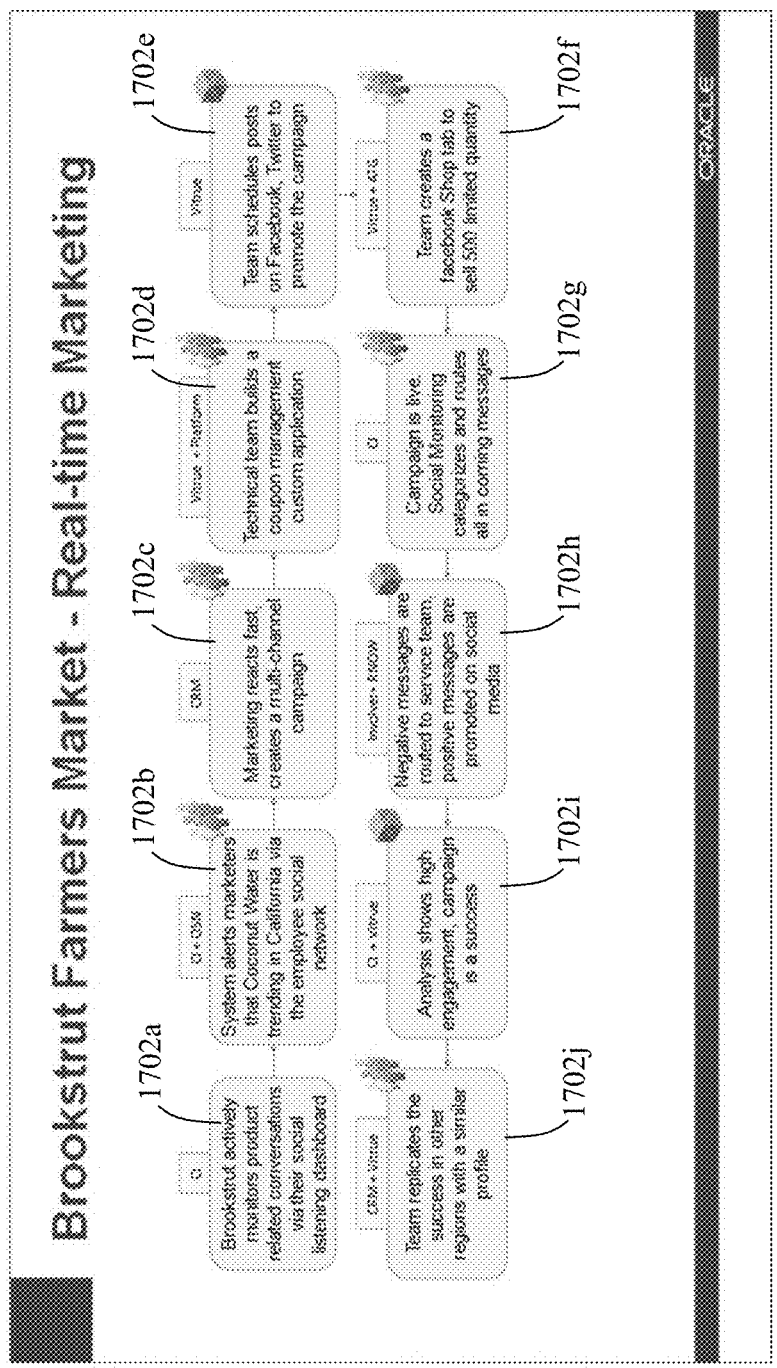
FIGS. 17A-W provide an illustrative example of an integrated cloud-based social marketing system.
Figure 17B:
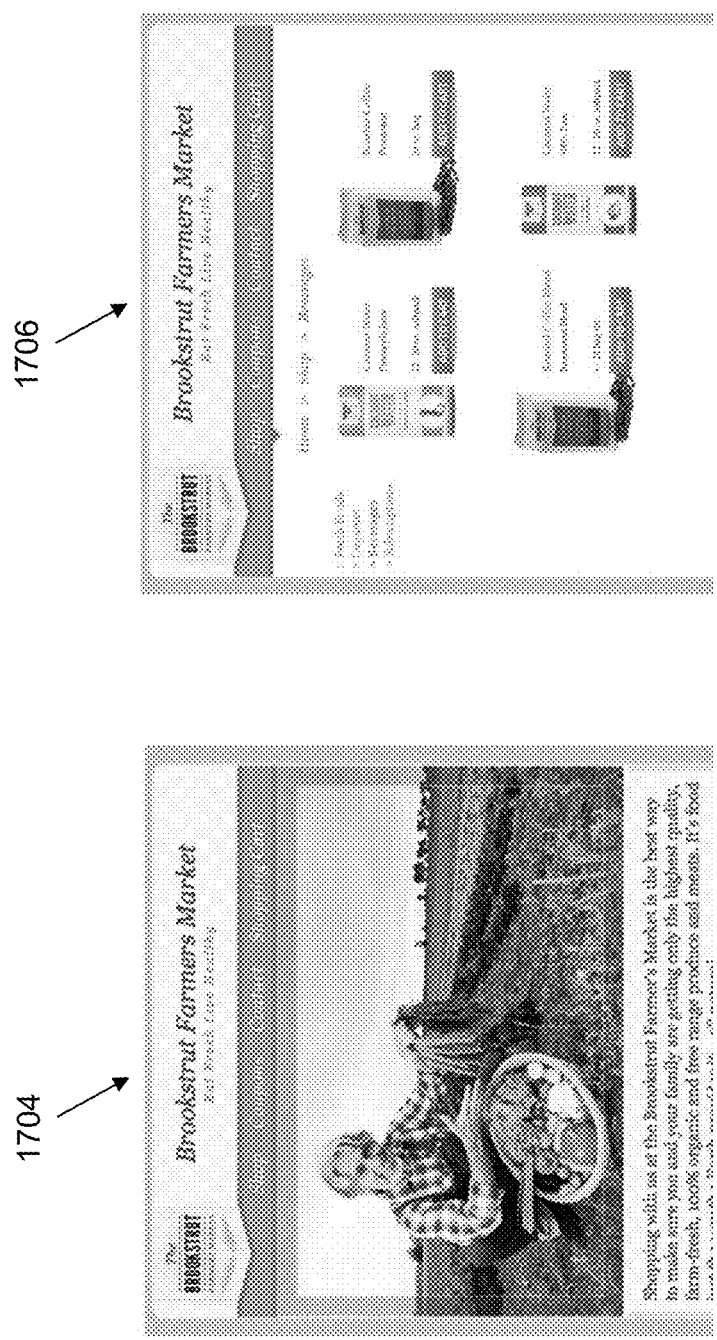
Figure 17C:
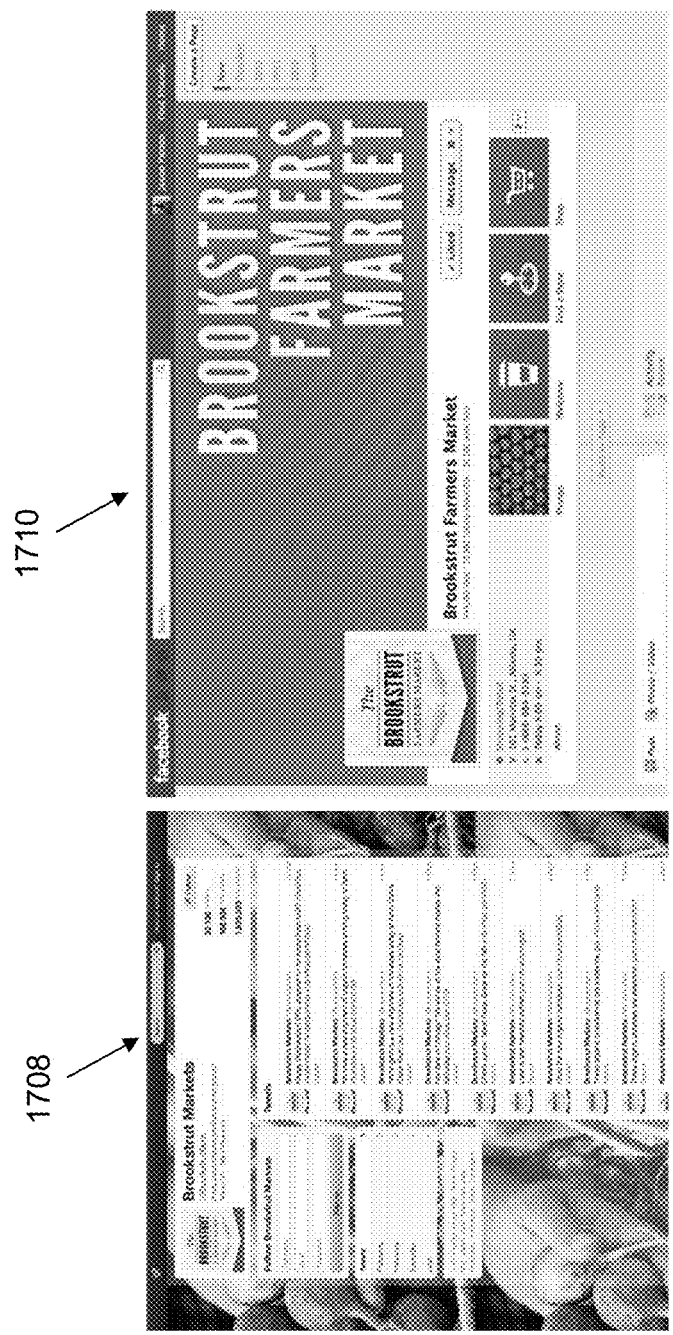
Figure 17D:
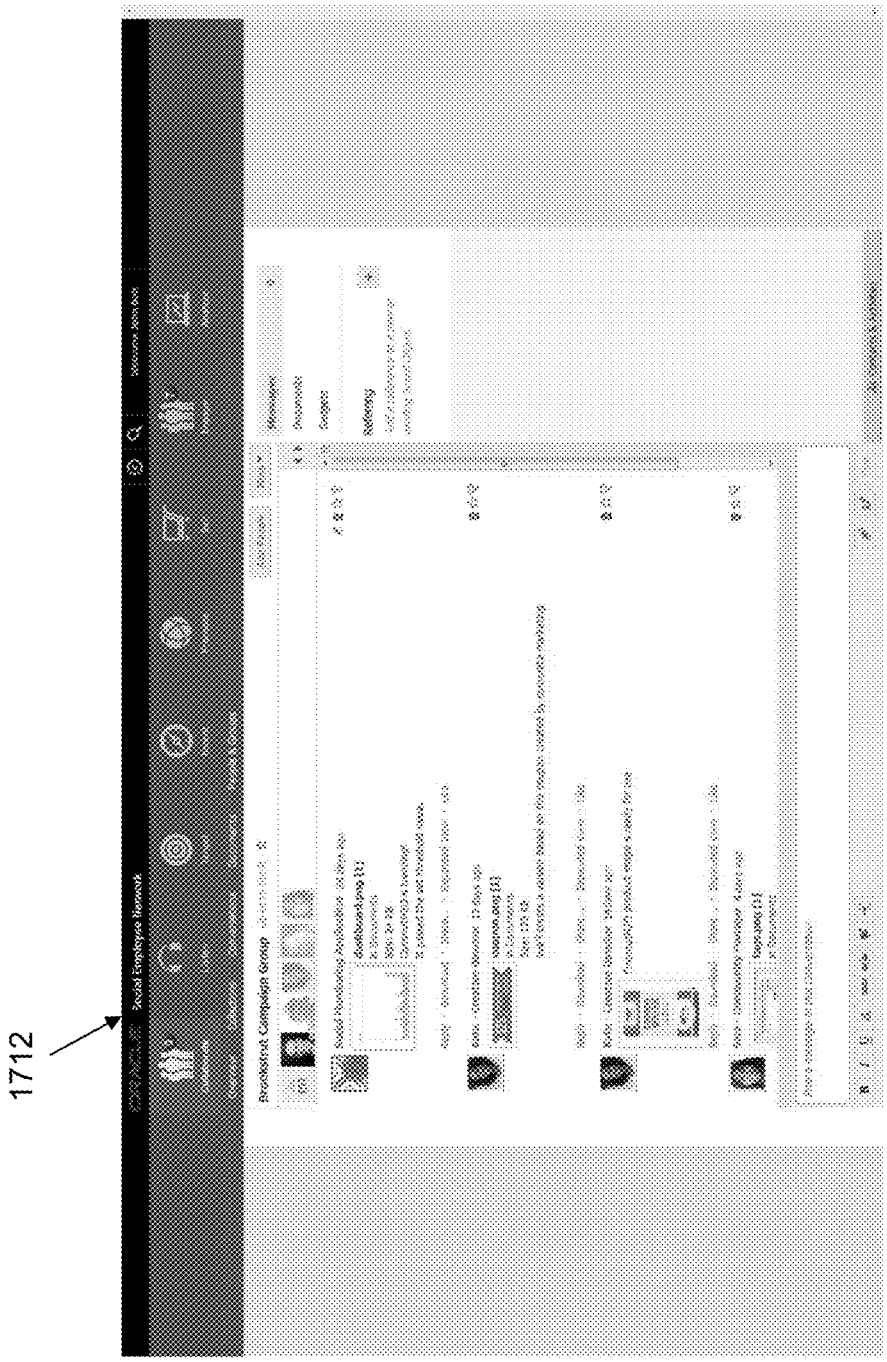
Figure 17E:
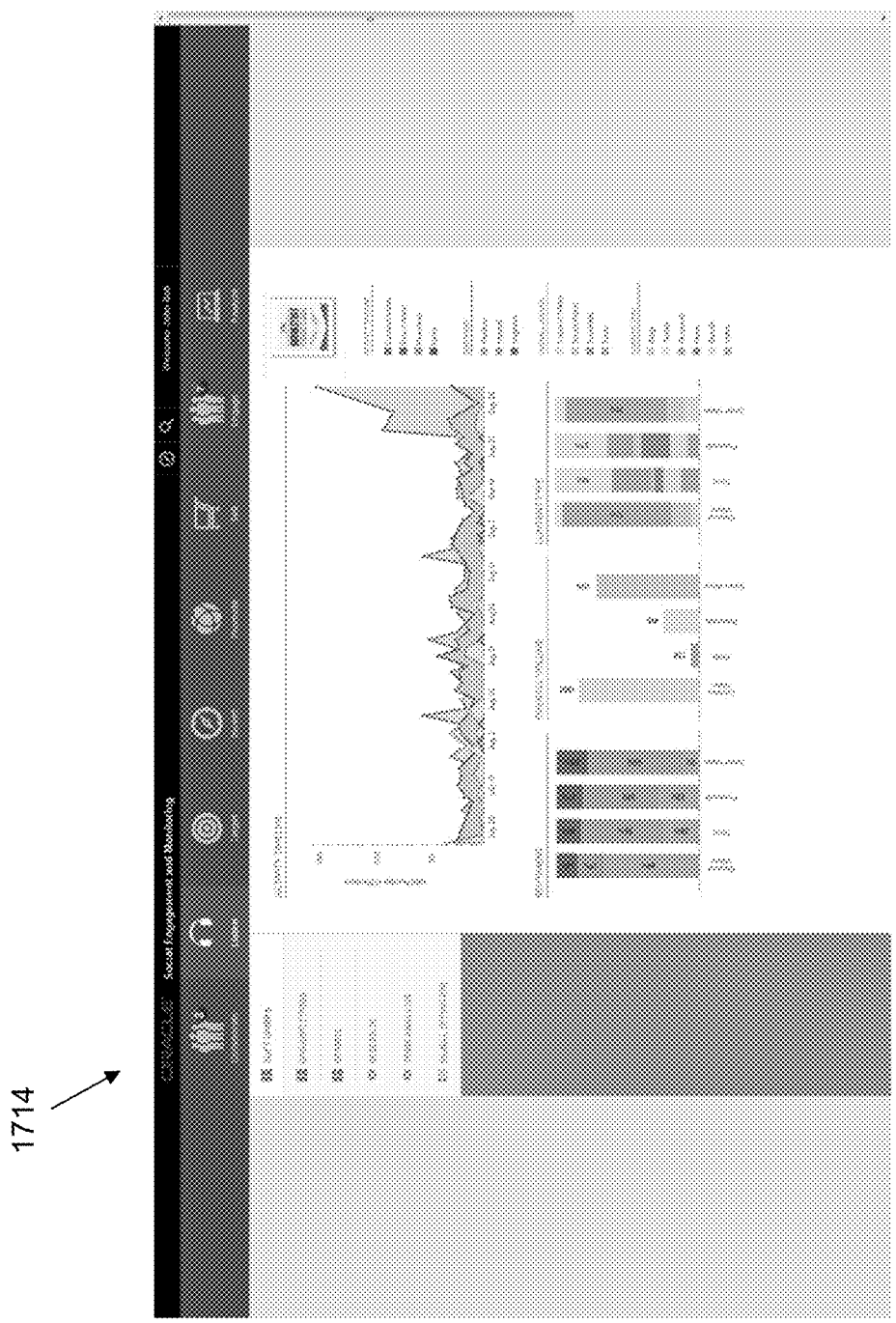
Figure 17F:
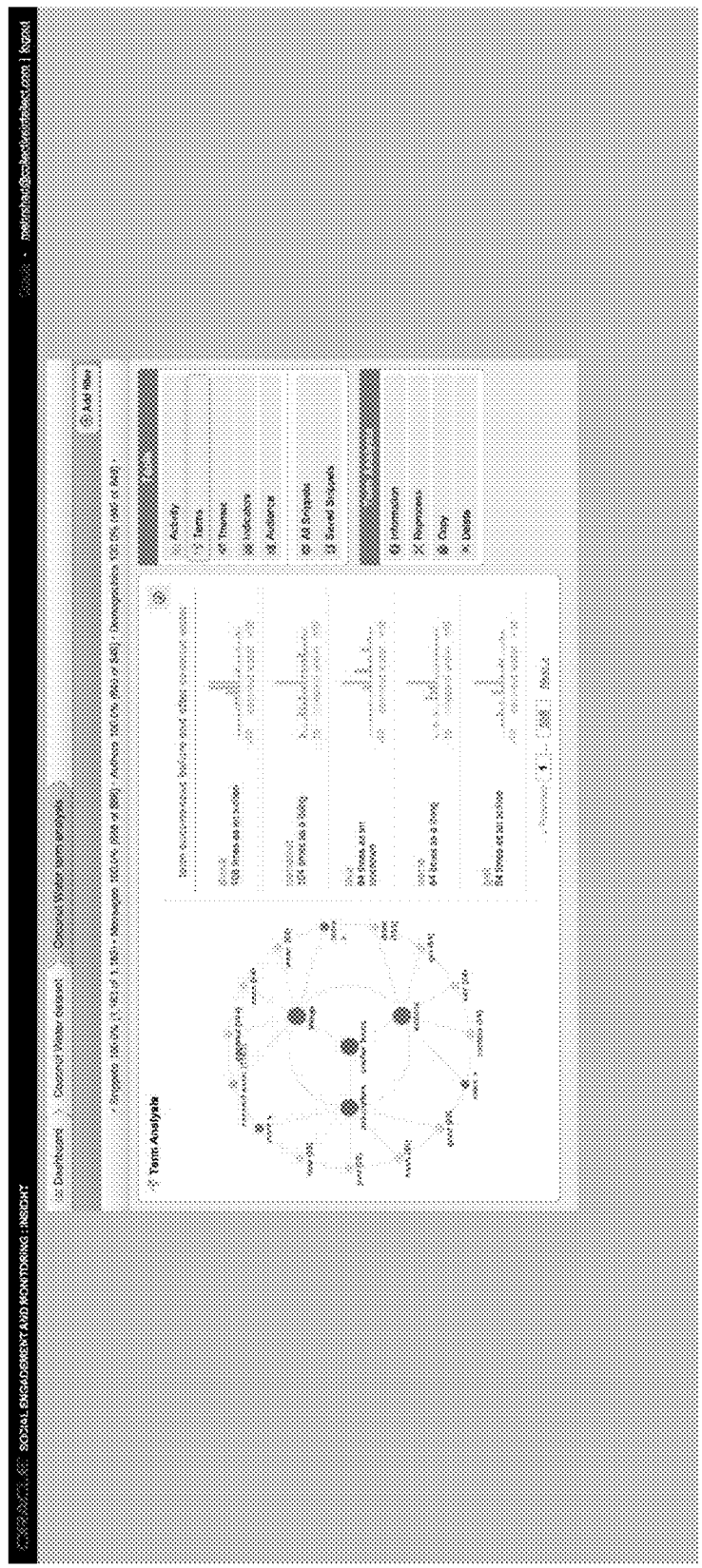
Figure 17G:
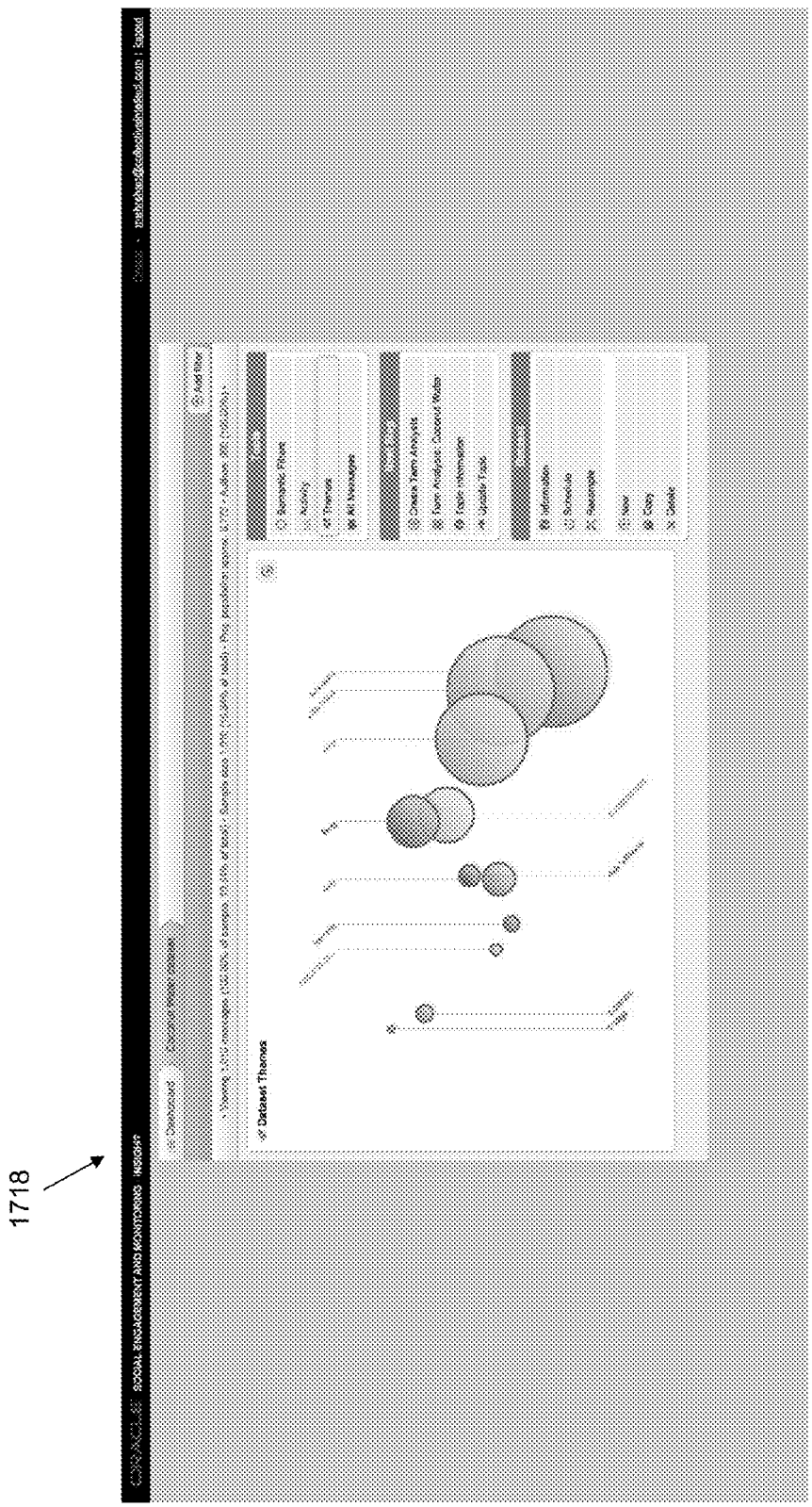
Figure 17H:
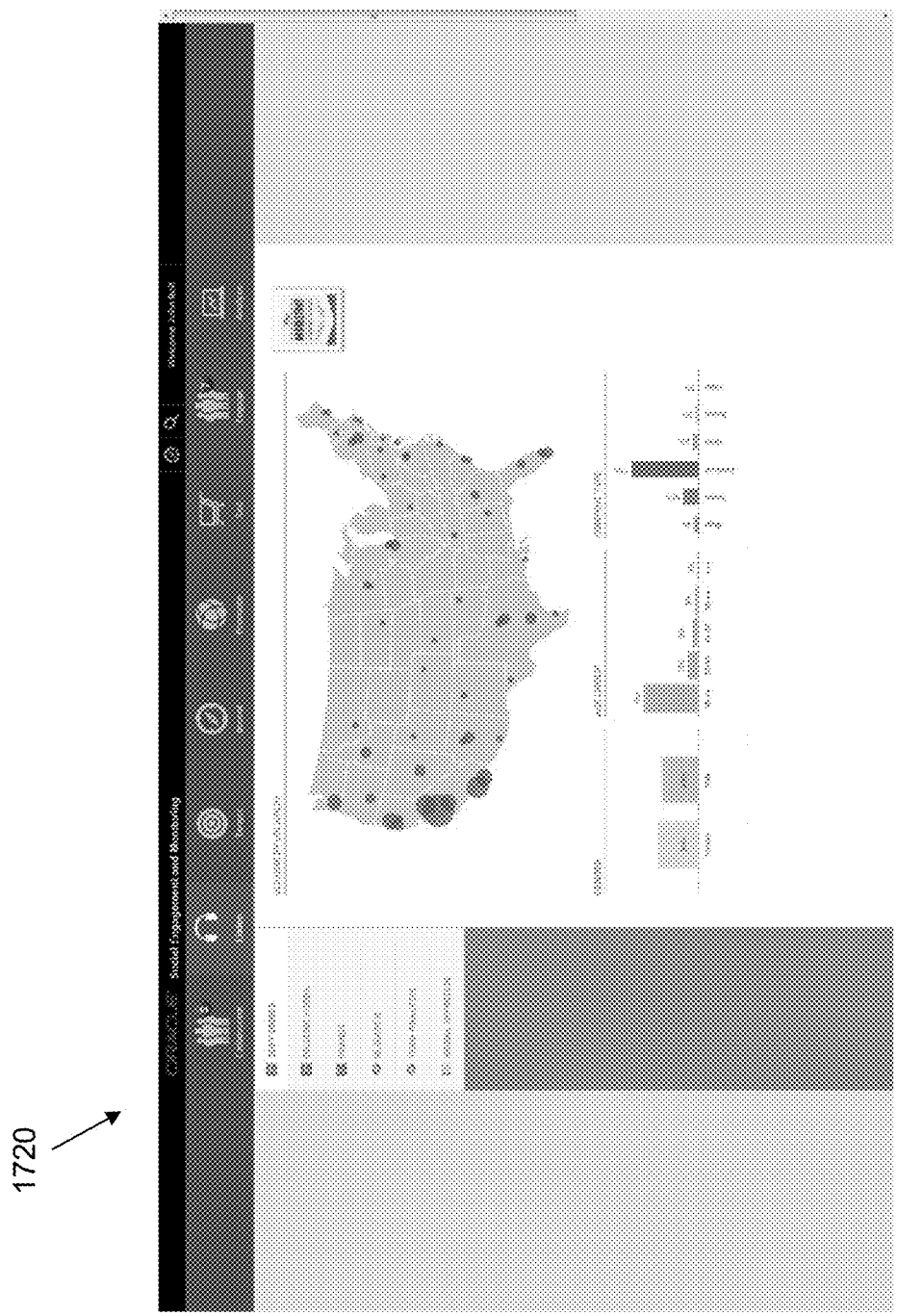
Figure 17I:
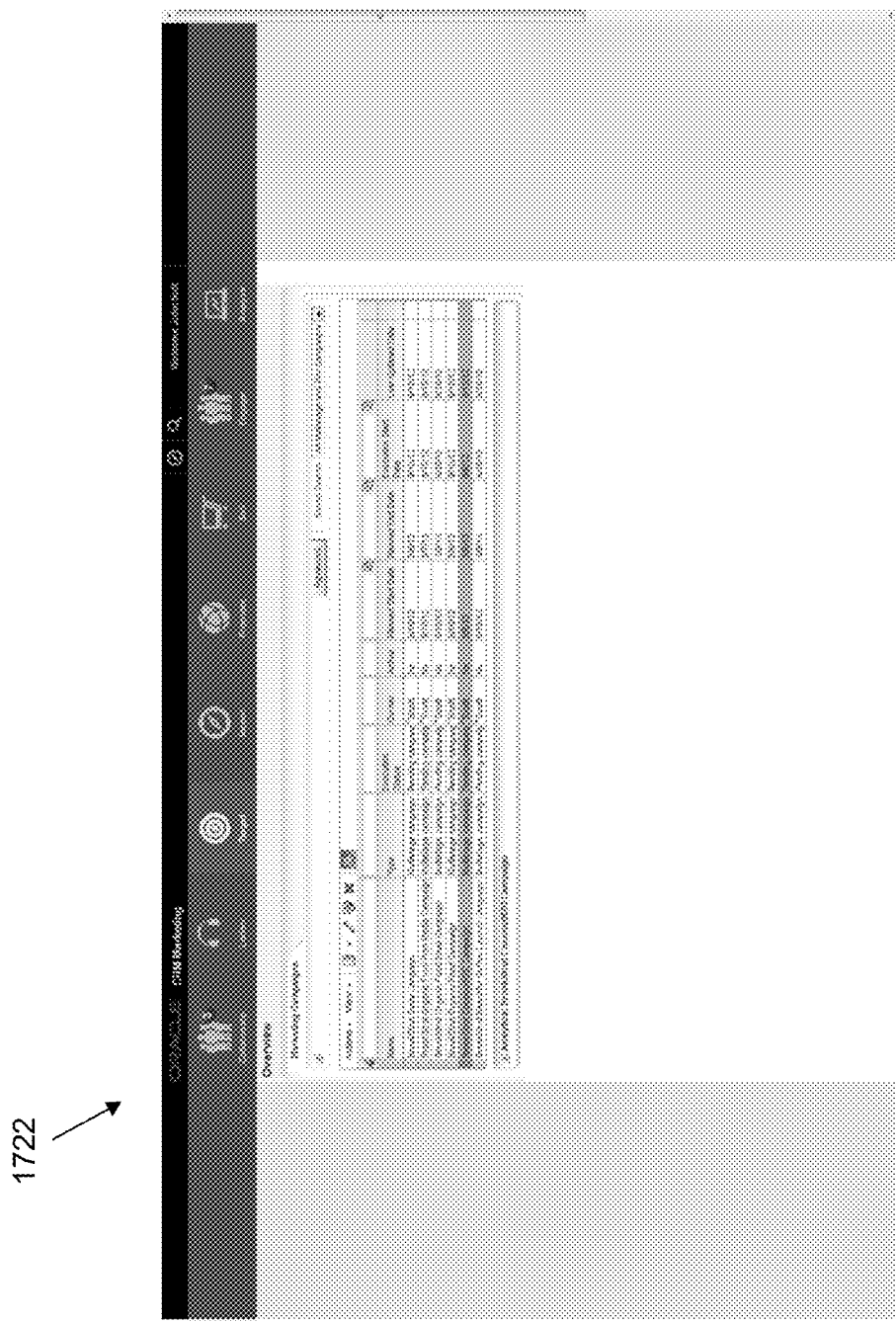
Figure 17J:
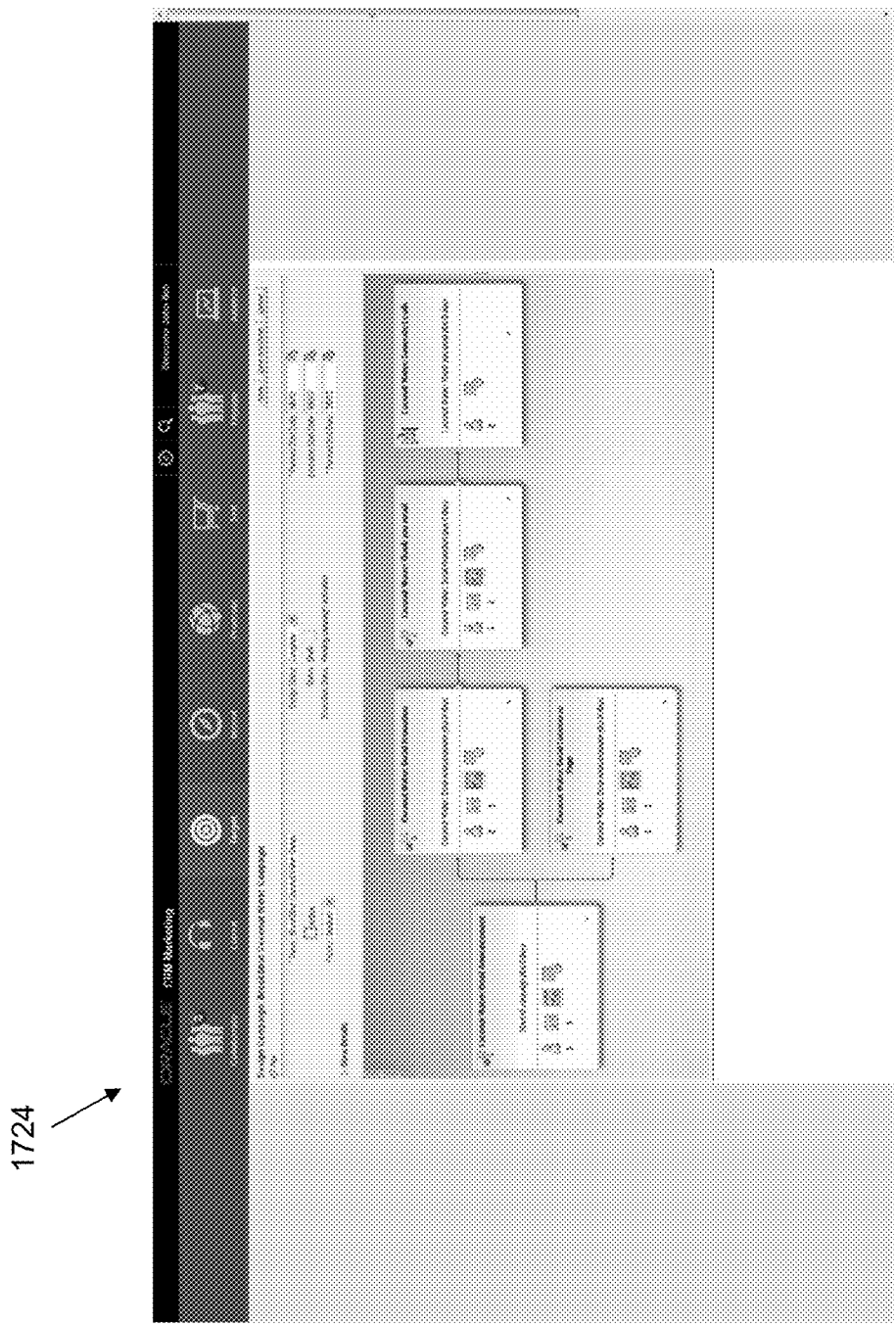
Figure 17K:
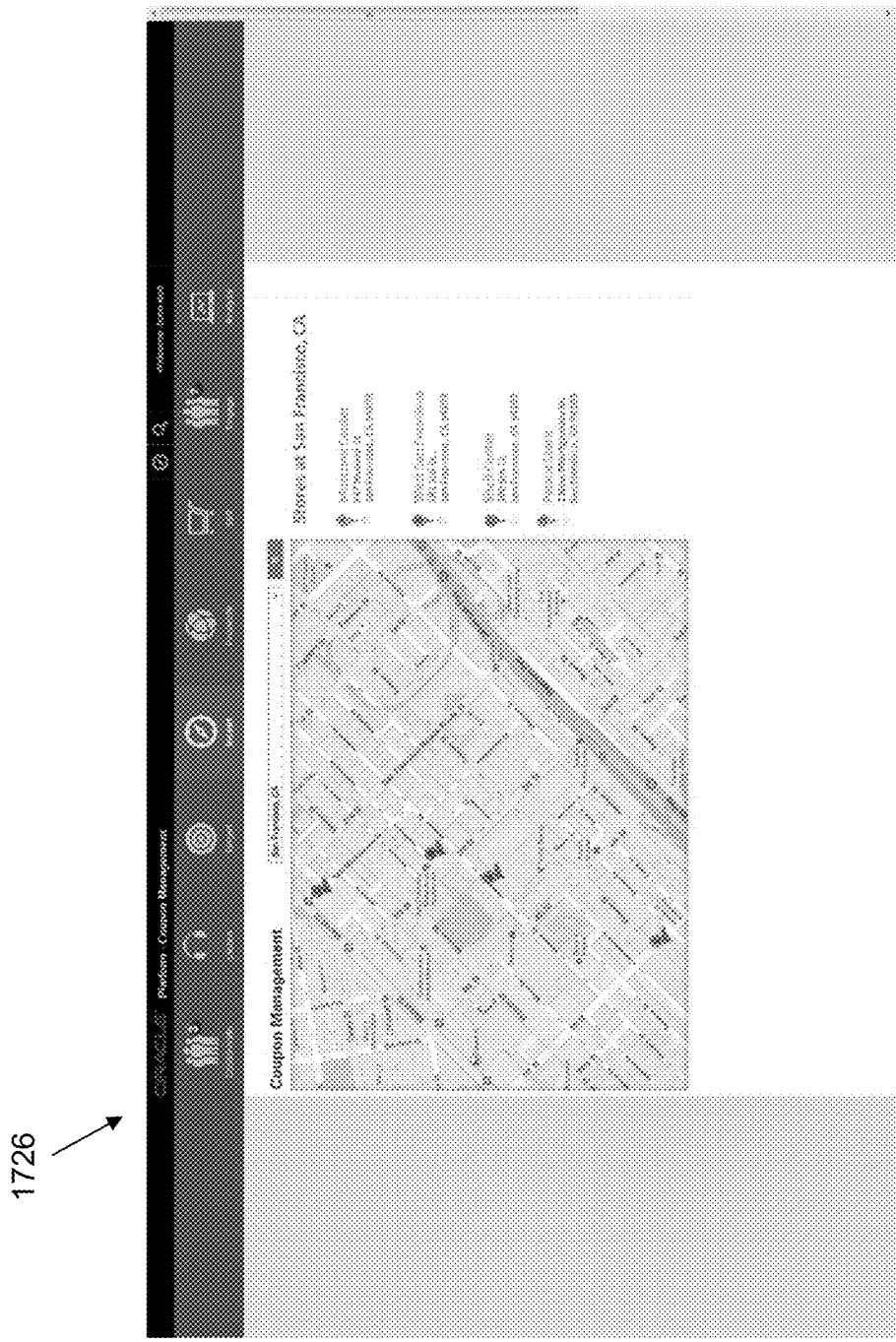
Figure 17L:
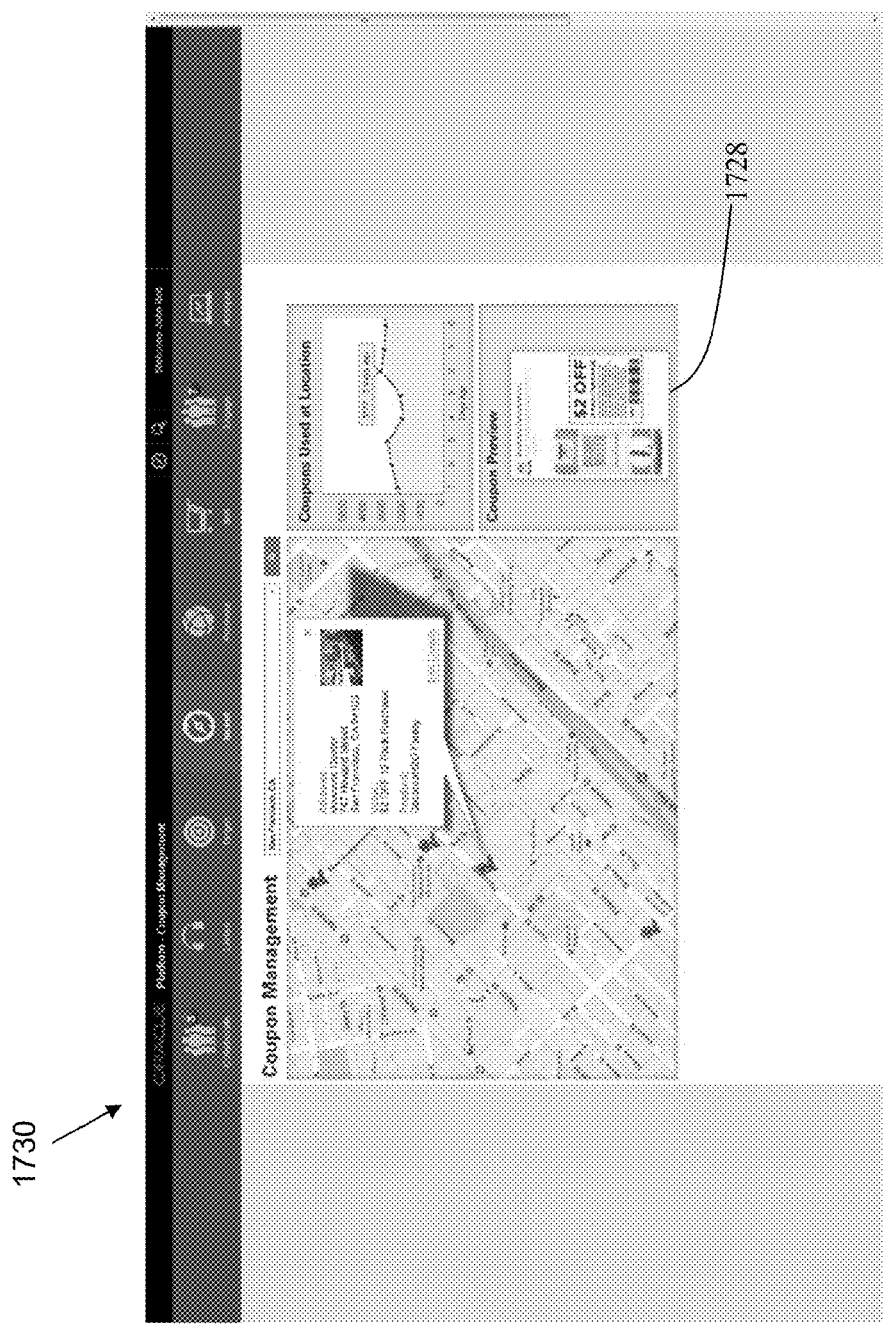
Figure 17M:
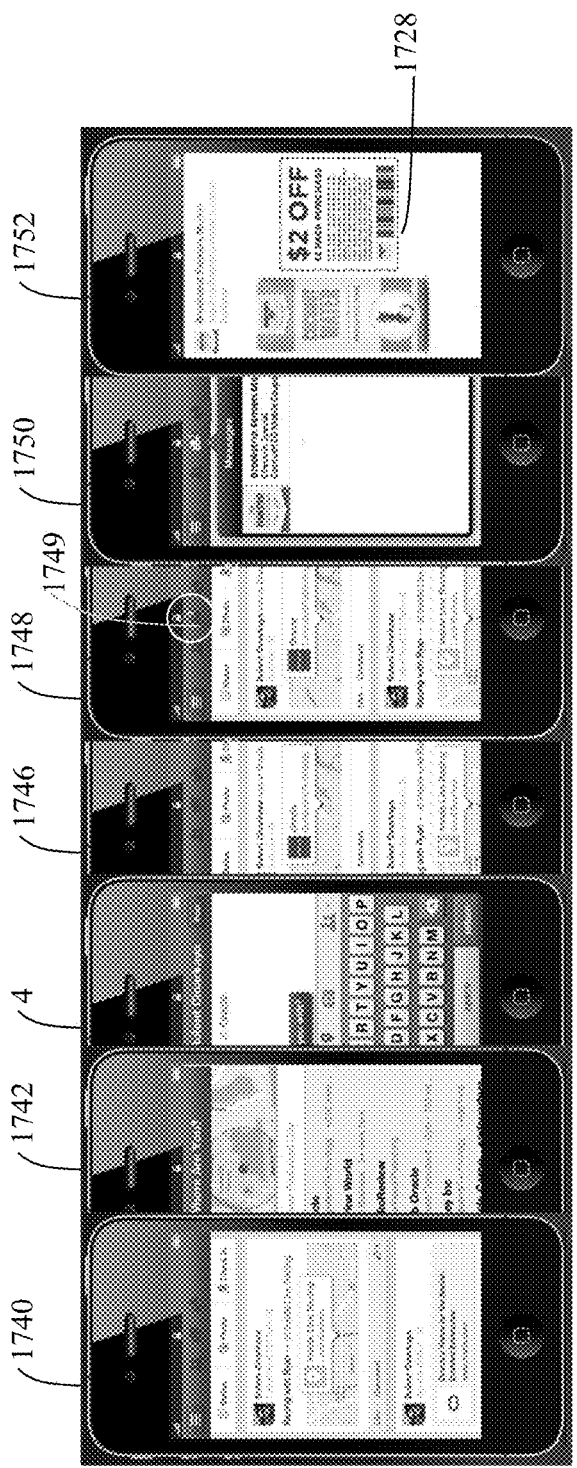
Figure 17N:
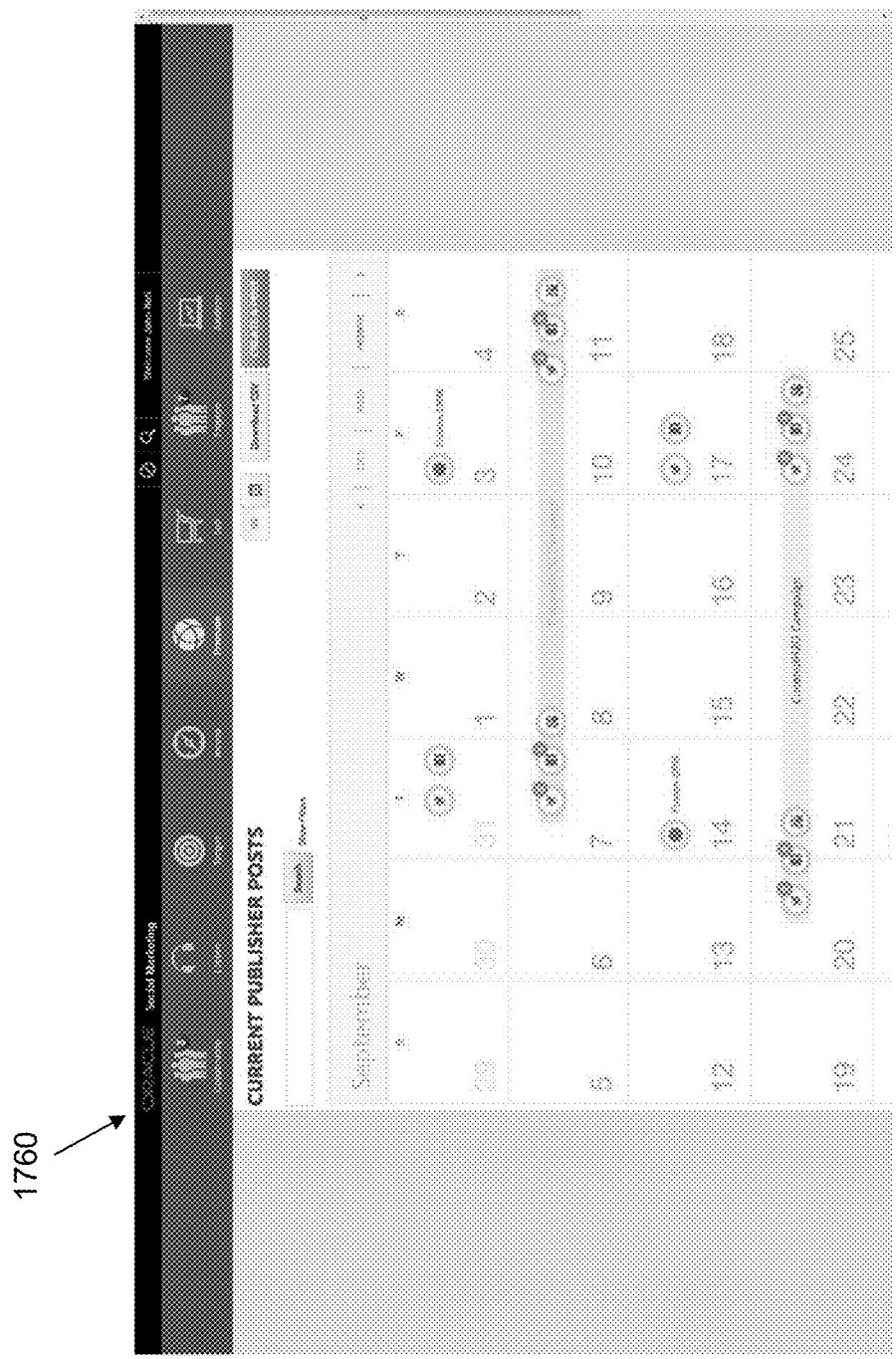
Figure 17O:
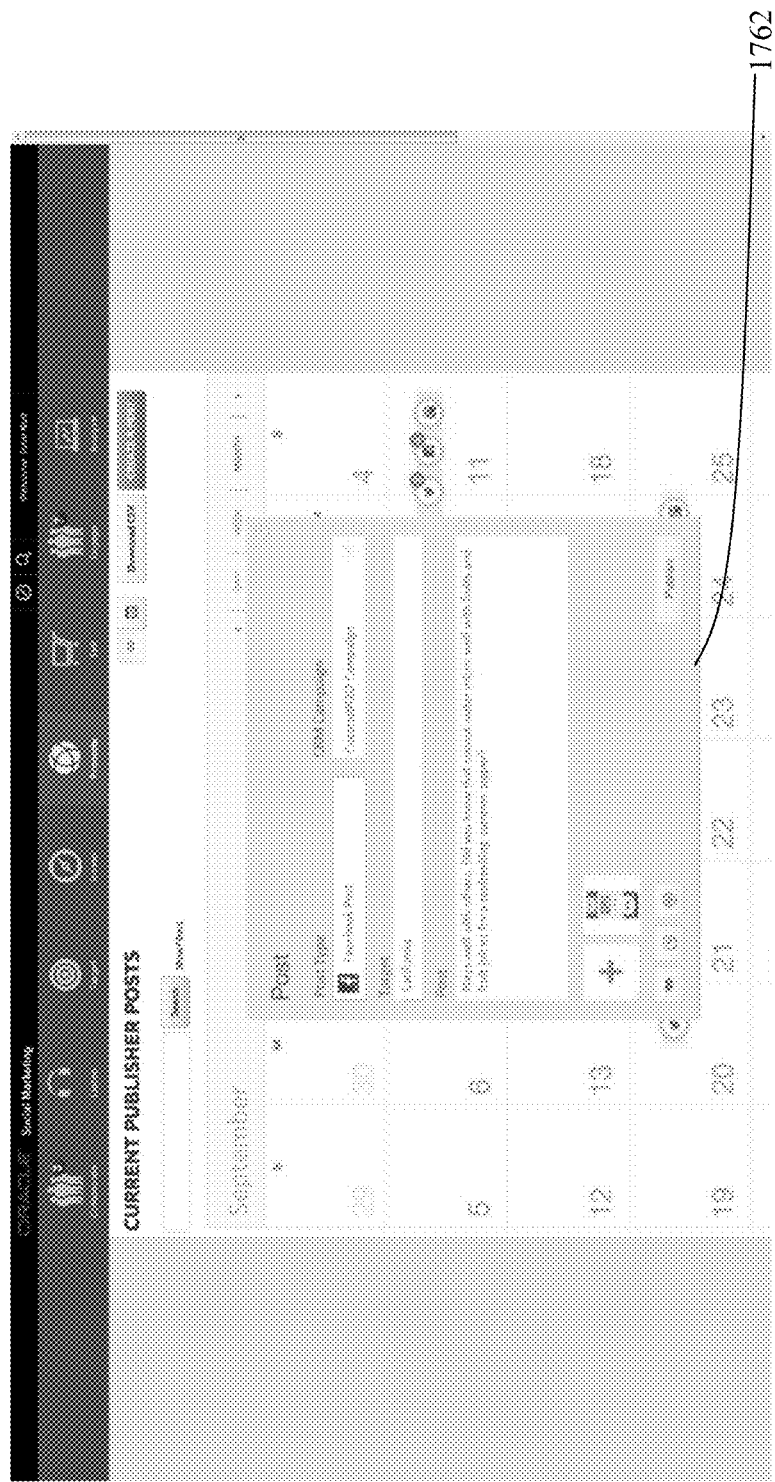
Figure 17P:
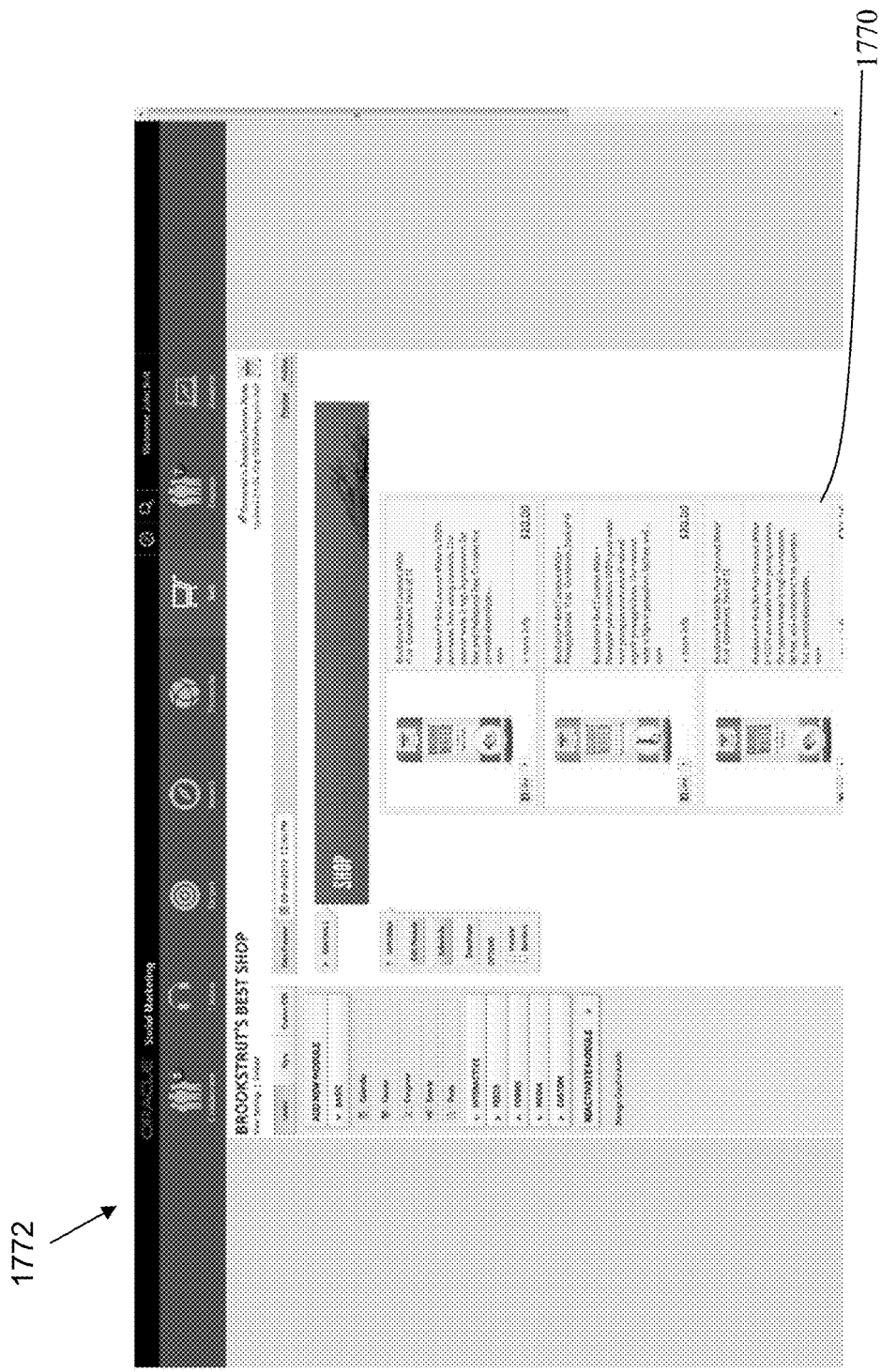
Figure 17Q:
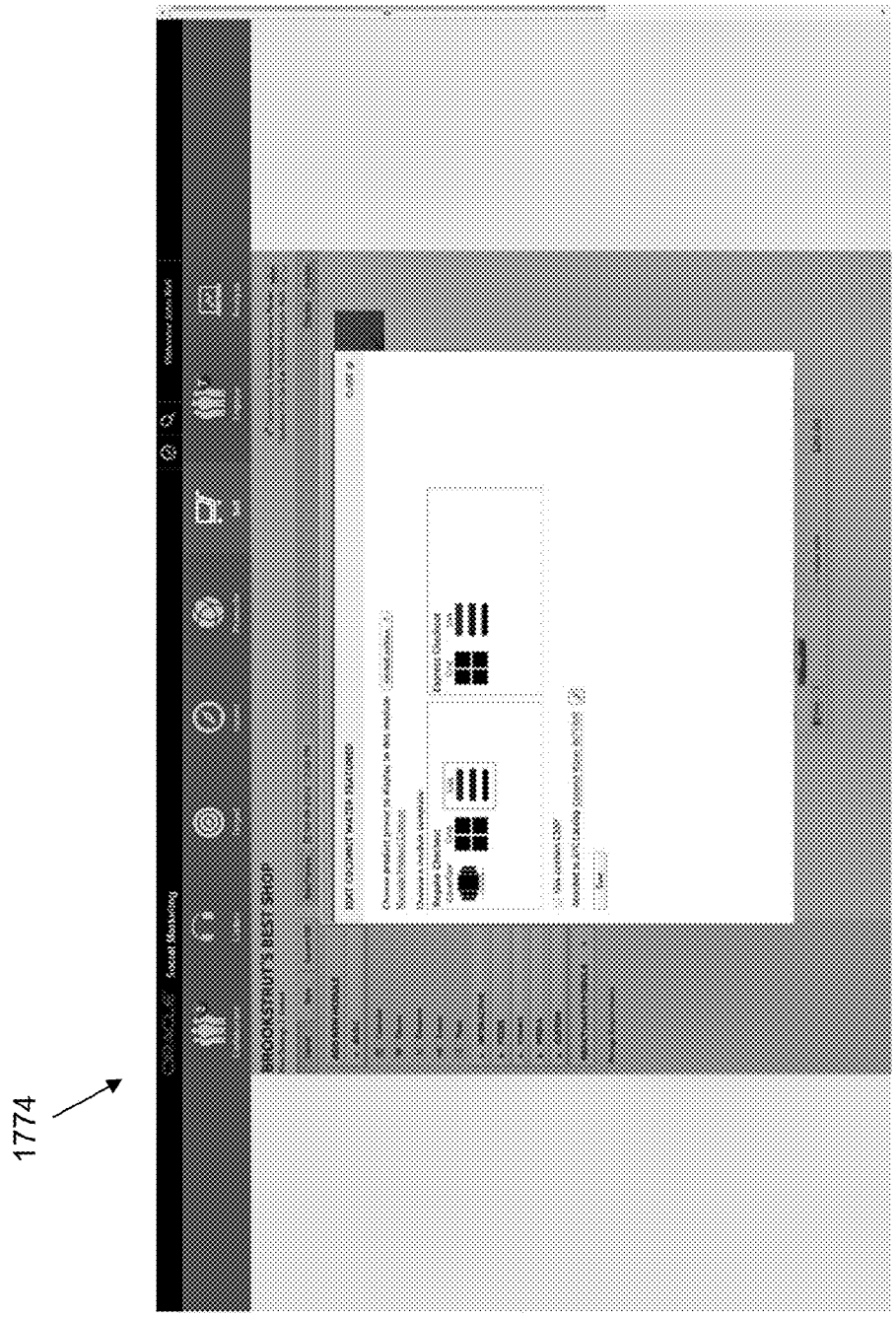
Figure 17R:
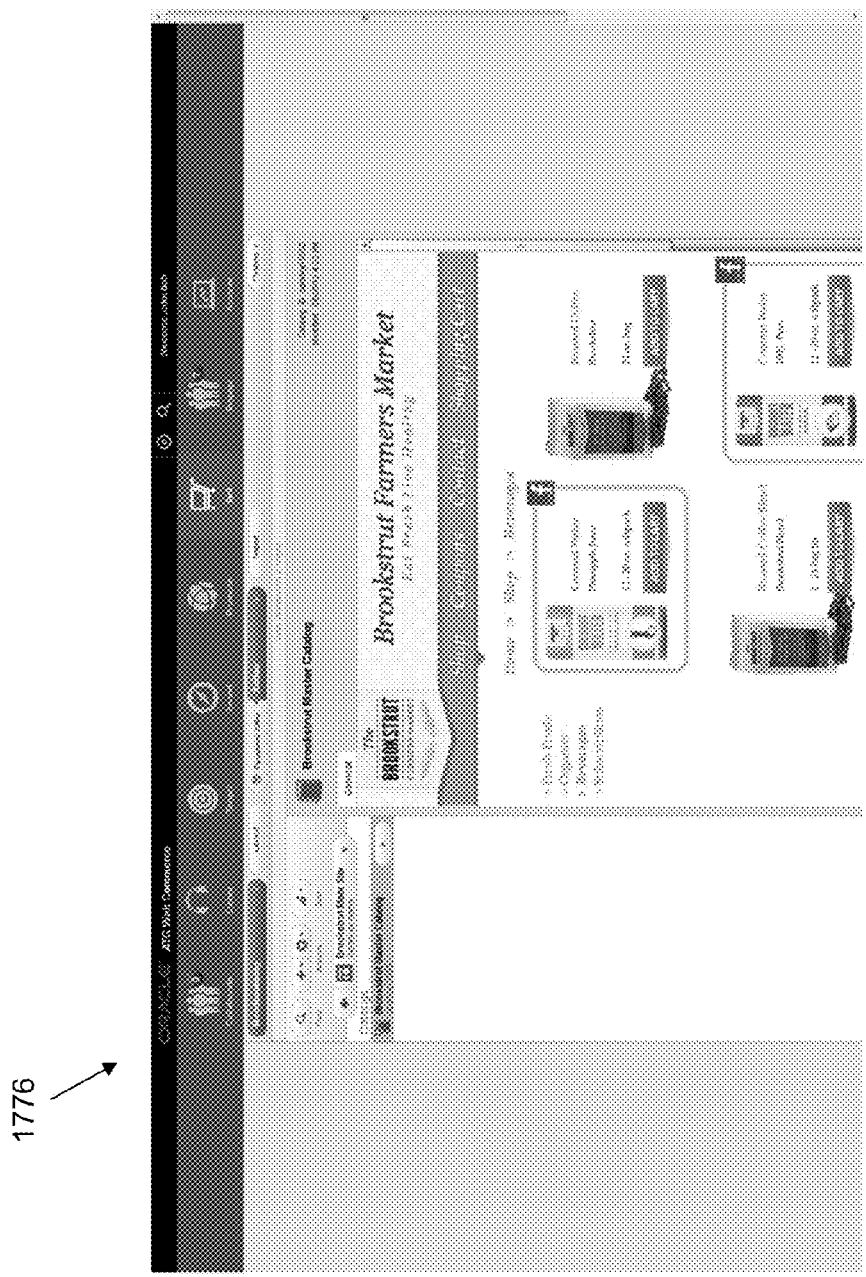
Figure 17S:
Figure 17T:
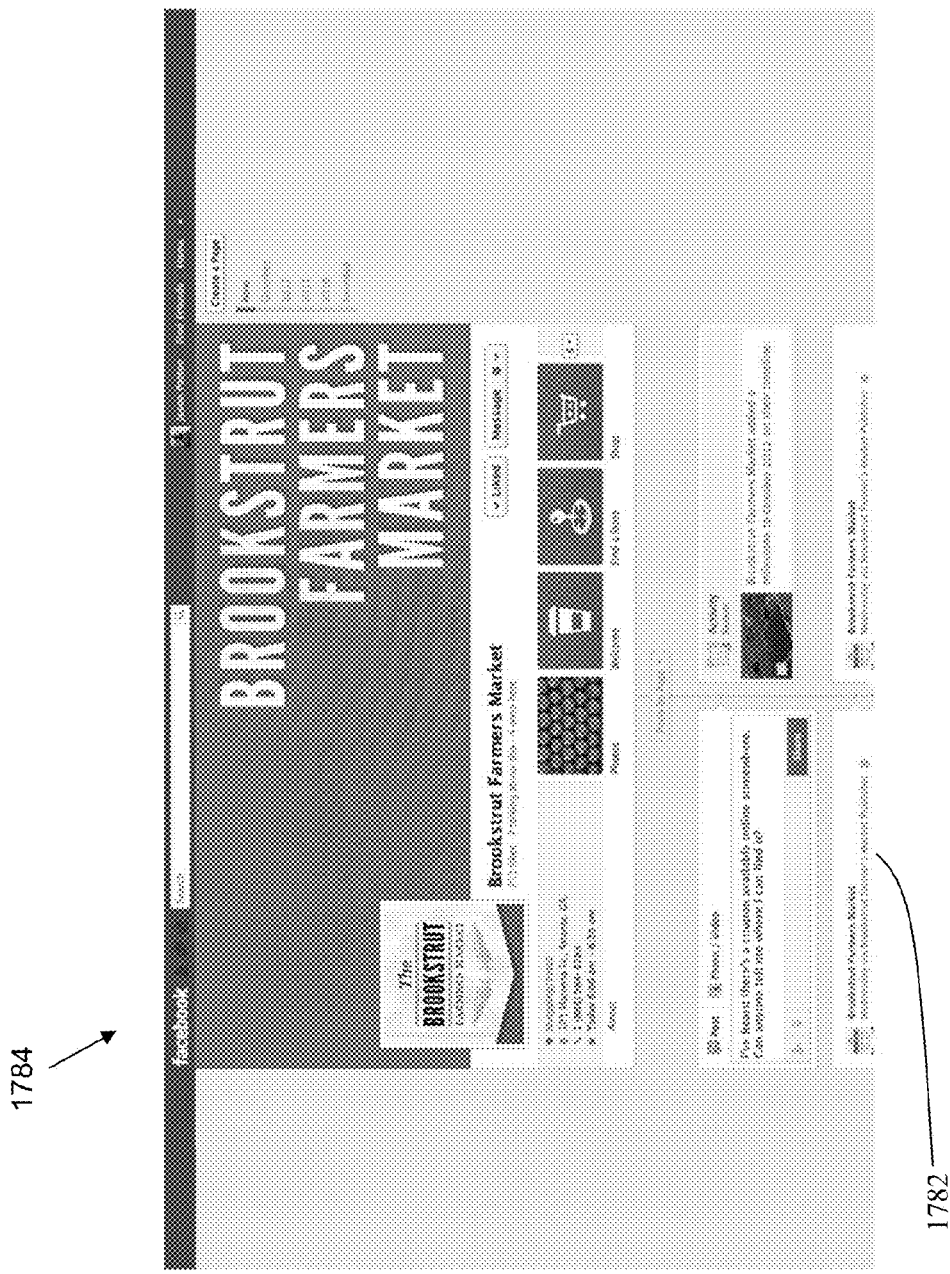
Figure 17U:
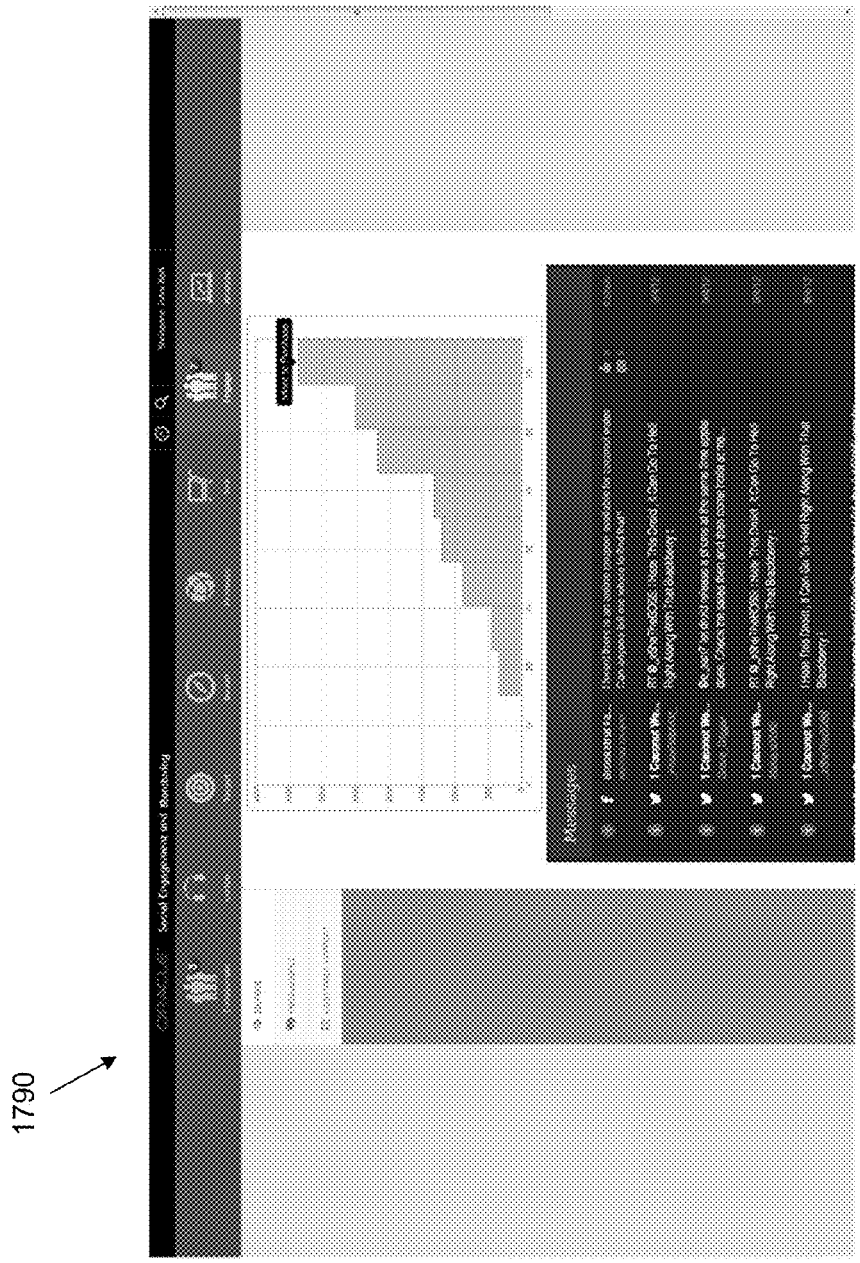
Figure 17V:
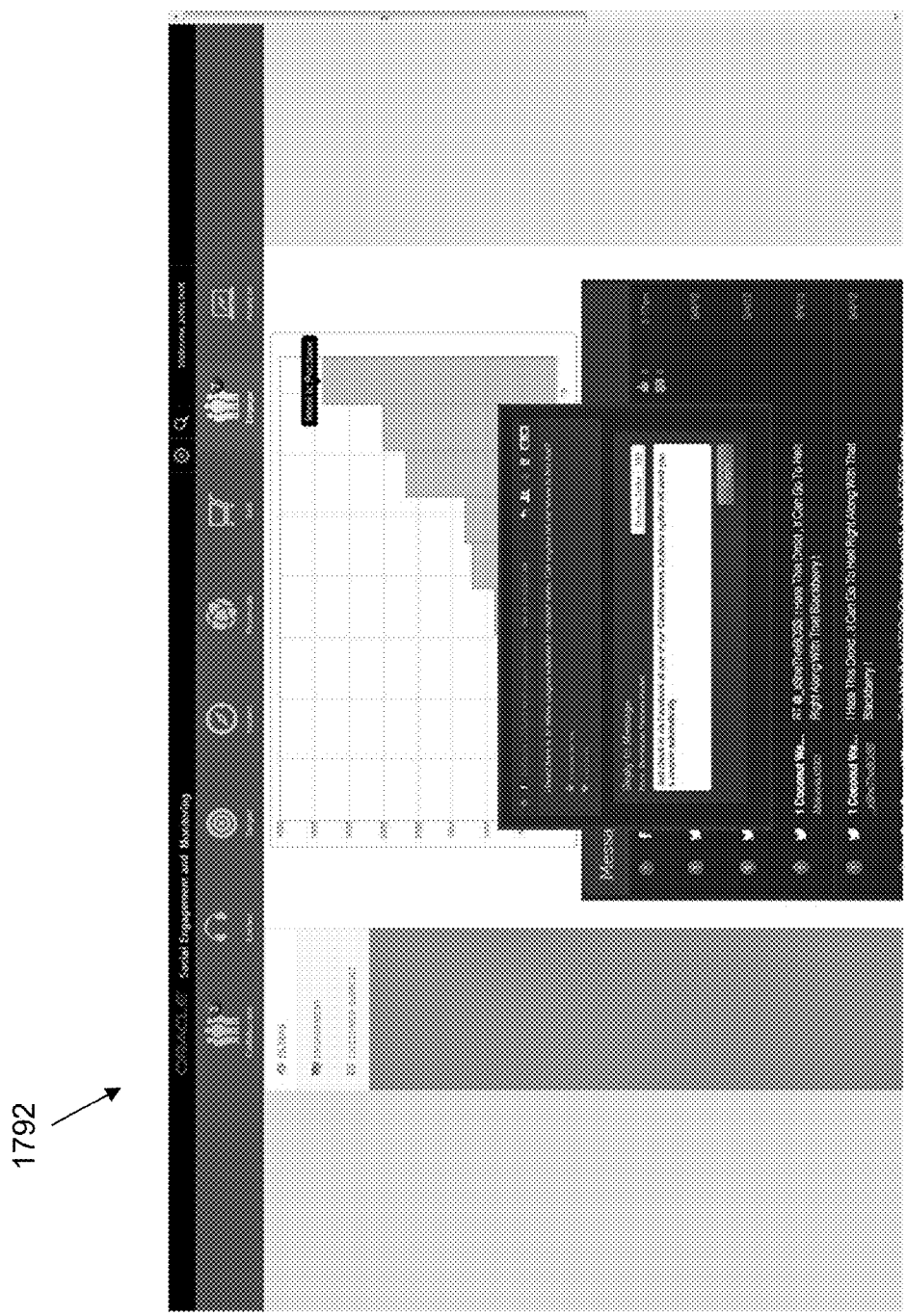
Figure 17W:
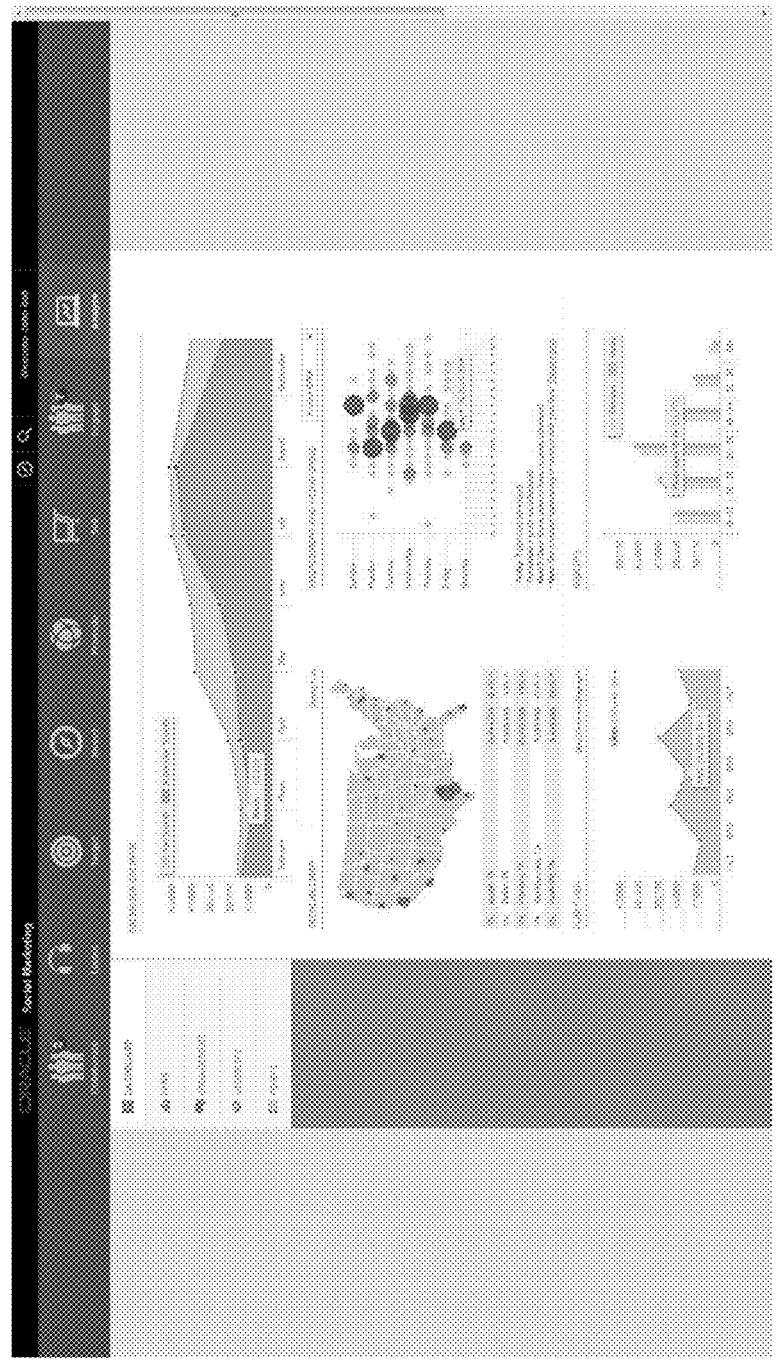

FIGS. 17A-W provide an illustrative example of an integrated cloud-based social marketing system. This illustrative example describes the actions of specific tools and services in the system. It is noted that the invention is not limited to these specific tools and services, and is applicable in its scope to others as well.

FIG. 17A shows a process flow 1702 for using embodiments of the inventive system to implement a social marketing campaign for a fictional company called "Brookstrut Farmer's Market". The process flow 1702 involves the company monitoring product related conversations via a social listening dashboard. At 1702*a*, the system monitors for product related conversation on social media, e.g., using the approaches described above with respect to FIGS. 3-8B.

At 1702*b*, the system alerts the company employees if certain products or product categories (e.g., coconut water) is trending, e.g., within internal or external social networks. At 1702*c*, a multi-channel campaign can be created. Any suitable tool can be used to create the marketing campaign, e.g., using a CRM system, SRM system, marketing automation system, or any combination thereof.

The marketing campaign may include, for example, a coupon management component. Therefore, at 1702*d*, a coupon management application can be employed to manage the coupons.

At 1702*e*, the company would then schedule publication of information related to the campaign on various social media outlets, such as Facebook and Twitter. This release and schedule could be managed, for example, using the SRM system.

At 1702*f*, a storefront, e.g., either virtual or brick and mortar, can be created to sell the product items, e.g., to sell a limited number of the items. The Vitrue Shop product (available from Oracle Corporation of Redwood Shores, Calif.) is an example of a system capable of creating and deploying a virtual storefront on a social media site.

At a later point in time, the marketing campaign goes live at 1702*g*. Social monitoring services may be employed to categorize and route incoming messages related to the campaign. The messages are handled as appropriate at 1702*h*. For example, negative messages are routed to a customer service team and positive messages are routed to be promoted on social media sites.

At 1702*i*, analysis can also be performed, e.g., to determine engagement levels and to measure the success of other campaign. If successful, similar actions can thereafter be taken at 1702*j* for various other marketing regions.

FIG. 17B illustrates the example ecommerce site 1706 and website 1704 for the fictional Brookstrut company. FIG. 17C illustrates example social media content that pertain to this company, such as Twitter messages 1708 and a Facebook page 1710 for the company. Using the techniques described above, analysis may be performed upon the social media data. The social media data may be retrieved from internal social network platforms or external social media platforms, such as Facebook or Twitter.

FIG. 17D illustrates a page 1712 from an internal social network (e.g., Oracle Social Network) for a campaign group within the company. The internal social network is used to collaborate among employees for marketing campaigns, e.g., by posting about trends in conversations about coconut water. An example approach to implement an internal social network is described in co-pending U.S. Ser. No. 13/888,888, filed on May 7, 2013, which is hereby incorporated by reference in its entirety.

As a result of the OSN postings, various dashboards may be accessed by marketing personnel about the products/product areas. FIG. 17E illustrates an example dashboard 1714 regarding soft drinks, which identifies and displays data for customer sentiments. In this example, the dashboard shows that coconut water is trending upwards with massively popular sentiment. This indicates a clear marketing opportunity for the company.

FIGS. 17F, 17G, and 17H illustrate additional types of example dashboards that may be used in the system. FIG. 17F shows an interface 1716 that provides semantic categorizations the social data. FIG. 17G shows an interface 1718 that provides term analysis of the social data. FIG. 17H shows an interface 1720 that provides trend details such as geographic locations of where the trending is occurring.

Based upon this data, a marketing campaign can be created, e.g., using the Fusion CRM Marketing product, Vitrue SRM product, Eloqua product, or any combination thereof, all of which are available from Oracle Corporation of Redwood Shores, Calif. FIG. 17I illustrates an example campaign table 1722 for the marketing campaign. FIG. 17J illustrates a multi-channel campaign flow 1724 that can be organized for the campaign. The campaign flow 1724 may be populated with stages that include social media components.

As an example, consider a custom coupon management component that can be created for the coconut water campaign. FIG. 17K illustrates an example coupon management application 1726 that can be used to create a coupon 1728, where the interface comprises a map of locations for purchase of the product item being marketed. FIG. 17L shows an interface 1730 that illustrates what happens when clicking on a map location in the application. Here, store details, usage, and preview data may be shown, including an image of the coupon 1728. The application therefore permits marketing personnel to enter locations of the stores and its competitors. This permits location-based offering of mobile coupons with delivery triggered when the customer checks in to a social media site, e.g., when checking into Facebook.

FIG. 17M shows an example sequence of interface views for a mobile device, from check-in through to presentation of the coupon picture. Screen 1740 indicates that the user is currently using a social networking/media application on his mobile device. Screen 1742 shows that the currently location for the mobile device/consumer is known, e.g., using the location technology within the mobile device. Screen 1744 indicates that the user can use the mobile device to input information to the social media site, which is reflected in screen 1746. Screen 1748 shows the mobile device providing an indication 1749 that a new message has been sent to the user, e.g., based upon the user's location and/or proximity to a location for which the product item is being sold. Screen 1750 shows the message that was created from the marketing campaign that was sent to the user. Screen 1752 illustrates the coupon 1728 that is being provided as part of the marketing campaign.

FIG. 17N shows a calendar 1760 for the campaign, indicating when the social campaign is to publish certain items. The posts can be scheduled on any platform, such as Twitter, Google+, and Twitter.

Clicking on an item in the calendar brings up more detailed information for the scheduled items. FIG. 17O shows an example posting 1762 for a social media site for the campaign. Each post is tied to the marketing campaign, e.g., to the campaign object(s) and/or data in the CRM system. The posts can be geographically targeted to certain regions, e.g., to California. The posts are intended to, for example, drive consumers to purchase the product on the Facebook shop built just for the campaign.

FIG. 17P shows an example virtual shop 1770 for the product that is placed onto a social media site 1772 (such as Facebook). The shop 1770 can be linked to the company's main shopping site, which can be implemented, for example, using the ATG Web Commerce product available from Oracle Corporation of Redwood Shores, Calif. FIG. 17Q shows an interface 1774 that illustrates a linkage between the items on the shopping site 1770 and catalog items in the company's main shopping site. This permits the company to leverage existing ecommerce and ERP investments. This further means that the company does not need to re-implement everything just to support a new shop on a social media site. The main shopping site 1776 can be browsed to identify the items to list, which is linked onto the shop 1770 on the social media site, e.g., as illustrated in FIG. 17R.

FIG. 17S shows an example storefront 1780 that is published onto a social media site (such as Facebook). Postings are directed to fans when the campaign goes live. FIG. 17T shows example messages 1782 on the company's Facebook page 1784. As the campaign proceeds, fans can engage with the brand with comments and posts.

As comments are received, the community managers and customer service representatives can monitor and respond to the interactions. FIG. 17U shows an interface 1790 that illustrates this interaction with fans. FIG. 17V shows an interface 1792 that illustrates different actions that may be taken by community managers. The categorized messages are automatically routed to the correct groups by the system. Analysis may be performed on the campaign and the campaign results. FIG. 17W illustrates a dashboard 1794 showing various interface elements to present metrics for the campaign.

Therefore, what has been described is an approach for implementing a system, method, and computer program product for performing social marketing, e.g., using a cloud-based system. The invention is capable of accessing data across multiple types of internet-based sources of social data and commentary and to perform analysis upon that data. A social marketing campaign can then be generated and implemented in an integrated manner using the system. This permits realtime reaction to trends, with rapid ability to react to opportunities in the marketplace.

System Architecture Overview

FIG. 18 is a block diagram of an illustrative computing system 1800 suitable for implementing an embodiment of the present invention. Computer system 1800 includes a bus 1806 or other communication mechanism for communicating information, which interconnects subsystems and devices, such as processor 1807, system memory 1808 (e.g., RAM), static storage device 1809 (e.g., ROM), disk drive 1810 (e.g., magnetic or optical), communication interface 1814 (e.g., modem or Ethernet card), display 1811 (e.g., CRT or LCD), input device 1812 (e.g., keyboard), and cursor control.

According to one embodiment of the invention, computer system 1800 performs specific operations by processor 1807 executing one or more sequences of one or more instructions contained in system memory 1808. Such instructions may be read into system memory 1808 from another computer readable/usable medium, such as static storage device 1809 or disk drive 1810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1807 for execution. Such a medium may take many forms, including but not limited to, non-volatile media and volatile media. Non-volatile media includes, for example, optical or magnetic disks, such as disk drive 1810. Volatile media includes dynamic memory, such as system memory 1808.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1800. According to other embodiments of the invention, two or more computer systems 1800 coupled by communication link 1815 (e.g., LAN, PTSN, or wireless network) may perform the sequence of instructions required to practice the invention in coordination with one another.

Computer system 1800 may transmit and receive messages, data, and instructions, including program, i.e., application code, through communication link 1815 and communication interface 1814. Received program code may be executed by processor 1807 as it is received, and/or stored in disk drive 1810, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method, comprising:
using at least one processor of a social relationship management system to perform a process, the process comprising:
integrating a social monitoring tool with a marketing tool in a cloud computing environment for access by an organization, the social monitoring tool located on a remote server outside of a network of the organization;
permitting access to both the social monitoring tool and the marketing tool based in part or in whole on single sign-on credentials for employees within the organization;
performing first monitoring at the social monitoring tool to monitor social media data from both an external social network and an internal social network, the external social network corresponding to a public social network that is publically available and the internal social network corresponding to a private social network that is only available to employees of the organization, the private social network comprising of content pertaining to the employees within the organization;
generating one or more trends developed for one or more products or services provided by the organization at least by analyzing both external social media data from the external social network and internal social media data from the internal social network of the social media data;

associating internal profile data with internal originators of contents, the internal profile data comprising professional information about the internal originators;

identifying actionable messages based in part or in whole on results of at least a semantic and sentiment analysis of the social media data that comprise the one or more trends at least by tagging the social media data with one or more tags based in part or in whole on the results of at least the semantic and sentiment analysis of the social media data, the one or more tags associating the actionable messages with one or more criteria of the one or more products or services of the organization;

transmitting the actionable messages to one or more enterprise tools based in part or in whole on the one or more tags by using at least a rule engine, including rules identifying how to direct the actionable messages;

creating one or more marketing programs and distributing one or more marketing messages at the marketing tool using the results of the at least the semantic and sentiment analysis of the social media data in response to the one or more trends onto one or more social media sites;

performing second monitoring to monitor the one or more social media sites for analyzing effectiveness of the one or more marketing programs created using the results of the at least the semantic and sentiment analysis of the social media data from the first monitoring at least by tagging the one or more marketing messages with one or more marketing tracking codes, extracting information from responses to at least one marketing message of the one or more marketing messages from the one or more social media sites, flagging at least one response of the responses that comprises one or more uniform resource locators or abusive language, and correlating the responses with the one or more marketing programs based in part or in whole on the one or more marketing tracking codes, the at least one marketing messages being deletable in response to the at least one response that is flagged, and identifying multiple message delivery schedules spanning across a period of delivery time for the one or more marketing messages; and distributing the one or more marketing messages according the multiple message delivery schedules.

2. The method of claim 1, in which the social media data is from at least one of public social networks or private social networks.

3. The method of claim 1, in which the marketing tool comprises a customer relationship management (CRM) tool.

4. The method of claim 1, further comprising providing a dashboard to visualize the results of the at least the semantic and sentiment analysis from analyzing the social media data.

5. The method of claim 1, further comprising performing semantic filtering on the social media data.

6. The method of claim 1, further comprising implementing a storefront on the one or more social media sites.

7. The method of claim 1, wherein the one or more marketing programs comprise distribution of electronic coupons.

8. The method of claim 1, in which the one or more marketing programs are implemented in part or in whole by distribution of marketing emails.

9. The method of claim 1, wherein the at least the semantic and sentiment analysis is performed to identify the one or more trends in the social media data before the one or more marketing programs are created.

10. The method of claim 1, in which social statistical data is captured from the one or more social media sites to analyze the effects of the one or more marketing programs.

11. A non-transitory computer readable medium having stored thereon a sequence of instructions which, when executed by a processor of a social relationship management system, causes the processor to execute a method comprising:

integrating a social monitoring tool with a marketing tool in a cloud computing environment for access by an organization, the social monitoring tool located on a remote server outside of a network of the organization;

permitting access to both the social monitoring tool and the marketing tool based in part or in whole on single sign-on credentials for employees within the organization;

performing first monitoring at the social monitoring tool to monitor social media data from both an external social network and an internal social network, the external social network corresponding to a public social network that is publically available and the internal social network corresponding to a private social network that is only available to employees of the organization, the private social network comprising of content pertaining to the employees within the organization;

generating one or more trends developed for one or more products or services provided by the organization at least by analyzing both external social media data from the external social network and internal social media data from the internal social network of the social media data;

associating internal profile data with internal originators of contents in the internal social media data, the internal profile data comprising professional information about the internal originators;

identifying actionable messages based in part or in whole on results of at least a semantic and sentiment analysis of the social media data that comprise the one or more trends at least by tagging the social media data with one or more tags based in part or in whole on the results of at least the semantic and sentiment analysis of the social media data, the one or more tags associating the actionable messages with one or more criteria of the one or more products or services of the organization;

transmitting the actionable messages to one or more enterprise tools based in part or in whole on the one or more tags by using at least a rule engine, including rules identifying how to direct the actionable messages;

creating one or more marketing programs and distributing one or more marketing messages at the marketing tool using the results of the at least the semantic and sentiment analysis of the social media data in response to the one or more trends onto one or more social media sites;

performing second monitoring to monitor the one or more social media sites for analyzing effectiveness of the one or more marketing programs created using the results of the at least the semantic and sentiment analysis of the social media data from the first monitoring at least by tagging the one or more marketing messages with one or more marketing tracking codes, extracting information from responses to at least one marketing message of the one or more marketing messages from the one or more social media sites, flagging at least one response of the responses that comprises one or more uniform resource locators or abusive language, and correlating the responses with the one or more marketing programs based in part or in whole on the one or more marketing tracking codes, the at least one marketing messages being deletable in response to the at least one response that is flagged, and identifying multiple message delivery schedules spanning across a period of delivery time for the one or more marketing messages; and distributing the one or more marketing messages according the multiple message delivery schedules.

12. The computer readable medium of claim 11, in which the social media data is from at least one of public social networks or private social networks.

13. The computer readable medium of claim 11, in which the marketing tool comprises a customer relationship management (CRM) tool.

14. The computer readable medium of claim 11, further comprising providing a dashboard to visualize the results of the at least the semantic and sentiment analysis from analyzing the social media data.

15. The computer readable medium of claim 11, further comprising performing semantic filtering on the social media data.

16. The computer readable medium of claim 11, further comprising implementing a storefront on the one or more social media sites.

17. The computer readable medium of claim 11, wherein the one or more marketing programs comprise distribution of electronic coupons.

18. The computer readable medium of claim 11, in which the one or more marketing programs are implemented in part or in whole by distribution of marketing emails.

19. The computer readable medium of claim 11, wherein the at least the semantic and sentiment analysis is performed to identify the one or more trends in the social media data before the one or more marketing programs are created.

20. The computer readable medium of claim 11, in which social statistical data is captured from the one or more social media sites to analyze the effects of the one or more marketing programs.

21. A system comprising:
a processor;
a memory comprising computer code executed using the processor, in which the computer code comprises program code to perform:
integrating a social monitoring tool with a marketing tool in a cloud computing environment for access by an organization, the social monitoring tool located on a remote server outside of a network of the organization;
at least one processor of a social relationship management system to perform:
permitting access to both the social monitoring tool and the marketing tool based in part or in whole on single sign-on credentials for employees within the organization;
performing first monitoring at the social monitoring tool to monitor social media data from both an external social network and an internal social network, the external social network corresponding to a public social network that is publically available and the internal social network corresponding to a private social network that is only available to employees of the organization, the private social network comprising of content pertaining to the employees within the organization;
generating one or more trends developed for one or more products or services provided by the organization at least by analyzing both external social media data from the external social network and internal social media data from the internal social network of the social media data;
associating internal profile data with internal originators of contents in the internal social media data, the internal profile data comprising professional information about the internal originators;
identifying actionable messages based in part or in whole on results of at least a semantic and sentiment analysis of the social media data that comprise the one or more trends at least by tagging the social media data with one or more tags based in part or in whole on the results of at least the semantic and sentiment analysis of the social media data, the one or more tags associating the actionable messages with one or more criteria of the one or more products or services of the organization;
transmitting the actionable messages to one or more enterprise tools based in part or in whole on the one or more tags by using at least a rule engine, including rules identifying how to direct the actionable messages;
creating one or more marketing programs and distributing one or more marketing messages at the marketing tool using the results of the at least the semantic and sentiment analysis of the social media data in response to the one or more trends onto one or more social media sites;
performing second monitoring to monitor the one or more social media sites for analyzing effectiveness of the one or more marketing programs created using the results of the at least the semantic and sentiment analysis of the social media data from the first monitoring at least by tagging the one or more marketing messages with one or more marketing tracking codes, extracting information from responses to at least one marketing message of the one or more marketing messages from the one or more social media sites, flagging at least one response of the responses that comprises one or more uniform resource locators or abusive language, and correlating the responses with the one or more marketing programs based in part or in whole on the one or more marketing tracking codes, the at least one marketing messages being deletable in response to the at least one response that is flagged, and
identifying multiple message delivery schedules spanning across a period of delivery time for the one or more marketing messages; and distributing the one or more marketing messages according the multiple message delivery schedules.

22. The system of claim 21, in which the social media data is from at least one of public social networks or private social networks.

23. The system of claim 21, in which the marketing tool comprises a customer relationship management (CRM) tool.

24. The system of claim 21, further comprising a dashboard to visualize the results of the at least the semantic and sentiment analysis from analyzing the social media data.

25. The system of claim 21, wherein semantic filtering is performed on the social media data, and the one or more marketing programs comprise distribution of electronic coupons.

26. The system of claim 21, wherein the processor of the social relationship management system is further configured at least to:
identify a message including a first portion that fails to comply with a rule in the rule engine and
a remaining portion from a message database table in a database system comprising a plurality of database tables; and
transform the message into a modified message at least by modifying the remaining portion instead of the first portion of the message, the modified message corresponding to a process identification and a unique message identification and associated with a transmission schedule in the message database table.

27. The system of claim 26, wherein the processor of the social relationship management system is further configured at least to:
identify, at the monitoring tool, a set of standards, rules, and policies for each of the one or more external social networks;
determine, at the monitoring tool, a set of rules based in part or in whole on the set of standards, rules, and policies;
apply the set of rules to at least a first marketing message for the each of the one or more external social networks;
modify the at least the first marketing message and creating a separate message based in part or in whole upon the set of rules, the one or more marketing messages are distributed without individually accessing the one or more marketing programs;
create, at the monitoring tool, a modified link by modifying a format of an original link to a webpage in a meta refresh marketing message;
modify the meta refresh marketing message to replace the original link with the modified link;
receive an indication to proceed to the webpage from a user browser session;
redirect the user browser session to land on an initial landing with the modified link;
track the effectiveness of the meta refresh marketing message based in part of in whole on a total number of the initial landing; and
direct the user browser session to land on the webpage with the original link after the initial landing.

28. The system of claim 26, wherein the processor of the social relationship management system is further configured at least to:
obtain publicly available contents from the one or more external social networks;
obtain private contents accessible only by at least some of the employees within the organization from the internal social networks;
determine understanding of contextual and semantic significance of the publicly available contents or the private contents at least by performing a latent semantic analysis on the social media data;
reduce mis-categorizations of the social media data at least by removing irrelevant content from the social media data with a semantic filtering process;
identify one or more themes from the publicly available contents;
categorize the one or more products or services into one or more categories of pertinence;
identify a plurality of first contents posted on a plurality of first social networks with a central user interface;
delete the plurality of contents from the plurality of first social networks based in part or in whole on a first sentiments assigned to the plurality of first contents with the central user interface;
republish the plurality of first contents on the plurality of first social networks with the central user interface;
determine, at the monitoring tool, whether there is a content change in at least one of the one or more external social networks and the internal social network;
automatically retrieve, at the monitoring tool, the content change from the at least one of the one or more external social networks and the internal social network by querying a server associated with the at least one of the one or more external social networks;
associate a control with an action that is to be executed for a second content from at least one of the one or more external social networks and the internal social network and entails a corresponding update at the at least one of the one or more external social networks and the internal social network;
generate sentiment track results at least by tracking a plurality of assigned sentiments over a period of time;
analyze history or progression of the plurality of assigned sentiments;
determine at least one trend of the one or more trends based in part or in whole upon results of analyzing the history or the progression of the plurality of assigned sentiments;
generate a sentiment graph for at least one of the plurality of assigned sentiments over the period of time;
identify non-social data from the internal social network into the social media data;
reduce noise in the external social media data or the internal social media data at least by performing semantic filtering on the external social media data or the internal social media data;
associate external profile data with external originators of contents in the external social media data, the external profile data comprising information about social standings, demographic information, professional information, or geographic locations of the external originators;
determine relative priorities for the external originators based in part or in whole upon the external profile data;
process posted contents from the external originators based in part or in whole upon the relative priorities;
determine internal relative priorities for the internal originators based in part or in whole upon the internal profile data;
process posted contents from the internal originators based in part or in whole upon the internal relative priorities;
determine internal relative priorities for the internal originators based in part or in whole upon the internal profile data;
process posted contents from the internal originators based in part or in whole upon the internal relative priorities;
apply a plurality of levels of filtering to the social media data based in part or in whole upon a plurality of types and sources of the social media data;

identify the one or more tags associated with the actionable messages based in part or in whole upon classification results and semantic analysis results for the social media data;

assign action items and due dates to leaders in the organization based in part or in whole upon classification results and semantic analysis results for the social media data;

group, at the marketing tool, the one or more marketing messages into one or more groups for the one or more products or services;

create the one or more marketing programs based in part or in whole upon the one or more groups in response to the one or more trends generated at least by analyzing both the external social media data and the internal social media data;

screen, at a moderator module of the monitoring tool, at least some responses of the responses for undesirable contents at least by comparing the at least some responses to a undesirable content database;

flag the at least some responses;

remove, at the moderator module, at least one response from the at least some responses;

screen, at the moderator module, at least some positive responses of the responses for positive contents;

flag the at least some positive responses; and award, at the moderator module, at least one positive response from the at least some positive responses.

29. The system of claim 21, wherein the at least the semantic and sentiment analysis is performed to identify the one or more trends in the social media data before the one or more marketing programs are created.

30. The system of claim 21, in which social statistical data is captured from both the one or more external social networks and the internal social network-to analyze the effects of the one or more marketing programs, the one or more marketing programs comprise distribution of electronic coupons, and the one or more marketing programs are implemented in part or in whole by distribution of marketing emails.

* * * * *